(12) United States Patent
Nogami et al.

(10) Patent No.: US 10,638,467 B2
(45) Date of Patent: Apr. 28, 2020

(54) USER EQUIPMENTS, BASE STATIONS AND METHODS

(71) Applicants: Sharp Kabushiki Kaisha, Sakai-ku, Sakai, Osaka (JP); FG Innovation Company Limited, New Territories, Hong Kong (CN)

(72) Inventors: Toshizo Nogami, Vancouver, WA (US); Zhanping Yin, Vancouver, WA (US)

(73) Assignees: Sharp Kabushiki Kaisha, Osaka (JP); FG Innovation Company Limited, Hong Kong (CN)

( * ) Notice: Subject to any disclaimer, the term of this patent is extended or adjusted under 35 U.S.C. 154(b) by 1 day.

(21) Appl. No.: 15/717,446

(22) Filed: Sep. 27, 2017

(65) Prior Publication Data

US 2018/0092073 A1     Mar. 29, 2018

Related U.S. Application Data

(63) Continuation of application No. PCT/US2017/053541, filed on Sep. 26, 2017.

(Continued)

(51) Int. Cl.
*H04W 52/54* (2009.01)
*H04W 72/04* (2009.01)
(Continued)

(52) U.S. Cl.
CPC ......... *H04W 72/042* (2013.01); *H04W 52/16* (2013.01); *H04W 52/54* (2013.01); *H04W 72/1268* (2013.01); *H04W 52/146* (2013.01)

(58) Field of Classification Search
CPC .............. H04W 72/042; H04W 52/16; H04W 72/1268
See application file for complete search history.

(56) References Cited

U.S. PATENT DOCUMENTS

| 9,125,012 B2 | 9/2015 | Pelletier et al. |
| 2015/0189574 A1 | 7/2015 | Ng et al. |

(Continued)

OTHER PUBLICATIONS

3GPP TS 36.211. v13.0.0, Evolved Universal Terrestrial Radio Access (E-UTRA); Physical channels and modulation (Release 13), Dec. 2015.

(Continued)

*Primary Examiner* — Charles C Jiang
*Assistant Examiner* — Voster Preval
(74) *Attorney, Agent, or Firm* — Austin Rapp

(57) ABSTRACT

A user equipment (UE) is described. The UE includes physical downlink control channel (PDCCH) receiving circuitry configured to monitor a first PDCCH with a first DCI format, the first PDCCH with the first DCI format scheduling a physical uplink shared channel (PUSCH). The UE also includes PUSCH transmitting circuitry configured to transmit the PUSCH, the first DCI format including a PUSCH trigger A field and a Transmitter Power Control (TPC) command field. The PDCCH receiving circuitry is further configured to, if the PUSCH trigger A field is set to 1, monitor a second PDCCH with a second DCI format in a valid duration, the second DCI format including a PUSCH trigger B field. If the PUSCH trigger A field is set to 1, the TPC command field applies only when the second PDCCH with the second DCI format of which the PUSCH trigger B field set to 1 is detected.

8 Claims, 50 Drawing Sheets

Related U.S. Application Data

(60) Provisional application No. 62/401,088, filed on Sep. 28, 2016.

(51) Int. Cl.
*H04W 72/12* (2009.01)
*H04W 52/16* (2009.01)
*H04W 52/14* (2009.01)

(56) References Cited

U.S. PATENT DOCUMENTS

| | | |
|---|---|---|
| 2015/0289208 A1 | 10/2015 | Liu et al. |
| 2016/0173315 A1 | 6/2016 | Kim et al. |
| 2016/0174259 A1 | 6/2016 | Mukherjee et al. |
| 2016/0212649 A1 | 7/2016 | Chen et al. |
| 2016/0218832 A1 | 7/2016 | Dabeer et al. |
| 2016/0219618 A1 | 7/2016 | Rico Alvarino et al. |
| 2016/0219621 A1 | 7/2016 | Kim et al. |
| 2016/0227524 A1 | 8/2016 | Choi et al. |
| 2016/0227571 A1 | 8/2016 | Baek et al. |
| 2016/0233989 A1 | 8/2016 | Belghoul et al. |
| 2017/0290041 A1* | 10/2017 | Rico Alvarino ........ H04L 5/001 |
| 2018/0083684 A1* | 3/2018 | He ........................ H04B 7/0626 |
| 2018/0110084 A1* | 4/2018 | Dinan ................ H04W 52/365 |
| 2018/0176835 A1* | 6/2018 | Park .................. H04W 74/0808 |
| 2018/0270847 A1* | 9/2018 | Takeda ................ H04W 24/10 |

OTHER PUBLICATIONS

3GPP TS 36.213. v13.0.0, Evolved Universal Terrestrial Radio Access (E-UTRA); Physical layer procedures (Release 13), Dec. 2015.

Qualcomm Incorporated, "PUCCH design details", 3GPP TSG RAN WG1 #84bis, Busan, Korea, R1-163025, Apr. 15, 2016.

LG Electronics, "UCI transmission for LAA", 3GPP TSG RAN WG1 meeting #86, Gothenburg, Sweden, R1-166820, Aug. 26, 2016.

International Search Report and Written Opinion issued for PCT Application No. PCT/US2017/053541 dated Nov. 8, 2017.

3rd Generation Partnership Project (3GPP), "6 Random access procedure," 3GPP TS 36.213 V13.2.0, pp. 45-260, retrieved from the Internet: URL: http://www.3gpp.org/ftp/tsg_ran/WG1_RL1/TSGR1_86/Docs/ Jun. 2016.

\* cited by examiner

USER EQUIPMENTS, BASE STATIONS AND METHODS

RELATED APPLICATIONS

This application is related to and claims priority from U.S. Provisional Patent Application No. 62/401,088, entitled "USER EQUIPMENTS, BASE STATIONS AND METHODS," filed on Sep. 28, 2016, which is hereby incorporated by reference herein, in its entirety.

TECHNICAL FIELD

The present disclosure relates generally to communication systems. More specifically, the present disclosure relates to user equipments (UEs), base stations and methods.

BACKGROUND

Wireless communication devices have become smaller and more powerful in order to meet consumer needs and to improve portability and convenience. Consumers have become dependent upon wireless communication devices and have come to expect reliable service, expanded areas of coverage and increased functionality. A wireless communication system may provide communication for a number of wireless communication devices, each of which may be serviced by a base station. A base station may be a device that communicates with wireless communication devices.

As wireless communication devices have advanced, improvements in communication capacity, speed, flexibility and/or efficiency have been sought. However, improving communication capacity, speed, flexibility and/or efficiency may present certain problems.

For example, wireless communication devices may communicate with one or more devices using a communication structure. However, the communication structure used may only offer limited flexibility and/or efficiency. As illustrated by this discussion, systems and methods that improve communication flexibility and/or efficiency may be beneficial.

DETAILED DESCRIPTION

Figure 1:
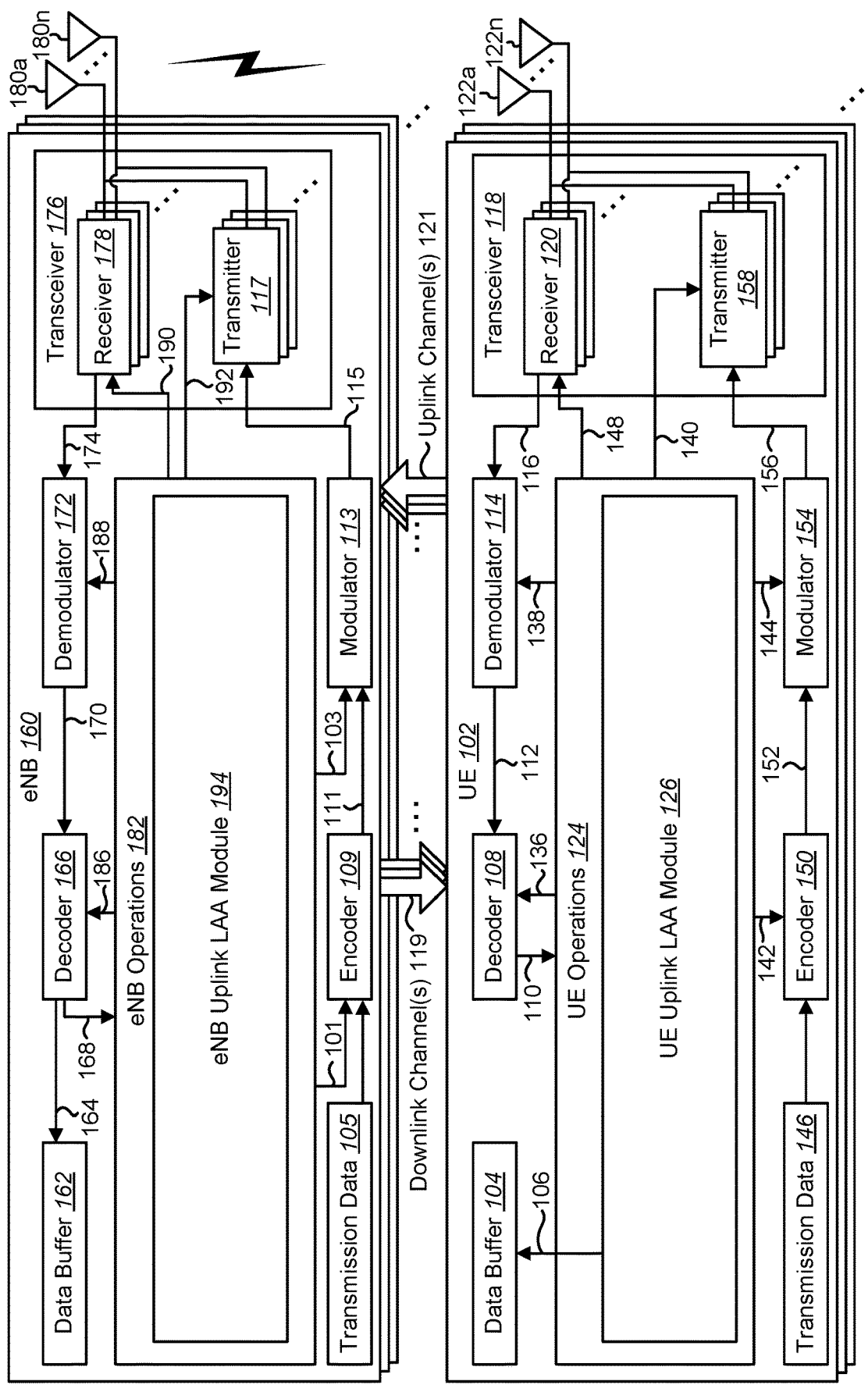
FIG. 1 is a block diagram illustrating one implementation of one or more evolved NodeBs (eNBs) and one or more user equipments (UEs) in which systems and methods for uplink license-assisted access (LAA) operations may be implemented.

A user equipment (UE) is described. The UE includes physical downlink control channel (PDCCH) receiving circuitry configured to monitor a first PDCCH with a first downlink control information (DCI) format, the first PDCCH with the first DCI format scheduling a physical uplink shared channel (PUSCH). The UE also includes PUSCH transmitting circuitry configured to transmit the PUSCH, the first DCI format including a PUSCH trigger A field and a Transmitter Power Control (TPC) command field. The PDCCH receiving circuitry is further configured to, if the PUSCH trigger A field is set to 1, monitor a second PDCCH with a second DCI format in a valid duration, the second DCI format including a PUSCH trigger B field. If the PUSCH trigger A field is set to 1, the TPC command field applies only when the second PDCCH with the second DCI format of which the PUSCH trigger B field set to 1 is detected.

The second DCI format may be a DCI format with a cyclic redundancy check (CRC) scrambled by component carrier Radio Network Temporary Identifier (CC-RNTI). If the PUSCH trigger A field is set to 1, the TPC command field may not apply when the second PDCCH with the second DCI format of which the PUSCH trigger B field set to 1 is not detected.

An evolved node B (eNB) communicating with a UE is also described. The eNB includes PDCCH transmitting circuitry configured to transmit a first PDCCH with a first DCI format, the first PDCCH with the first DCI format scheduling a PUSCH. The eNB also includes PUSCH receiving circuitry configured to receive the PUSCH, the first DCI format including a PUSCH trigger A field and a TPC command field. The PDCCH transmitting circuitry is further configured to, if the PUSCH trigger A field is set to 1, transmit a second PDCCH with a second DCI format in a valid duration, the second DCI format including a PUSCH trigger B field. If the PUSCH trigger A field is set to 1, the TPC command field applies only when the second PDCCH with the second DCI format of which the PUSCH trigger B field set to 1 is detected by the UE.

A method for a UE is also described. The method includes monitoring a first PDCCH with a first DCI format, the first PDCCH with the first DCI format scheduling a PUSCH. The method also includes transmitting the PUSCH, the first DCI format including a PUSCH trigger A field and a TPC command field. The method further includes monitoring a second PDCCH with a second DCI format in a valid duration if the PUSCH trigger A field is set to 1, the second DCI format including a PUSCH trigger B field. If the PUSCH trigger A field is set to 1, the TPC command field applies only when the second PDCCH with the second DCI format of which the PUSCH trigger B field set to 1 is detected.

A method for an eNB communicating with a UE is also described. The method includes transmitting a first PDCCH with a first DCI format, the first PDCCH with the first DCI format scheduling a PUSCH. The method also includes receiving the PUSCH, the first DCI format including a PUSCH trigger A field and a TPC command field. The method further includes transmitting a second PDCCH with a second DCI format in a valid duration if the PUSCH trigger A field is set to 1, the second DCI format including a PUSCH trigger B field. If the PUSCH trigger A field is set to 1, the TPC command field applies only when the second PDCCH with the second DCI format of which the PUSCH trigger B field set to 1 is detected by the UE.

Another UE is described. The UE includes a physical downlink control channel (PDCCH) receiver configured to receive, in a subframe n, a PDCCH. The UE also includes a physical downlink shared channel (PDSCH) receiver configured to receive, in the subframe n, a PDSCH corresponding to the PDCCH, the PDSCH being received in a license-assisted access (LAA) cell. The UE further includes an uplink transmitter configured to feed back, in a subframe n+k, uplink control information (UCI). In a case that the UE is configured with simultaneous physical uplink control channel (PUCCH) and physical uplink shared channel (PUSCH) transmissions, the UCI includes a hybrid automatic repeat request-acknowledgement (HARQ-ACK) corresponding to the PDSCH, and the k is equal to 4. In a case that the UE is not configured with the simultaneous PUCCH and PUSCH transmissions, the UCI includes HARQ-ACKs for all hybrid automatic repeat request (HARQ) processes in the LAA cell, and the k is derived from an information field in the PDCCH.

In a case that the UE is configured with the simultaneous PUCCH and PUSCH transmissions, the PDCCH does not have the information field.

In a case that the UE is configured with the simultaneous PUCCH and PUSCH transmissions, the UCI is fed back via a PUCCH in a primary cell. In a case that the UE is not configured with the simultaneous PUCCH and PUSCH transmissions, the UCI is fed back via a PUCCH.

An evolved node B (eNB) communicating with a UE is also described. The eNB includes a PDCCH transmitter configured to transmit, in a subframe n, a PDCCH. The eNB also includes a PDSCH transmitter configured to transmit, in the subframe n, a PDSCH corresponding to the PDCCH, the PDSCH being transmitted in a LAA cell. The eNB further includes an uplink receiver configured to receive, in a subframe n+k, UCI. In a case that the UE is configured with simultaneous PUCCH and PUSCH transmissions, the UCI includes a HARQ-ACK corresponding to the PDSCH, and the k is equal to 4. In a case that the UE is not configured with the simultaneous PUCCH and PUSCH transmissions, the UCI includes HARQ-ACKs for all HARQ processes in the LAA cell, and the k is derived from an information field in the PDCCH.

In a case that the UE is configured with the simultaneous PUCCH and PUSCH transmissions, the PDCCH does not have the information field.

In a case that the UE is configured with the simultaneous PUCCH and PUSCH transmissions, the UCI is fed back via a PUCCH in a primary cell. In a case that the UE is not configured with the simultaneous PUCCH and PUSCH transmissions, the UCI is fed back via a PUCCH.

A method is also described. The method includes receiving, in a subframe n, a PDCCH. The method also includes receiving, in the subframe n, a PDSCH corresponding to the PDCCH, the PDSCH being received in a LAA cell. The method further includes feeding back, in a subframe n+k, UCI. In a case that the UE is configured with simultaneous PUCCH and PUSCH transmissions, the UCI includes a HARQ-ACK corresponding to the PDSCH, and the k is equal to 4. In a case that the UE is not configured with the simultaneous PUCCH and PUSCH transmissions, the UCI includes HARQ-ACKs for all HARQ processes in the LAA cell, and the k is derived from an information field in the PDCCH.

A UE is also described. The UE includes a PDCCH receiver configured to receive a first PDCCH and a second PDCCH. The UE also includes a PUSCH transmitter configured to transmit a PUSCH. The UE further includes a carrier sensor configured to perform a channel access procedure for a transmission of the PUSCH. The first PDCCH include a first PUSCH scheduling trigger field, a new data indicator field, a PUSCH resource assignment field and a validation duration field. The second PDCCH include a second PUSCH scheduling trigger field. The PUSCH is transmitted upon the detection of the second PDCCH with the second PUSCH scheduling trigger field set to 1 within a validation duration indicated by the validation duration field, in a case that the first PDCCH with the first PUSCH scheduling trigger field set to 1 is detected. In a case that the first PUSCH scheduling trigger field is set to 1 and the second PUSCH scheduling trigger field is set to 1, a contention window value for the channel access procedure is updated based on a value of the new data indicator field. In a case that the first PUSCH scheduling trigger field is set to 1 and the second PDCCH with the second PUSCH scheduling trigger field set to 1 is not detected within the validation duration, the contention window value for the channel access procedure is not updated based on the value of the new data indicator field.

A UE is also described. The UE includes a PDCCH receiver configured to receive a first PDCCH and a second PDCCH. The UE also includes a PUSCH transmitter configured to transmit a PUSCH. The UE further includes a carrier sensor configured to perform a channel access procedure for a transmission of the PUSCH. The first PDCCH include a first PUSCH scheduling trigger field, a new data indicator field, a PUSCH resource assignment field and a validation duration field. The second PDCCH include a second PUSCH scheduling trigger field. The PUSCH is transmitted upon the detection of the second PDCCH with the second PUSCH scheduling trigger field set to 1 within a validation duration indicated by the validation duration field, in a case that the first PDCCH with the first PUSCH scheduling trigger field set to 1 is detected and the first PDCCH schedules a first uplink shared channel (UL-SCH). In a case that the first PUSCH is detected, a contention window value for the channel access procedure is updated based on a value of the new data indicator field. In a case that the first PUSCH with the first PUSCH scheduling trigger field set to 1 is detected and the second PDCCH with the second PUSCH scheduling trigger field set to 1 is not detected within the validation duration, the contention window value for the channel access procedure is not updated based on a value of the new data indicator field in a next first PDCCH which schedule the first UL-SCH.

An eNB is also described. The eNB includes a PDCCH transmitter configured to transmit a first PDCCH and a second PDCCH. The eNB also includes a PUSCH receiver configured to receive a PUSCH. The first PDCCH include a first PUSCH scheduling trigger field, a new data indicator field, a PUSCH resource assignment field and a validation duration field. The second PDCCH include a second PUSCH scheduling trigger field. The PUSCH is transmitted upon the detection of the second PDCCH with the second PUSCH scheduling trigger field set to 1 within a validation duration indicated by the validation duration field, in a case that the first PDCCH with the first PUSCH scheduling trigger field set to 1 is detected. In a case that the first PUSCH scheduling trigger field is set to 1 and the second PUSCH scheduling trigger field is set to 1, a contention window value for a channel access procedure is updated based on a value of the new data indicator field. In a case that the first PUSCH scheduling trigger field is set to 1 and the second PDCCH with the second PUSCH scheduling trigger field set to 1 is not detected within the validation duration, the contention window value for the channel access procedure is not updated based on the value of the new data indicator field.

A method for a UE is also described. The method includes receiving a first PDCCH. The method also includes receiving a second PDCCH. The method further includes transmitting a PUSCH. The method further includes performing a channel access procedure for a transmission of the PUSCH. The first PDCCH include a first PUSCH scheduling trigger field, a new data indicator field, a PUSCH resource assignment field and a validation duration field. The second PDCCH include a second PUSCH scheduling trigger field. The PUSCH is transmitted upon the detection of the second PDCCH with the second PUSCH scheduling trigger field set to 1 within a validation duration indicated by the validation duration field, in a case that the first PDCCH with the first PUSCH scheduling trigger field set to 1 is detected. In a case that the first PUSCH scheduling trigger field is set to 1 and the second PUSCH scheduling trigger field is set to 1, a contention window value for a channel access procedure is updated based on a value of the new data indicator field. In a case that the first PUSCH scheduling trigger field is set to 1 and the second PDCCH with the second PUSCH scheduling trigger field set to 1 is not detected within the validation duration, the contention window value for the channel access procedure is not updated based on the value of the new data indicator field.

A UE is also described. The UE includes a PDCCH receiver configured to receive a first PDCCH and a second PDCCH. The UE also includes a PUSCH transmitter configured to transmit a PUSCH. The first PDCCH include a first PUSCH scheduling trigger field, a validation duration field, and transmit power control (TCP) command field. The second PDCCH include a second PUSCH scheduling trigger field. The PUSCH is transmitted upon the detection of the second PDCCH with the second PUSCH scheduling trigger field set to 1 within a validation duration indicated by the validation duration field, in a case that the first PDCCH with the first PUSCH scheduling trigger field set to 1 is detected. In a case that the first PUSCH scheduling trigger field is set to 1 and the second PDCCH with the second PUSCH scheduling trigger field set to 1 is not detected within the validation duration, the PUSCH scheduled by the first PDCCH is not transmitted, and a value of the TPC command field in the first PDCCH is used to determine a transmit power of a next PUSCH.

A UE is also described. The UE includes a PDCCH receiver configured to receive a first PDCCH and a second PDCCH. The UE also includes a PUSCH transmitter configured to transmit a PUSCH. The first PDCCH include a first PUSCH scheduling trigger field, a validation duration field, and transmit power control (TCP) command field. The second PDCCH include a second PUSCH scheduling trigger field. The PUSCH is transmitted upon the detection of the second PDCCH with the second PUSCH scheduling trigger field set to 1 within a validation duration indicated by the validation duration field, in a case that the first PDCCH with the first PUSCH scheduling trigger field set to 1 is detected. In a case that the first PUSCH scheduling trigger field is set to 1 and the second PDCCH with the second PUSCH scheduling trigger field set to 1 is not detected within the validation duration, the PUSCH scheduled by the first PDCCH is not transmitted, and a value of the TPC command field in the first PDCCH is not used to determine a transmit power of any PUSCH.

An eNB is also described. The eNB includes a PDCCH transmitter configured to transmit a first PDCCH and a second PDCCH. The eNB also includes a PUSCH receiver configured to receive a PUSCH. The first PDCCH include a first PUSCH scheduling trigger field, a validation duration field, and transmit power control (TCP) command field. The second PDCCH include a second PUSCH scheduling trigger field. The PUSCH is transmitted upon the detection of the second PDCCH with the second PUSCH scheduling trigger field set to 1 within a validation duration indicated by the validation duration field, in a case that the first PDCCH with the first PUSCH scheduling trigger field set to 1 is detected.

In a case that the first PUSCH scheduling trigger field is set to 1 and the second PDCCH with the second PUSCH scheduling trigger field set to 1 is not detected within the validation duration, the PUSCH scheduled by the first PDCCH is not transmitted, and a value of the TPC command field in the first PDCCH is used to determine a transmit power of a next PUSCH.

A method is also described. The method includes receiving a first PDCCH. The method also includes receiving a second PDCCH. The method further includes transmitting a PUSCH. The first PDCCH include a first PUSCH scheduling trigger field, a validation duration field, and transmit power control (TCP) command field. The second PDCCH include a second PUSCH scheduling trigger field. The PUSCH is transmitted upon the detection of the second PDCCH with the second PUSCH scheduling trigger field set to 1 within a validation duration indicated by the validation duration field, in a case that the first PDCCH with the first PUSCH scheduling trigger field set to 1 is detected. In a case that the first PUSCH scheduling trigger field is set to 1 and the second PDCCH with the second PUSCH scheduling trigger field set to 1 is not detected within the validation duration, the PUSCH scheduled by the first PDCCH is not transmitted, and a value of the TPC command field in the first PDCCH is used to determine a transmit power of a next PUSCH.

A UE is also described. The UE includes a PDCCH receiver configured to receive a PDCCH which schedule more than one physical uplink shared channels (PUSCHs). The UE also includes a higher layer processor configured to determine transmit power of each of the PUSCH. The UE also includes a PUSCH transmitter configured to transmit a PUSCH. The UE further includes an uplink transmitter configured to transmit at least one PUSCH among the PUSCHs and a sounding reference signal (SRS). The UE further includes a carrier sensor configured to perform a channel access for a transmission of said at least one PUSCH. In a case that the transmission of said at least one PUSCH has been stopped during or before subframe n which contains the SRS and that a channel is sensed to be continuously idle after the transmission has been stopped, the SRS in the subframe n is transmitted through another channel access.

A UE is also described. The UE includes a PDCCH receiver configured to receive a PDCCH which schedule a PUSCH. The UE also includes a higher layer processor configured to determine a first power scaling factor of the PUSCH and a second power scaling factor of a sounding reference signal (SRS), the SRS and the PUSCH being mapped in a same subframe. In a case that the first scaling factor is set to zero, the second scaling factor is set to zero. In a case that the second scaling factor is set to zero, the first scaling factor is set to zero.

An eNB is also described. The eNB includes a PDCCH transmitter configured to transmit a PDCCH which schedule more than one physical uplink shared channels (PUSCHs). The eNB also includes an uplink receiver configured to receive at least one PUSCH among the PUSCHs and a sounding reference signal (SRS). In a case that the transmission of said at least one PUSCH has been stopped during or before subframe n which contains the SRS and that a channel is sensed to be continuously idle after the transmission has been stopped, the SRS in the subframe n is transmitted through another channel access.

A method is also described. The method includes receiving a PDCCH which schedule more than one physical uplink shared channels (PUSCHs). The method also includes determining transmit power of each of the PUSCH. The method also includes transmitting at least one PUSCH among the PUSCHs. The method further includes transmitting a sounding reference signal (SRS). The method further includes performing a channel access for a transmission of said at least one PUSCH. In a case that the transmission of said at least one PUSCH has been stopped during or before subframe n which contains the SRS and that a channel is sensed to be continuously idle after the transmission has been stopped, the SRS in the subframe n is transmitted through another channel access.

The 3rd Generation Partnership Project, also referred to as "3GPP," is a collaboration agreement that aims to define globally applicable technical specifications and technical reports for third and fourth generation wireless communication systems. The 3GPP may define specifications for next generation mobile networks, systems and devices.

3GPP Long Term Evolution (LTE) is the name given to a project to improve the Universal Mobile Telecommunications System (UMTS) mobile phone or device standard to cope with future requirements. In one aspect, UMTS has been modified to provide support and specification for the Evolved Universal Terrestrial Radio Access (E-UTRA) and Evolved Universal Terrestrial Radio Access Network (E-UTRAN).

At least some aspects of the systems and methods disclosed herein may be described in relation to the 3GPP LTE, LTE-Advanced (LTE-A) and other standards (e.g., 3GPP Releases 8, 9, 10, 11 and/or 12). However, the scope of the present disclosure should not be limited in this regard. At least some aspects of the systems and methods disclosed herein may be utilized in other types of wireless communication systems.

A wireless communication device may be an electronic device used to communicate voice and/or data to a base station, which in turn may communicate with a network of devices (e.g., public switched telephone network (PSTN), the Internet, etc.). In describing systems and methods herein, a wireless communication device may alternatively be referred to as a mobile station, a UE, an access terminal, a subscriber station, a mobile terminal, a remote station, a user terminal, a terminal, a subscriber unit, a mobile device, etc. Examples of wireless communication devices include cellular phones, smart phones, personal digital assistants (PDAs), laptop computers, netbooks, e-readers, wireless modems, etc. In 3GPP specifications, a wireless communication device is typically referred to as a UE. However, as the scope of the present disclosure should not be limited to the 3GPP standards, the terms "UE" and "wireless communication device" may be used interchangeably herein to mean the more general term "wireless communication device." A UE may also be more generally referred to as a terminal device.

In 3GPP specifications, a base station is typically referred to as a Node B, an evolved Node B (eNB), a home enhanced or evolved Node B (HeNB) or some other similar terminology. As the scope of the disclosure should not be limited to 3GPP standards, the terms "base station," "Node B," "eNB," and "HeNB" may be used interchangeably herein to mean the more general term "base station." Furthermore, the term "base station" may be used to denote an access point. An access point may be an electronic device that provides access to a network (e.g., Local Area Network (LAN), the Internet, etc.) for wireless communication devices. The term "communication device" may be used to denote both a wireless communication device and/or a base station. An eNB may also be more generally referred to as a base station device.

It should be noted that as used herein, a "cell" may be any communication channel that is specified by standardization or regulatory bodies to be used for International Mobile Telecommunications-Advanced (IMT-Advanced) and all of it or a subset of it may be adopted by 3GPP as licensed bands (e.g., frequency bands) to be used for communication between an eNB and a UE. It should also be noted that in E-UTRA and E-UTRAN overall description, as used herein, a "cell" may be defined as "combination of downlink and optionally uplink resources." The linking between the carrier frequency of the downlink resources and the carrier frequency of the uplink resources may be indicated in the system information transmitted on the downlink resources.

"Configured cells" are those cells of which the UE is aware and is allowed by an eNB to transmit or receive information. "Configured cell(s)" may be serving cell(s). The UE may receive system information and perform the required measurements on all configured cells. "Configured cell(s)" for a radio connection may include a primary cell and/or no, one, or more secondary cell(s). "Activated cells" are those configured cells on which the UE is transmitting and receiving. That is, activated cells are those cells for which the UE monitors the physical downlink control channel (PDCCH) and in the case of a downlink transmission, those cells for which the UE decodes a physical downlink shared channel (PDSCH). "Deactivated cells" are those configured cells that the UE is not monitoring the transmission PDCCH. It should be noted that a "cell" may be described in terms of differing dimensions. For example, a "cell" may have temporal, spatial (e.g., geographical) and frequency characteristics.

The systems and methods disclosed may involve carrier aggregation (CA). Carrier aggregation refers to the concurrent utilization of more than one carrier. In carrier aggregation, more than one cell may be aggregated to a UE. In one example, carrier aggregation may be used to increase the effective bandwidth available to a UE. The same TDD uplink-downlink (UL/DL) configuration has to be used for TDD CA in Release-10, and for intra-band CA in Release-11. In Release-11, inter-band TDD CA with different TDD UL/DL configurations is supported. The inter-band TDD CA with different TDD UL/DL configurations may provide the flexibility of a TDD network in CA deployment. Furthermore, enhanced interference management with traffic adaptation (eIMTA) (also referred to as dynamic UL/DL reconfiguration) may allow flexible TDD UL/DL reconfiguration based on the network traffic load.

It should be noted that the term "concurrent" and variations thereof as used herein may denote that two or more events may overlap each other in time and/or may occur near in time to each other. Additionally, "concurrent" and variations thereof may or may not mean that two or more events occur at precisely the same time.

The Licensed-Assisted Access (LAA) supports deployment of LTE in unlicensed spectrum. In an LAA network, the LAA subframe transmission is in opportunistic manner. Thus, listen before talk (LBT) with clear channel assessment (CCA) is required before an LAA transmission in most regulatory domains. The downlink (DL) only LAA was specified in LTE release-13. Some behaviors of uplink (UL) LAA are defined herein.

Unlike WiFi device, a LTE UL transmission is scheduled by an eNB with an uplink grant. At the same time, LBT is needed, unlike a non-LAA carrier. Therefore, an uplink transmission procedure should be designed considering these aspects. However, the detailed design of the uplink transmission procedure for LAA carriers has not been defined.

A UE and eNB may switch uplink control information (UCI) reporting schemes depending on whether or not the UE is configured with simultaneous physical uplink control channel (PUCCH) and physical uplink shared channel (PUSCH) transmissions. Whether trigger-based UCI transmission is performed or not may be based on the configuration of simultaneous PUCCH and PUSCH transmissions. Whether or not a PUSCH-like PUCCH is used for UCI transmission may be based on the configuration of simultaneous PUCCH and PUSCH transmissions.

Various examples of the systems and methods disclosed herein are now described with reference to the Figures, where like reference numbers may indicate functionally similar elements. The systems and methods as generally described and illustrated in the Figures herein could be arranged and designed in a wide variety of different implementations. Thus, the following more detailed description of several implementations, as represented in the Figures, is not intended to limit scope, as claimed, but is merely representative of the systems and methods.

FIG. 1 is a block diagram illustrating one implementation of one or more eNBs 160 and one or more UEs 102 in which systems and methods for uplink LAA operations may be implemented. The one or more UEs 102 communicate with one or more eNBs 160 using one or more antennas 122a-n. For example, a UE 102 transmits electromagnetic signals to the eNB 160 and receives electromagnetic signals from the eNB 160 using the one or more antennas 122a-n. The eNB 160 communicates with the UE 102 using one or more antennas 180a-n.

The UE 102 and the eNB 160 may use one or more channels 119, 121 to communicate with each other. For example, a UE 102 may transmit information or data to the eNB 160 using one or more uplink channels 121. Examples of uplink channels 121 include a PUCCH and a PUSCH, etc. The one or more eNBs 160 may also transmit information or data to the one or more UEs 102 using one or more downlink channels 119, for instance. Examples of downlink channels 119 include a PDCCH, a PDSCH, etc. Other kinds of channels may be used.

Each of the one or more UEs 102 may include one or more transceivers 118, one or more demodulators 114, one or more decoders 108, one or more encoders 150, one or more modulators 154, a data buffer 104 and a UE operations module 124. For example, one or more reception and/or transmission paths may be implemented in the UE 102. For convenience, only a single transceiver 118, decoder 108, demodulator 114, encoder 150 and modulator 154 are illustrated in the UE 102, though multiple parallel elements (e.g., transceivers 118, decoders 108, demodulators 114, encoders 150 and modulators 154) may be implemented.

The transceiver 118 may include one or more receivers 120 and one or more transmitters 158. The one or more receivers 120 may receive signals from the eNB 160 using one or more antennas 122a-n. For example, the receiver 120 may receive and downconvert signals to produce one or more received signals 116. The one or more received signals 116 may be provided to a demodulator 114. The one or more transmitters 158 may transmit signals to the eNB 160 using one or more antennas 122a-n. For example, the one or more transmitters 158 may upconvert and transmit one or more modulated signals 156.

The demodulator 114 may demodulate the one or more received signals 116 to produce one or more demodulated signals 112. The one or more demodulated signals 112 may be provided to the decoder 108. The UE 102 may use the decoder 108 to decode signals. The decoder 108 may produce decoded signals 110, which may include a UE-decoded signal 106 (also referred to as a first UE-decoded signal 106). For example, the first UE-decoded signal 106 may comprise received payload data, which may be stored in a data buffer 104. Another signal included in the decoded signals 110 (also referred to as a second UE-decoded signal 110) may comprise overhead data and/or control data. For example, the second UE-decoded signal 110 may provide data that may be used by the UE operations module 124 to perform one or more operations.

In general, the UE operations module 124 may enable the UE 102 to communicate with the one or more eNBs 160. The UE operations module 124 may include one or more of a UE uplink LAA module 126.

The UE uplink LAA module 126 may perform UL LAA operations. UL LAA operations may include uplink channel access procedures, uplink contention window value adjustments, uplink transmit power control, UCI transmission for LAA SCell, UL-SCH transmission on LAA SCell, etc.

Downlink and uplink transmissions may be organized into radio frames with a 10 millisecond (ms) duration. For a frame structure Type 1 (e.g., FDD), each 10 ms radio frame is divided into ten equally sized sub-frames. Each sub-frame includes two equally sized slots. For a frame structure Type 2 (e.g., TDD), each 10 ms radio frame includes two half-frames of 5 ms each. Each half-frame includes eight slots of length 0.5 ms and three special fields: DwPTS, GP and UpPTS. The length of DwPTS and UpPTS is configurable subject to the total length of DwPTS, GP and UpPTS being equal to 1 ms. Additional details about frame structure are discussed in connection with FIG. 4.

Both 5 ms and 10 ms switch-point periodicity are supported. Subframe 1 in all configurations and subframe 6 in a configuration with 5 ms switch-point periodicity include DwPTS, GP and UpPTS. Subframe 6 in a configuration with 10 ms switch-point periodicity includes DwPTS only. All other subframes include two equally sized slots.

In LTE license access, subframes are classified into 2 types of subframes. One is the normal subframe that contains only either one of DL transmission and UL transmission. LTE license access with FDD has only the normal subframe. The other is the special subframe that contains three fields DwPTS, GP and UpPTS. DwPTS and UpPTS are durations reserved for DL transmission and UL transmission, respectively.

LTE license access with TDD can have the special subframe as well as the normal subframe. The lengths of DwPTS, GP and UpPTS can be configured by using a special subframe configuration. Any one of the following ten configurations may be set as a special subframe configuration.

1) Special subframe configuration 0: DwPTS includes 3 Orthogonal Frequency Division Multiplexing (OFDM) symbols. UpPTS includes 1 single carrier frequency-division multiple access (SC-FDMA) symbol.

2) Special subframe configuration 1: DwPTS includes 9 OFDM symbols for normal cyclic prefix (CP) and 8 OFDM symbols for extended CP. UpPTS includes 1 SC-FDMA symbol.

3) Special subframe configuration 2: DwPTS includes 10 OFDM symbols for normal CP and 9 OFDM symbols for extended CP. UpPTS includes 1 SC-FDMA symbol.

4) Special subframe configuration 3: DwPTS includes 11 OFDM symbols for normal CP and 10 OFDM symbols for extended CP. UpPTS includes 1 SC-FDMA symbol.

5) Special subframe configuration 4: DwPTS includes 12 OFDM symbols for normal CP and 3 OFDM symbols for extended CP. UpPTS includes 1 SC-FDMA symbol for normal CP and 2 SC-FDMA symbol for extended CP.

6) Special subframe configuration 5: DwPTS includes 3 OFDM symbols for normal CP and 8 OFDM symbols for extended CP. UpPTS includes 2 SC-FDMA symbols.

7) Special subframe configuration 6: DwPTS includes 9 OFDM symbols. UpPTS includes 2 SC-FDMA symbols.

8) Special subframe configuration 7: DwPTS includes 10 OFDM symbols for normal CP and 5 OFDM symbols for extended CP. UpPTS includes 2 SC-FDMA symbols.

9) Special subframe configuration 8: DwPTS includes 11 OFDM symbols. UpPTS includes 2 SC-FDMA symbols. Special subframe configuration 8 can be configured only for normal CP.

10) Special subframe configuration 9: DwPTS includes 6 OFDM symbols. UpPTS includes 2 SC-FDMA symbols. Special subframe configuration 9 can be configured only for normal CP.

Frame structure Type 3 may be applicable to LAA secondary cell operation with normal cyclic prefix only. The 10 subframes within a radio frame are available for downlink transmissions. Downlink transmissions occupy one or more consecutive subframes, starting anywhere within a subframe and ending with the last subframe either fully occupied or one of the DwPTS durations and structures.

For a UE 102 not capable of UL LAA, if the UE 102 is configured with an LAA secondary cell (SCell), the UE 102 may apply physical layer procedures assuming frame structure type 1 for the LAA SCell unless stated otherwise.

In the downlink, the OFDM access scheme may be employed. In the downlink, physical downlink control channel (PDCCH), enhanced physical downlink control channel (EPDCCH), physical downlink shared channel (PDSCH) and the like may be transmitted. A downlink radio frame may include multiple pairs of downlink resource blocks (RBs). The downlink RB pair is a unit for assigning downlink radio resources, defined by a predetermined bandwidth (RB bandwidth) and a time slot. Two slots (i.e., slot0 and slot1) equal one subframe. The downlink RB pair includes two downlink RBs that are continuous in the time domain.

The downlink RB includes twelve sub-carriers in frequency domain and seven (for normal CP) or six (for extended CP) OFDM symbols in time domain. A region defined by one sub-carrier in frequency domain and one OFDM symbol in time domain is referred to as a resource element (RE) and is uniquely identified by the index pair (k,l) in a slot, where k and l are indices in the frequency and time domains, respectively. While downlink subframes in one component carrier (CC) are discussed herein, downlink subframes are defined for each CC and downlink subframes are substantially in synchronization with each other among CCs. An example of a resource grid in the downlink is discussed in connection with FIG. 5.

In the uplink, a Single-Carrier Frequency Division Multiple Access (SC-FDMA) access scheme may be employed. In the uplink, PUCCH, PDSCH, Physical Random Access Channel (PRACH) and the like may be transmitted. An uplink radio frame may include multiple pairs of uplink resource blocks. The uplink RB pair is a unit for assigning uplink radio resources, defined by a predetermined bandwidth (RB bandwidth) and a time slot. Two slots (i.e., slot0 and slot1) equal one subframe. The uplink RB pair includes two uplink RBs that are continuous in the time domain.

The uplink RB may include twelve sub-carriers in frequency domain and seven (for normal CP) or six (for extended CP) SC-FDMA symbols in time domain. A region defined by one sub-carrier in the frequency domain and one SC-FDMA symbol in the time domain is referred to as a RE and is uniquely identified by the index pair (k,l) in a slot, where k and l are indices in the frequency and time domains respectively. While uplink subframes in one component carrier (CC) are discussed herein, uplink subframes are defined for each CC. An example of a resource grid in the uplink is discussed in connection with FIG. 6.

In Carrier Aggregation (CA), two or more CCs may be aggregated to support wider transmission bandwidths (e.g., up to 100 MHz, beyond 100 MHz). A UE 102 may simultaneously receive or transmit on one or multiple CCs. Serving cells can be classified into a primary cell (PCell) and a secondary cell (S Cell).

The primary cell may be the cell, operating on the primary frequency, in which the UE 102 either performs the initial connection establishment procedure or initiates the connection re-establishment procedure, or the cell indicated as the primary cell in the handover procedure. The secondary cell may be a cell, operating on a secondary frequency, which may be configured once a Radio Resource Control (RRC) connection is established and which may be used to provide additional radio resources.

In the downlink, the carrier corresponding to the PCell is the downlink primary component carrier (DL PCC) while in the uplink it is the uplink primary component carrier (UL PCC). Similarly, in the downlink, the carrier corresponding to the SCell is the downlink secondary component carrier (DL SCC) while in the uplink it is the uplink secondary component carrier (UL SCC). The UE 102 may apply a system information acquisition (i.e., acquisition of broadcast system information) and change monitoring procedures for the PCell. For an SCell, E-UTRAN may provide, via dedicated signaling, all system information relevant for operation in an RRC_CONNECTED message when adding the SCell.

In Dual Connectivity (DC), each of two or more serving cells may belong to either one of a master cell group (MCG) or a secondary cell group (SCG). The MCG is associated with a master eNB (MeNB) while the SCG is associated with a secondary eNB (SeNB).

DC operation may be configured to utilize radio resources provided by two distinct schedulers, located in the MeNB and SeNB. In the case of DC, the UE 102 may be configured with two Medium Access Control (MAC) entities: one MAC entity for MeNB and one MAC entity for SeNB.

When a UE 102 is configured with CA in the MCG, CA principles may generally apply to the MCG. For the SCG, at least one cell in the SCG has a configured UL CC and one of them, named the primary secondary cell (PSCell), is configured with physical uplink control channel (PUCCH) resources. Unlike the CA for which a UE 102 should cope with a delay spread of up to 30.26 µs among the component carriers, two operations are defined for the DC: synchronous and asynchronous DC. In synchronous DC operation, the UE 102 can cope with a maximum reception timing difference up to at least 33 µs between cell groups (CGs). In asynchronous DC operation, the UE 102 can cope with a maximum reception timing difference up to 500 µs between CGs.

Even in the case that DC is not configured, one or more PUCCH cell group(s) can be configured. A PUCCH cell group having a PCell may be referred to as a MCG or master PUCCH cell group (MPCG). The other cell group(s) may be referred to as a SCG or secondary PUCCH cell group (SPCG). Each SCG (or SPCG) may include a PSCell, on which a PUCCH transmission(s) for the SCG (or SPCG) can be performed.

A downlink physical channel may correspond to a set of resource elements carrying information originating from higher layers. The following downlink physical channels may be defined. A physical downlink shared channel (PDSCH) may carry a transport block provided by a higher layer. The transport block may contain user data, higher layer control messages, physical layer system information. The scheduling assignment of PDSCH in a given subframe may normally be carried by PDCCH or EPDCCH in the same subframe.

A physical broadcast channel (PBCH) may carry a master information block, which is required for an initial access.

A physical multicast channel (PMCH) may carry Multimedia Broadcast Multicast Services (MBMS) related data and control information.

A physical control format indicator channel (PCFICH) may carry a control format indicator (CFI) specifying the number of OFDM symbols on which PDCCHs are mapped.

A physical downlink control channel (PDCCH) may carry a scheduling assignment (also referred to as a DL grant) or a UL grant. The PDCCH may be transmitted via the same antenna port (e.g., cell-specific reference signal (CRS) port) as the PBCH.

A physical hybrid ARQ indicator channel (PHICH) may carry UL-associated HARQ-ACK information.

An enhanced physical downlink control channel (EPDCCH) may carry a scheduling assignment or a UL grant. The EPDCCH may be transmitted via a different antenna port (e.g., demodulation reference signal (DM-RS) port) from the PBCH and PDCCH. Possible REs on which EPDCCHs are mapped may be different from those for PDCCH, though they may partially overlap.

A downlink physical signal may correspond to a set of resource elements used by the physical layer but may not carry information originating from higher layers.

A cell-specific reference signal (CRS) may be assumed to be transmitted in all downlink subframes and DwPTS. For a normal subframe with normal CP, a CRS may be mapped on REs that are located in the 1st, 2nd, and 5th OFDM symbols in each slot. A CRS may be used for demodulation of the PDSCH, channel state information (CSI) measurement and Radio Resource Management (RRM) measurement.

A CSI reference signal (CSI-RS) may be transmitted in the subframes that are configured by higher layer signaling. The REs on which a CSI-RS is mapped are also configured by higher layer signaling. A CSI-RS may be further classified into non zero power (NZP) CSI-RS and ZP (zero power) CSI-RS. A part of a ZP CSI-RS resources may be configured as a CSI-interference measurement (CSI-IM) resource, which may be used for interference measurement.

A UE-specific reference signal (UE-RS) may be assumed to be transmitted in Physical Resource Block (PRB) pairs that are allocated for the PDSCH intended to the UE 102. UE-RS may be used for demodulation of the associated PDSCH.

A Demodulation RS (DM-RS) may be assumed to be transmitted in PRB pairs that are allocated for EPDCCH transmission. DM-RS may be used for demodulation of the associated EPDCCH.

Primary/secondary synchronization signals may be transmitted to facilitate the UE's 102 cell search, which is the procedure by which the UE 102 acquires time and frequency synchronization with a cell and detects the physical layer Cell ID of that cell. E-UTRA cell search supports a scalable overall transmission bandwidth corresponding to 6 resource blocks and upwards.

A discovery signal may include CRS, primary/secondary synchronization signals NZP-CSI-RS (if configured). The UE 102 may assume a discovery signal occasion once every discovery reference signal (DRS) measurement timing configuration (DMTC)-Periodicity. The eNB 160 using cell on/off may adaptively turn the downlink transmission of a cell on and off. A cell whose downlink transmission is turned off may be configured as a deactivated SCell for a UE 102. A cell performing on/off may transmit only periodic discovery signals and UEs 102 may be configured to measure the discovery signals for RRM. A UE 102 may perform RRM measurement and may discover a cell or transmission point of a cell based on discovery signals when the UE 102 is configured with discovery-signal-based measurements.

Aspects of the uplink physical channels and uplink physical signals are described herein. An uplink physical channel may correspond to a set of resource elements carrying information originating from higher layers. The following uplink physical channels may be defined. A Physical Uplink Shared Channel (PUSCH) may carry transport block provided by higher layer. The transport block may contain user data or higher layer control messages. An uplink grant of PUSCH in a given subframe may normally be carried by PDCCH or EPDCCH several subframes before the given subframe. A Physical Uplink Control Channel (PUCCH) may carry DL-associated HARQ-ACK information, scheduling request, and/or CSI. A Physical Random Access Channel (PRACH) may carry random access preamble.

An uplink physical signal may correspond to a set of resource elements used by the physical layer but may not carry information originating from higher layers. A reference signal (RS) may include a PUSCH Demodulation reference signal (DM-RS). A PUSCH DM-RS may be assumed to be transmitted in PRB pairs that are allocated for the PUSCH transmitted by the UE 102. PUSCH DM-RS may be used for demodulation of the associated PUSCH. PUSCH DM-RS may be mapped on REs which are located in the 4th SC-FDMA symbol in each slot.

PUCCH DM-RS may be assumed to be transmitted in PRB pairs that are allocated for the PUCCH transmitted by the UE. PUCCH DM-RS may be used for demodulation of the associated PUCCH. For PUCCH format 1, 1a and 1b, PUCCH DM-RS may be mapped on REs which are located in the 3rd, 4th and 5th SC-FDMA symbols in each slot. For PUCCH format 2, 2a, 2b and 3, PUCCH DM-RS may be mapped on REs which are located in the 2nd and 6th SC-FDMA symbols in each slot. For PUCCH format 4 and 5, PUCCH DM-RS may be mapped on REs which are located in the 4th SC-FDMA symbol in each slot.

A sounding reference signal (SRS) may be transmitted in the last SC-FDMA symbol in uplink subframe or in 1 of 2 SC-FDMA symbol(s) in UpPTS.

In a UE sounding procedure, a UE 102 may transmit SRS on serving cell SRS resources based on two trigger types: trigger type 0 and trigger type 1. Trigger type 0 may include higher layer signaling. Trigger type 1 may include DCI formats 0/4/1A for frequency division duplexing (FDD) and time division duplexing (TDD) and DCI formats 2B/2C/2D for TDD.

In case both trigger type 0 and trigger type 1 SRS transmissions would occur in the same subframe in the same serving cell, the UE 102 may only transmit the trigger type 1 SRS transmission.

A UE 102 may be configured with SRS parameters for trigger type 0 and trigger type 1 on each serving cell. For trigger type 0, only a single set of SRS parameters may be used.

For trigger type 1 and DCI format 4, three sets of SRS parameters, srs-ConfigApDCI-Format4, are configured by higher layer signaling. The 2-bit SRS request field in DCI format 4 indicates the SRS parameter set given in Table 1. For trigger type 1 and DCI format 0, a single set of SRS parameters, srs-ConfigApDCI-Format0, is configured by higher layer signaling. For trigger type 1 and DCI formats 1A/2B/2C/2D, a single common set of SRS parameters, srs-ConfigApDCI-Format1a2b2c, is configured by higher layer signaling. The SRS request field is 1 bit for DCI formats 0/1A/2B/2C/2D, with a type 1 SRS triggered if the value of the SRS request field is set to '1'. A 1-bit SRS request field shall be included in DCI formats 0/1A for frame structure type 1 and 0/1A/2B/2C/2D for frame structure type 2 if the UE 102 is configured with SRS parameters for DCI formats 0/1A/2B/2C/2D by higher-layer signaling. Table 1 provides an SRS request value for trigger type 1 in DCI format 4.

TABLE 1

| Value of SRS request field | Description |
| --- | --- |
| '00' | No type 1 SRS trigger |
| '01' | The 1st SRS parameter set configured by higher layers |
| '10' | The 2nd SRS parameter set configured by higher layers |
| '11' | The 3rd SRS parameter set configured by higher layers |

Trigger type 0 SRS configuration of a UE 102 in a serving cell for SRS periodicity ($T_{SRS}$) and SRS subframe offset ($T_{offset}$) is derived using a higher layer parameter $I_{SRS}$. The periodicity $T_{SRS}$ of the SRS transmission is serving cell specific and is selected from the set {2, 5, 10, 20, 40, 80, 160, 320} ms or subframes. For the SRS periodicity $T_{SRS}$ of 2 ms in TDD serving cell, two SRS resources are configured in a half frame containing UL subframe(s) of the given serving cell.

Trigger type 1 SRS configuration of a UE 102 in a serving cell for SRS periodicity ($T_{SRS,1}$) and SRS subframe offset ($T_{offset,1}$) is derived using higher layer parameter $I_{SRS}$. The periodicity $T_{SRS,1}$ of the SRS transmission is serving cell specific and is selected from the set {2, 5, 10} ms or subframes. For the SRS periodicity $T_{SRS,1}$ of 2 ms in TDD serving cell, two SRS resources are configured in a half frame containing UL subframe(s) of the given serving cell.

There are ten transmission modes for downlink and two transmission modes for uplink. These transmission modes are illustrated in Tables 2-4.

TABLE 2

| Transmission mode | DCI format | Transmission scheme |
| --- | --- | --- |
| Mode 1 | DCI format 1A | Single antenna port |
| | DCI format 1 | Single antenna port |
| Mode 2 | DCI format 1A | Transmit diversity |
| | DCI format 1 | Transmit diversity |

TABLE 2-continued

| Transmission mode | DCI format | Transmission scheme |
|---|---|---|
| Mode 3 | DCI format 1A | Transmit diversity |
|  | DCI format 2A | Large delay Cyclic Delay Diversity (CDD) or Transmit diversity |
| Mode 4 | DCI format 1A | Transmit diversity |
|  | DCI format 2 | Closed-loop spatial multiplexing or Transmit diversity |
| Mode 5 | DCI format 1A | Transmit diversity |
|  | DCI format 1D | Multi-user Multiple-Input Multiple-Output (MIMO) |
| Mode 6 | DCI format 1A | Transmit diversity |
|  | DCI format 1B | Closed-loop spatial multiplexing using a single transmission layer |
| Mode 7 | DCI format 1A | Single-antenna port (for a single CRS port), transmit diversity (otherwise) |
|  | DCI format 1 | Single-antenna port |
| Mode 8 | DCI format 1A | Single-antenna port (for a single CRS port), transmit diversity (otherwise) |
|  | DCI format 2B | Dual layer transmission or single-antenna port |
| Mode 9 | DCI format 1A | Single-antenna port (for a single CRS port or Multimedia Broadcast Single Frequency Network (MBSFN) subframe), transmit diversity (otherwise) |
|  | DCI format 2C | Up to 8 layer transmission or single-antenna port |
| Mode 10 | DCI format 1A | Single-antenna port (for a single CRS port or MBSFN subframe), transmit diversity (otherwise) |
|  | DCI format 2D | Up to 8 layer transmission or single-antenna port |

TABLE 3

| Transmission mode | DCI format | Transmission scheme for uplink |
|---|---|---|
| Mode 1 | DCI format 0 | Single antenna port |
| Mode 2 | DCI format 0 | Single antenna port |
|  | DCI format 4 | Closed-loop spatial multiplexing |

TABLE 4

| Transmission mode | DCI format | Transmission scheme for uplink on LAA SCell |
|---|---|---|
| Mode 1 | DCI format 0A or 0B | Single antenna port |
| Mode 2 | DCI format 0A or 0B | Single antenna port |
|  | DCI format 4A or 4B | Closed-loop spatial multiplexing |

DCI formats 1, 1A, 1B, 1C, 1D, 2, 2A, 2B, 2C, and 2D may be used for DL assignment (also referred to as a DL grant). DCI formats 0, 0A, 0B, 4, 4A, and 4B may be used for UL grant. DCI formats 0B and 4B may be able to schedule PUSCH(s) in one or more consecutive subframes. The DCI formats are illustrated in Table 5.

TABLE 5

| DCI format | Use |
|---|---|
| DCI format 0 | scheduling of PUSCH in one UL cell |
| DCI format 0A | scheduling of PUSCH in one subframe of one LAA SCell |
| DCI format 0B | scheduling of PUSCH in one or more subframes of one LAA SCell |
| DCI format 1 | scheduling of one PDSCH codeword in one cell |
| DCI format 1A | compact scheduling of one PDSCH codeword in one cell and random access procedure initiated by a PDCCH order |
| DCI format 1B | compact scheduling of one PDSCH codeword in one cell with precoding information |
| DCI format 1C | very compact scheduling of one PDSCH codeword, notifying Multicast Control Channel (MCCH) change, reconfiguring TDD, and LAA common information |
| DCI format 1D | compact scheduling of one PDSCH codeword in one cell with precoding and power offset information |
| DCI format 1A | Transmit diversity |
| DCI format 2 | scheduling of up to two PDSCH codewords in one cell with precoding information |
| DCI format 2A | scheduling of up to two PDSCH codewords in one cell |
| DCI format 2B | scheduling of up to two PDSCH codewords in one cell with scrambling identity information |
| DCI format 2C | scheduling of up to two PDSCH codewords in one cell with antenna port, scrambling identity and number of layers information |
| DCI format 2D | scheduling of up to two PDSCH codewords in one cell with antenna port, scrambling identity and number of layers information and PDSCH RE Mapping and Quasi-Co-Location Indicator (PQI) information |
| DCI format 3 | transmission of Transmitter Power Control (TPC) commands for PUCCH and PUSCH with 2-bit power adjustments |
| DCI format 3A | transmission of TPC commands for PUCCH and PUSCH with single bit power adjustments |
| DCI format 4 | scheduling of PUSCH in one UL cell with multi-antenna port transmission mode |
| DCI format 4A | scheduling of PUSCH in one subframe of one LAA cell with multi-antenna port transmission mode |
| DCI format 4B | scheduling of PUSCH in one or more subframes of one LAA cell with multi-antenna port transmission mode |
| DCI format 5 | scheduling of Physical Sidelink Broadcast Channel (PSCCH), and also contains several Sidelink Control Information (SCI) format 0 fields used for the scheduling of Physical Sidelink Shared Channel (PSSCH) |

DCI format 1, 1A, 1B, 1C, 1D may include the bit fields provided in Table 6, where $N^{DL}_{RB}$ is a downlink system bandwidth of the serving cell, which is expressed in multiples of PRB (physical resource block) bandwidth.

TABLE 6

|  | DCI F 1 | DCI F 1A | DCI F 1B | DCI F 1C | DCI F 1D |
|---|---|---|---|---|---|
| Carrier Indicator Field (CIF) | 0 or 3 | 0 or 3 | 0 or 3 | N/A | 0 or 3 |
| Flag for format0/1A differentiation | N/A | 1 | N/A | N/A | N/A |
| Localized/Distributed Virtual Resource Block (VRB) assignment flag | N/A | 1 | 1 | N/A | 1 |
| Resource allocation header | 1 | N/A | N/A | N/A | N/A |
| Gap value | N/A | N/A | N/A | 0 ($N^{DL}_{RB} < 50$) or 1 (otherwise) | N/A |
| Resource block assignment | * | ** | ** | *** | ** |
| Modulation and coding scheme | 5 | 5 | 5 | 5 | 5 |
| HARQ process number | 3 (FDD PCell) or 4 (TDD PCell) | 3 (FDD PCell) or 4 (TDD PCell) | 3 (FDD PCell) or 4 (TDD PCell) | N/A | 3 (FDD PCell) or 4 (TDD PCell) |
| New data indicator | 1 | 1 | 1 | N/A | 1 |
| Redundancy version | 2 | 2 | 2 | N/A | 2 |
| TPC command for PUCCH | 2 | 2 | 2 | N/A | 2 |
| Downlink Assignment Index | 0 (FDD PCell) or 2 (otherwise) | 0 (FDD PCell) or 2 (otherwise) | 0 (FDD PCell) or 2 (otherwise) | N/A | 0 (FDD PCell) or 2 (otherwise) |
| SRS request | N/A | 0 or 1 (for TDD or LAA with UL), N/A (otherwise) | N/A | N/A | N/A |
| Downlink power offset | N/A | N/A | N/A | N/A | 1 |
| TPMI information for precoding | N/A | N/A | 2 (2 CRS ports) or 4 (4 CRS ports) | N/A | 2 (2 CRS ports) or 4 (4 CRS ports) |
| HARQ-ACK resource offset | 2 (EPDCCH) or 0 (PDCCH) | 2 (EPDCCH) or 0 (PDCCH) | 2 (EPDCCH) or 0 (PDCCH) | N/A | 2 (EPDCCH) or 0 (PDCCH) |
| SRS timing offset | N/A | 3 (for eLAA cell with UL) or 0 (otherwise) | N/A | N/A | N/A |

It should be noted that * is ceil($N^{DL}_{RB}/P$) bits, where P is determined from Table 7;  is ceil($\log_2(N^{DL}_{RB}(N^{DL}_{RB}+1)/2)$) bits; and * is ceil($\log_2(\text{floor}(N^{DL}_{VRB,gap1}/N^{step}_{RB})$ (floor($N^{DL}_{VRB,gap1}/N^{step}_{RB}$)+1)/2)) bits, where $N^{DL}_{VRB,gap1} = 2*\min(N_{gap}, N^{DL}_{RB}-N_{gap})$, where Ngap may be derived from system bandwidth of the concerned serving cell and $N^{step}_{RB}$ is determined from Table 8.

TABLE 7

| System Bandwidth (BW) $N^{DL}_{RB}$ | Precoding resource block group (PRG) size P |
|---|---|
| <=10 | 1 |
| 11-26 | 2 |
| 27-63 | 3 |
| 64-110 | 4 |

TABLE 8

| System BW $N^{DL}_{RB}$ | $N^{step}_{RB}$ |
|---|---|
| 6-49 | 2 |
| 50-110 | 4 |

DCI format 2, 2A, 2B, 2C, 2D may include the bit fields provided in Table 9. DCI format 2B, 2C and 2D as well as DCI format 1A may include a SRS timing offset field which indicates a subframe offset of an UL subframe for SRS transmission. More specifically, the timing offset for the first PUSCH subframe may be counted from subframe n+4+k from the DL assignment in subframe n, and k is signaled with 3 bits (i.e., 0 to 8 subframes). The SRS timing offset field may be combined with the SRS request field. For example, the SRS request field may have 3 bits indicating either one of "No type 1 SRS trigger" and values 1 to 7. Each of the values 1 to 7 may indicate 1, where SRS is transmitted in subframe n+k and k=3+1.

TABLE 9

| | DCI F 2 | DCI F 2A | DCI F 2B | DCI F 2C | DCI F 2D |
|---|---|---|---|---|---|
| CIF | 0 or 3 | 0 or 3 | 0 or 3 | 0 or 3 | 0 or 3 |
| Resource allocation header | 1 | 1 | 1 | 1 | 1 |
| Resource block assignment | * | * | * | * | * |
| TPC command for PUCCH | 2 | 2 | 2 | 2 | 2 |
| Downlink Assignment Index | 0 (FDD PCell) or 2 (otherwise) | 0 (FDD PCell) or 2 (otherwise) | 0 (FDD PCell) or 2 (otherwise) | 0 (FDD PCell) or 2 (otherwise) | 0 (FDD PCell) or 2 (otherwise) |
| HARQ process number | 3 (FDD PCell) or 4 (TDD PCell) | 3 (FDD PCell) or 4 (TDD PCell) | 3 (FDD PCell) or 4 (TDD PCell) | 3 (FDD PCell) or 4 (TDD PCell) | 3 (FDD PCell) or 4 (TDD PCell) |
| Scrambling identity | N/A | N/A | 1 | N/A | N/A |
| Antenna port, scrambling identity and number of layers | N/A | N/A | N/A | 3 | 3 |
| SRS request | N/A | N/A | 0 or 1 (for TDD or LAA with UL), N/A (otherwise) | 0 or 1 (for TDD or LAA with UL), N/A (otherwise) | 0 or 1 (for TDD or LAA with UL), N/A (otherwise) |
| Transport block to codeword swap flag | 1 | 1 | N/A | N/A | |
| Modulation and coding scheme (TB1) | 5 | 5 | 5 | 5 | 5 |
| New data indicator (TB1) | 1 | 1 | 1 | 1 | 1 |
| Redundancy version (TB1) | 2 | 2 | 2 | 2 | 2 |
| Modulation and coding scheme (TB2) | 5 | 5 | 5 | 5 | 5 |
| New data indicator (TB2) | 1 | 1 | 1 | 1 | 1 |
| Redundancy version (TB2) | 2 | 2 | 2 | 2 | 2 |
| PDSCH RE Mapping and Quasi-Co-Location Indicator | N/A | N/A | N/A | N/A | 2 |
| Precoding information | 3 (2 CRS ports) or 6 (4 CRS ports) | 0 (2 CRS ports) or 2 (4 CRS ports) | N/A | N/A | N/A |
| HARQ-ACK resource offset | 2 (EPDCCH) or 0 (PDCCH) | 2 (EPDCCH) or 0 (PDCCH) | 2 (EPDCCH) or 0 (PDCCH) | 2 (EPDCCH) or 0 (PDCCH) | 2 (EPDCCH) or 0 (PDCCH) |
| SRS timing offset | N/A | N/A | 3 (for eLAA cell with UL) or 0 (otherwise) | 3 (for eLAA cell with UL) or 0 (otherwise) | 3 (for eLAA cell with UL) or 0 (otherwise) |

DCI format 0, 0A, 4 and 4A may include the following bit fields as provided in Table 10. A 2-bit RV value may indicate whether RV is 0, 1, 2 or 3. For DCI format 4A, the 2-bit RV is common to both transport blocks.

TABLE 10

| | DCI F 0 | DCI F 4 | DCI F 0A | DCI F 4A |
|---|---|---|---|---|
| CIF | 0 or 3 | 0 or 3 | 0 or 3 | 0 or 3 |
| PUSCH trigger A (Flag for triggered scheduling) | N/A | N/A | 1 | 1 |
| Flag for format0/1A differentiation | 1 | N/A | N/A | N/A |
| Frequency hopping flag | 1 | N/A | N/A | N/A |
| Subframe timing offset | N/A | N/A | 4 | 4 |
| Discrete Fourier Transform-Spread-Orthogonal Frequency Division Multiplexing (DFT-S-OFDM) symbol blanking (PUSCH starting position (2 bits) and PUSCH ending symbol (1 bit)) | N/A | N/A | 3 | 3 |
| Channel access type | N/A | N/A | 1 | 1 |
| Channel access priority class | N/A | N/A | 2 | 2 |
| Resource block assignment | **** | ***** | 6 (for 20 MHz system bandwidth) | 6 (for 20 MHz system bandwidth) |
| TPC command for PUSCH | 2 | 2 | 2 | 2 |
| Cyclic shift for DM-RS and orthogonal cover code (OCC) index | 3 | 3 | 3 | 3 |
| UL index | 2 (TDD conf. 0) or 0 (otherwise) | 2 (TDD conf. 0) or 0 (otherwise) | N/A | N/A |
| Downlink Assignment Index | 2 (TDD PCell) or 0 (otherwise) | 2 (TDD PCell) or 0 (otherwise) | N/A | N/A |
| CSI request | 2 (multiple DL cells, multiple CSI processes, multiple subframe sets), 3 (more than 5 DL cells) or 1 (otherwise) | 2 (multiple DL cells, multiple CSI processes, multiple subframe sets), 3 (more than 5 DL cells) or 1 (otherwise) | 2 (multiple DL cells, multiple CSI processes, multiple subframe sets), 3 (more than 5 DL cells) or 1 (otherwise) | 2 (multiple DL cells, multiple CSI processes, multiple subframe sets), 3 (more than 5 DL cells) or 1 (otherwise) |
| SRS request | 0 or 1 | 2 | 1 | 2 |
| Resource allocation type | 1 | 1 | N/A | N/A |
| HARQ process number | N/A | N/A | 4 | 4 |
| Modulation and coding scheme (TB1) | 5 | 5 | 5 | 5 |
| New data indicator (TB1) | 1 | 1 | 1 | 1 |
| Modulation and coding scheme (TB2) | N/A | 5 | N/A | 5 |
| New data indicator (TB2) | N/A | 1 | N/A | 1 |
| Redundancy version | N/A | N/A | 2 | 2 |

TABLE 10-continued

|  | DCI F 0 | DCI F 4 | DCI F 0A | DCI F 4A |
|---|---|---|---|---|
| Precoding information | N/A | 3 (2 antenna ports) or 6 (4 antenna ports) | N/A | 3 (2 antenna ports) or 6 (4 antenna ports) |

It should be noted that in Table 10, ** is ceil(log$_2$ (N$^{UL}_{RB}$(N$^{UL}_{RB}$+1)/2)) bits. Also, *** is max(ceil(log$_2$ (N$^{UL}_{RB}$ (N$^{UL}_{RB}$+1)/2)), ceil(log$_2$(C(ceil(N$^{UL}_{RB}$/P+1), 4)))) bits, where C(n, r) is a formula for Combinations (i.e., "n choose r").

DCI format 0B and 4B may include the bit fields shown in Table 11, where N$^{max}$ subframe is the maximum number of the subframes in which PUSCH can be scheduled by a single DCI format 0B/4B. N$^{max}_{subframe}$ may be configured via higher layer signaling.

The new data indicator field and the redundancy version field for subframe N may exist unless N exceeds N$^{max}_{subframe}$. A 1-bit RV value per scheduled subframe may indicate whether RV is 0 or 2.

The RA field in DCI 0A/4A/0B/4B uses UL resource allocation type 3 and is 6 bits. The 64 code points indicated by the 6 bits include 51 values for indicating resource indication value (RIV) for contiguous interlace allocation with 10-PRB spacing, except the code points for the allocation of 7 contiguous interlaces (70 PRBs). An additional 8 code points are defined for allocation of interlaces with 5-PRB spacing and their complementary. To be more specific, the resource allocation information for uplink resource allocation type 3 indicates to a scheduled UE 102 a set of allocated resource blocks, RB$_{START}$+l+i·N where, N=⌊N$_{RB}^{UL}$/10⌋i=0, 1, . . . 9.

A resource allocation field in the scheduling grant includes a resource indication value (RIV). For 0≤RIV<N (N+1)/2, l=0, 1, . . . L−1 and the resource indication value corresponds to the starting resource block (RB$_{START}$) and the value of L (L≥1). The resource indication value is defined by, if (L−1)≤⌊N/2⌋ then RIV=N (L−1)+RB$_{START}$, else RIV=N (N−L+1)+(N−1−RB$_{START}$). For RIV≥N (N+1)/2, the resource indication value corresponds to the other set of the starting resource block (RB$_{START}$) and the set of values 1.

Subframe timing offset may indicate additional offset for timing relationship between UL grant and the first PUSCH subframe of the corresponding PUSCH subframes. More specifically, the timing offset for the first PUSCH subframe is counted from subframe n+4+k form the UL grant of subframe n, and k is signaled with 4 bits (i.e., 0 to 15 subframes).

DFT-S-OFDM symbol blanking may include information (or pieces of information) indicating whether or not the last DFT-S-OFDM symbol of the scheduled PUSCH subframes is to be occupied, and which one of the following starting position is applied to the first scheduled PUSCH subframe: start of the 1st DFT-S-OFDM symbol (symbol 0); start of the 2nd DFT-S-OFDM symbol (symbol 1); 25 μs after start of the 1st DFT-S-OFDM symbol (symbol 0); and 25+TA μs after start of the 1st DFT-S-OFDM symbol (symbol 0), where TA denotes a timing advance value configured by higher layer.

The channel access procedure type field may indicate whether LBT category 2 or 4 applies to the UL transmission. The priority class field may indicate channel access priority class p. The number of scheduled subframes field may indicate the number of actually scheduled subframes N starting the first subframe among N$^{max}_{subframe}$ subframes.

For DCI format 4A/4B, 2-bit SRS triggering field (SRS request value for trigger type 1) may indicate one of the four states: no SRS triggering, the 1st set, the 2nd set, and the 3rd set of RRC configured SRS parameters, and each parameter set configuration may include SRS subframe indication. For DCI format 0B, 2-bit SRS triggering field (SRS request value for trigger type 1) may indicate one of the four states: no SRS triggering, SRS transmission in the 1st, the 2nd, or the 3rd scheduled subframe. The SRS subframe location is determined relative/as an offset n to the first subframe of the multi-subframe scheduling burst according to n=mod (x, N), where x is the value of the SRS subframe indication in the SRS parameter set configuration (x∈{0,1,2,3}) and N is the number of scheduled UL subframes.

The CSI request in DCI format 0B/4B may apply to the 2nd scheduled subframe if N$^{max}_{subframe}$=2, and otherwise to the penultimate scheduled subframe. A single DM-RS and OCC field is signaled for all subframes indicated in DCI formats 0B/4B. The parameter n^(2) DM-RS, Lambda may apply to all indicated subframes.

TABLE 11

|  | DCI F 0B | DCI F 4B |
|---|---|---|
| CIF | 0 or 3 | 0 or 3 |
| PUSCH trigger A (Flag for triggered scheduling) | 1 | 1 |
| Flag for format0/1A differentiation | N/A | N/A |
| Frequency hopping flag | N/A | N/A |
| Subframe timing offset | 4 | 4 |
| DFT-S-OFDM symbol blanking (PUSCH starting position (2 bits) and PUSCH ending symbol (1 bit)) | 3 | 3 |
| Channel access type | 1 | 1 |
| Channel access priority class | 2 | 2 |
| The number of scheduled subframes | 1 (up to 2 subframes), 2 (otherwise) | 1 (up to 2 subframes), 2 (otherwise) |
| Resource block assignment | 6 (for 20 MHz system bandwidth) | 6 (for 20 MHz system bandwidth) |
| TPC command for PUSCH | 2 | 2 |
| Cyclic shift for DM-RS and OCC index | 3 | 3 |
| UL index | N/A | N/A |
| Downlink Assignment Index | N/A | N/A |
| CSI request | 2 (multiple DL cells, multiple CSI processes, multiple subframe sets), 3 (more than 5 DL cells) or 1 (otherwise) | 2 (multiple DL cells, multiple CSI processes, multiple subframe sets), 3 (more than 5 DL cells) or 1 (otherwise) |
| SRS request | 1 | 2 |
| Resource allocation type | N/A | N/A |
| HARQ process number | 4 | 4 |
| Modulation and coding scheme (TB1) | 5 | 5 |
| Modulation and coding scheme (TB2) | N/A | 5 |
| New data indicator (TB1, subframe1) | 1 | 1 |
| New data indicator (TB2, subframe1) | N/A | 1 |
| New data indicator (TB1, subframe2) | 1 | 1 |
| New data indicator (TB2, subframe2) | N/A | 1 |
| New data indicator (TB1, subframe3) | 1 | 1 |
| New data indicator (TB2, subframe3) | N/A | 1 |
| New data indicator (TB1, subframe4) | 1 | 1 |
| New data indicator (TB2, subframe4) | N/A | 1 |

TABLE 11-continued

|  | DCI F 0B | DCI F 4B |
|---|---|---|
| Redundancy version (subframe1) | 1 | 1 |
| Redundancy version (subframe2) | 1 | 1 |
| Redundancy version (subframe3) | 1 | 1 |
| Redundancy version (subframe4) | 1 | 1 |
| Precoding information | N/A | 3 (2 antenna ports) or 6 (4 antenna ports) |

Modulation and coding scheme (MCS) 0-28 indicated to the UE 102 in DCI formats 0A/4A/0B/4B are interpreted according to the uplink MCS table for modulation and TBs. Transport block (TB) disabling is indicated if MCS 29 is indicated for the corresponding TB in DCI formats 4A/4B. The disabling applies for all scheduled subframes for DCI format 4B. An aperiodic CSI report without the uplink shared channel (UL-SCH) is triggered when the UE 102 receives DCI formats 0A/0B with MCS 29 and an aperiodic CSI trigger. An aperiodic CSI report without UL-SCH is triggered when the UE 102 receives DCI formats 4A/4B with MCS 29 for both TBs and an aperiodic CSI trigger. The UE 102 may not be expected to receive an aperiodic CSI only request if more than one subframe is scheduled with DCI formats 0B/4B.

DCI 0A/4A/0B/4B may include a single bit (i.e., flag for triggered grant) to indicate whether the UL grant is a triggered grant or not.

Common control signaling for frame structure type 3 is also described herein. If a UE 102 detects PDCCH with DCI CRC scrambled by CC-RNTI (also referred to as C-PDCCH) in subframe n−1 or subframe n of an LAA Scell, the UE 102 may assume the configuration of occupied OFDM symbols in subframe n of the LAA Scell according to the 'Subframe configuration for LAA' field in the detected DCI in subframe n−1 or subframe n.

The 'Subframe configuration for LAA' field may indicate the configuration of occupied OFDM symbols (i.e., OFDM symbols used for transmission of downlink physical channels and/or physical signals) in a current and/or the next subframe according to Table 12.

TABLE 12

| Value of 'Subframe configuration for LAA' field in current subframe | Configuration of occupied OFDM symbols (current subframe, next subframe) |
|---|---|
| 0000 | (—, 14) |
| 0001 | (—, 12) |
| 0010 | (—, 11) |
| 0011 | (—, 10) |
| 0100 | (—, 9) |
| 0101 | (—, 6) |
| 0110 | (—, 3) |
| 0111 | (14, *) |
| 1000 | (12, —) |
| 1001 | (11, —) |
| 1010 | (10, —) |
| 1011 | (9, —) |
| 1100 | (6, —) |
| 1101 | (3, —) |
| 1110 | reserved |
| 1111 | reserved |

NOTE:
(—, Y) means UE may assume the first Y symbols are occupied in next subframe and other symbols in the next subframe are not occupied.
(X, —) means UE may assume the first X symbols are occupied in current subframe and other symbols in the current subframe are not occupied.
(X, *) means UE may assume the first X symbols are occupied in current subframe, and at least the first OFDM symbol of the next subframe is not occupied.

If the configuration of occupied OFDM symbols for subframe n is indicated by the Subframe configuration for LAA field in both subframe n−1 and subframe n, the UE 102 may assume that the same configuration of occupied OFDM symbols is indicated in both subframe n−1 and subframe n.

If a UE 102 detects PDCCH with DCI CRC scrambled by CC-RNTI in subframe n, and the UE 102 does not detect PDCCH with DCI CRC scrambled by CC-RNTI in subframe n−1, and if the number of occupied OFDM symbols for subframe n indicated by the Subframe configuration for LAA field in subframe n is less than 14, the UE 102 is not required to receive any physical channels or signals in subframe n.

A UE 102 is not required to use subframe n for updating CSI measurement, if the UE 102 does not detect PDCCH with DCI CRC scrambled by CC-RNTI in subframe n−1, or if the UE 102 does not detect PDCCH with DCI CRC scrambled by CC-RNTI in subframe n.

The UE 102 may detect PDCCH with DCI CRC scrambled by CC-RNTI by monitoring the following PDCCH candidates according to DCI Format 1C. One PDCCH candidate at aggregation level L=4 with the control channel elements (CCEs) corresponding to the PDCCH candidate given by CCEs numbered 0, 1, 2, 3. One PDCCH candidate at aggregation level L=8 with the CCEs corresponding to the PDCCH candidate given by CCEs numbered 0, 1, 2, 3, 4, 5, 6, 7.

If a serving cell is an LAA SCell, and if the higher layer parameter subframeStartPosition for the SCell indicates 's07', and if the UE 102 detects PDCCH/EPDCCH intended for the UE 102 starting in the second slot of a subframe, the UE 102 may assume that OFDM symbols in the first slot of the subframe are not occupied, and all OFDM symbols in the second slot of the subframe are occupied.

If subframe n is a subframe in which OFDM symbols in the first slot are not occupied, the UE 102 may assume that all the OFDM symbols are occupied in subframe n+1.

PDCCH with DCI CRC scrambled by CC-RNTI may also include 5-bit information field indicating a pair of values (UL burst duration and offset K). UL burst duration may be the number of consecutive UL subframes belonging to the same channel occupancy, with the DL subframes in the same channel occupancy signaling the UL burst duration. Offset K may be the number of subframes to the start of an indicated UL burst from the start of the subframe carrying the C-PDCCH.

The LBT procedure for any UL subframe from the subframe in which C-PDCCH was received up to and including all subframes until the end of the signaled UL burst duration, for which the eNB 160 had already indicated to perform Category 4 LBT, can be switched to an LBT based on 25 us CCA. The UE 102 may not be allowed to switch to 25 us CCA if only part of a set of contiguously scheduled subframes without gap appears in the UL burst indication. The UE 102 may not be required to receive any DL signals/channels in a subframe indicated to be a UL subframe on the carrier so that the UE 102 can save power consumption. The code points of the 5-bit information field may include all combinations of { {1,2,3,4,6},{1,2,3,4,5,6} } and a state indicating no signaling of burst and offset.

PDCCH with DCI CRC scrambled by CC-RNTI may also include 1-bit information field (PUSCH trigger B) indicating whether to trigger UL transmission(s) which was scheduled by a triggered grant.

Figure 7:
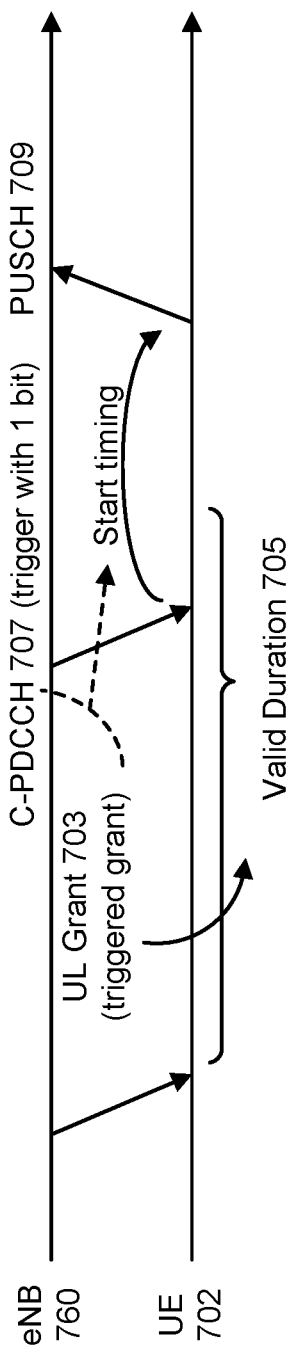
FIG. 7 is an example illustrating a triggered grant.

A triggered grant (also referred to as a two-stage grant) is also described herein. An example of a triggered grant is shown in FIG. 7. If a UL grant in subframe n is not a triggered grant, the UE 102 transmits, in subframe n+k+4, the corresponding UL transmission subject to LBT. If a UL grant in subframe n is a triggered grant, the UE 102 transmits, after receiving a triggering C-PDCCH, the corresponding UL transmission subject to LBT. In other words, if it is a triggered grant, the UE 102 may transmit after receiving a 1 bit PUSCH trigger B (e.g., values 1 and 0 indicating triggering and not triggering, respectively) in the PDCCH DCI scrambled with CC-RNTI in a subframe received after the subframe carrying the UL grant.

The timing between the 2nd trigger transmitted in subframe N and the earliest UL transmission may depend on a UE 102 capability, if the earliest UL transmission is before subframe N+4 (UE 102 capability signaling between transmission in subframe N+1 and N+2 and N+3). The 4 bit field subframe timing offset in DCI format 0A/4A/0B/4B for the triggered grant is reused to indicate the timing of UL transmission. When the UE 102 may transmit after reception of the trigger is signaled to the UE, 2 bits out of 4 bits are reused to indicate X, where having received a trigger in subframe N, the UE 102 is allowed to start transmission in subframe N+X+Y. X∈{0,1,2,3} is indicated reusing the 2 bits in the DCI. Y is given by the UL burst offset in the C-PDCCH DCI scrambled by CC-RNTI in the same subframe where the trigger is transmitted (i.e., the same C-PDCCH as the one which triggers with the 1 bit trigger).

The UE 102 receives signaling in the first DCI 0A/4A/0B/4B grant indicating the number of subframes after which the grant becomes invalid reusing remaining 2 bits out of the 4 bits. The initial grant becomes invalid if M ms after the initial grant, no valid trigger has been received. M∈{8,12,16,20} is indicated reusing the 2 bits. Even when the UL transmission is based on the triggered grant, the UE 102 follows the LBT type indicated by the UL grant.

In other words, for a serving cell that is a LAA SCell, a UE 102 may have to perform a corresponding PUSCH transmission based on the following: upon detection of an PDCCH/EPDCCH with DCI format 0A/0B/4A/4B and with 'PUSCH trigger A' field set to '0' in subframe n intended for the UE, or upon detection of PDCCH/EPDCCH with DCI format 0A/0B/4A/4B and with 'PUSCH trigger A' field set to '1' in the most recent (or the earliest) subframe from subframe n-v intended for the UE, and upon detection of PDCCH with DCI CRC scrambled by CC-RNTI and with 'PUSCH trigger B' field set to '1' in subframe n.

The PUSCH transmission may be conditioned on the channel access procedures described in clause 15.2.1, in subframe(s) n+l+k+i with i=0, 1, . . . , N−1 according to the PDCCH/EPDCCH and HARQ process ID mod($n_{HARQ-ID}$+i,$N_{HARQ}$). In this case, N=1 for DCI format 0A/4A, and the value of N is determined by the 'number of scheduled subframes' field in the corresponding DCI format 0B/4B. The UE 102 may be configured with the maximum value of N by higher layer parameter maxNumberOfficheSubframes-Format0B for DCI format 0B and higher layer parameter maxNumberOfficheSubframes-Format4B for DCI format 4B.

The value of k is determined by the scheduling delay field in the corresponding DCI 0A/0B/4A/4B. The value of $n_{HARQ\_ID}$ is determined by the HARQ process number field in the corresponding DCI format 0A/0B/4A/4B and $N_{HARQ}$=16.

For 'PUSCH trigger A' field set to '0' in the corresponding DCI format 0A/0B/4A/4B, l=4. Otherwise, the value of l is the UL offset as determined by the 'UL configuration for LAA' field in the corresponding DCI with CRC scrambled by CC-RNTI according to the procedure in subclause 13A, and 'PUSCH trigger B' field set to '1', the value of v is determined by the validation duration field in the corresponding PDCCH/EPDCCH with DCI format 0A/0B/4A/4B, and 'PUSCH trigger A' field set to '1', and the smallest value of l+k supported by the UE 102 is included in the UE-EUTRA-Capability.

PUCCH format is also described herein. The following combinations of UCI on PUCCH are supported:

Format 1a for 1-bit HARQ-ACK or in case of FDD or FDD-TDD primary cell frame structure type 1 for 1-bit HARQ-ACK with positive SR.

Format 1b for 2-bit HARQ-ACK or for 2-bit HARQ-ACK with positive SR.

Format 1b for up to 4-bit HARQ-ACK with channel selection when the UE 102 is configured with more than one serving cell or, in the case of TDD, when the UE 102 is configured with a single serving cell.

Format 1 for positive SR.

Format 2 for a CSI report when not multiplexed with HARQ-ACK.

Format 2a for a CSI report multiplexed with 1-bit HARQ-ACK for normal cyclic prefix.

Format 2b for a CSI report multiplexed with 2-bit HARQ-ACK for normal cyclic prefix.

Format 2 for a CSI report multiplexed with HARQ-ACK for extended cyclic prefix.

Format 3 for up to 10-bit HARQ-ACK for FDD or FDD-TDD primary cell frame structure type 1 and for up to 20-bit HARQ-ACK for TDD and for up to 21 bit HARQ-ACK for FDD-TDD primary cell frame structure type 2.

Format 3 for up to 11-bit corresponding to 10-bit HARQ-ACK and 1-bit positive/negative Scheduling Request (SR) for FDD or FDD-TDD and for up to 21-bit corresponding to 20-bit HARQ-ACK and 1-bit positive/negative SR for TDD and for up to 22-bit corresponding to 21-bit HARQ-ACK and 1-bit positive/negative SR for FDD-TDD primary cell frame structure type 2.

Format 3 for HARQ-ACK, 1-bit positive/negative SR (if any) and CSI report(s).

Format 4 for more than 22 bits of UCI including HARQ-ACK, SR (if any) and periodic CSI report(s) (if any).

Format 5 for more than 22 bits of UCI including HARQ-ACK, SR (if any) and periodic CSI report(s) (if any).

Format 4 for more than one CSI report and SR (if any).

Format 5 for more than one CSI report and SR (if any).

Format 6 for UCI including HARQ-ACK for LAA SCell(s). PUCCH format 6 may be transmitted based in interlaced PRB assignment.

DL channel access procedures are also described herein. An eNB 160 operating LAA Scell(s) may have to perform the channel access procedures (also known as LBT) for accessing the channel(s) on which the LAA Scell(s) transmission(s) are performed.

For a category 4 (Cat-4) LBT, the eNB 160 may transmit a transmission including PDSCH on a channel on which LAA SCell(s) transmission(s) are performed after first sensing the channel to be idle during the slot durations of a defer duration $T_d$ and after the counter N is zero in step 4 below. The counter N may be adjusted by sensing the channel for additional slot duration(s) according to the steps of the procedure below.

In step 1, set N=$N_{init}$, where $N_{init}$ is a random number uniformly distributed between 0 and $CW_p$. Next, go to step 4.

In step 2, if N>0 and the eNB 160 chooses to decrement the counter, set N=N−1.

In step 3, sense the channel for an additional slot duration, and if the additional slot duration is idle, go to step 4; else, go to step 5.

In step 4, if N=0, stop; else, go to step 2.

In step 5, sense the channel during the slot durations of an additional defer duration $T_d$.

In step 6, if the channel is sensed to be idle during the slot durations of the additional defer duration $T_d$, go to step 2; else, go to step 5.

If an eNB 160 has not transmitted a transmission including PDSCH on a channel on which LAA Scell(s) transmission(s) are performed after step 4 in the procedure above, the eNB 160 may transmit a transmission including PDSCH on the channel, after sensing the channel to be idle at least in the slot durations of an additional defer duration $T_d$.

The defer duration $T_d$ includes duration $T_f=16$ us immediately followed by $m_p$ consecutive slot durations where each slot duration is $T_{sl}=9$ us, and $T_f$ includes an idle slot duration $T_{sl}$ at start of $T_f$. A slot duration $T_{sl}$ is considered to be idle if the eNB 160 senses the channel during the slot duration, and the power detected by the eNB 160 for at least 4 us within the slot duration is less than energy detection threshold $X_{Thresh}$. Otherwise, the slot duration $T_{sl}$ is considered to be busy.

$CW_{min,p} \le CW_p \le CW_{max,p}$ is the contention window. $CW_{min,p}$ and $CW_{max,p}$ are chosen during step 1 of the procedure above. $m_p$, $CW_{min,p}$, and $CW_{max,p}$ are based on channel access priority class associated with the eNB 160 transmission.

If the eNB 160 transmits discovery signal transmission(s) not including PDSCH when N>0 in the procedure above, the eNB 160 may not decrement N during the slot duration(s) overlapping with discovery signal transmission. The eNB 160 may not contiguously transmit on a channel on which the LAA SCell(s) transmission(s) are performed, for a period exceeding $T_{m\ cot,p}$. For p=3 and p=4, if the absence of any other technology sharing the carrier can be guaranteed on a long term basis (e.g., by level of regulation), $T_{m\ cot,p}=10$ ms, otherwise, $T_{m\ cot,p}=8$ ms. Table 13 shows channel access priority class parameters.

TABLE 13

| Channel Access Priority Class (p) | $m_p$ | $CW_{min,p}$ | $CW_{max,p}$ | $T_{m\ cot,p}$ | Allowed $CW_p$ sizes |
|---|---|---|---|---|---|
| 1 | 1 | 3 | 7 | 2 ms | {3, 7} |
| 2 | 1 | 7 | 15 | 3 ms | {7, 15} |
| 3 | 3 | 15 | 63 | 8 or 10 ms | {15, 31, 63} |
| 4 | 7 | 15 | 1023 | 8 or 10 ms | {15, 31, 63, 127, 255, 511, 1023} |

For Category 2 (Cat-2) LBT, an eNB 160 may transmit a transmission including discovery signal but not including PDSCH on a channel on which LAA SCell(s) transmission(s) are performed immediately after sensing the channel for at least a sensing interval $T_{drs}=25$ us, if the power detected by the eNB 160 during $T_{drs}$ is less than $X_{Thresh}$ and if the duration of the transmission is less than 1 ms.

Another kind of Category 2 LBT (e.g., one shot sensing for channel access) may be used within the maximum channel occupancy time (MCOT) that follows the above-described Category-4 LBT. If the eNB 160 has transmitted a transmission after N=0 in step 4 of the procedure above, the eNB 160 may transmit the next contiguous transmission, for duration of maximum $T_j$ (e.g., 4 msec), immediately after sensing the channel for at least a sensing interval of $T_{js}=34$ μsec, if the power detected by the eNB 160 during $T_{js}$ is less than $X_{Thresh}$, and if the total sensing and transmission time is not more than $1000 \cdot T_{mcot} + |T_{mcot}/T_j - 1| \cdot T_{js}$ μsec.

UL channel access procedures are also described herein. A UE 102 operating on LAA Scell(s) transmission(s) may have to perform the channel access procedures according to one of Type 1 or Type 2 UL channel access procedures for accessing the channel(s) on which the LAA Scell(s) transmission(s) are performed. If an UL grant scheduling a PUSCH transmission indicates Type 1 channel access procedure, the UE 102 may have to use Type 1 channel access procedure for transmitting transmissions including the PUSCH transmission unless stated otherwise in this sub clause.

If an UL grant scheduling a PUSCH transmission indicates Type 2 channel access procedure, the UE 102 may have to use Type 2 channel access procedure for transmitting transmissions including the PUSCH transmission unless stated otherwise in this sub clause. The UE 102 may have to use Type 1 channel access procedure for transmitting SRS transmissions not including a PUSCH transmission. UL channel access priority class=1 is used for SRS transmissions not including a PUSCH. Table 14 provides the channel access priority class for UL.

TABLE 14

| Channel Access Priority Class (p) | $m_p$ | $CW_{min,p}$ | $CW_{max,p}$ | $T_{m\ cot,p}$ | allowed $CW_p$ sizes |
|---|---|---|---|---|---|
| 1 | 2 | 3 | 7 | 2 ms | {3, 7} |
| 2 | 2 | 7 | 15 | 3 ms | {7, 15} |
| 3 | 3 | 15 | 1023 | 6 or 10 ms | {15, 31, 63, 127, 255, 511, 1023} |
| 4 | 7 | 15 | 1023 | 6 or 10 ms | {15, 31, 63, 127, 255, 511, 1023} |

NOTE1:
For p = 3, 4, $T_{ulmcot,p}$ = 10 ms if the higher layer parameter 'absenceOfAnyOtherTechnology-r14' indicates TRUE, otherwise, $T_{ulmcot,p}$ = 6 ms.
NOTE 2:
When $T_{ulmcot,p}$ = 6 ms it may be increased to 8 ms by inserting one or more gaps. The minimum duration of a gap shall be 100 μs. The maximum duration before including any such gap shall be 6 ms.

If the 'UL configuration for LAA' field configures an 'UL offset' 1 and an 'UL duration' d for subframe n, then the UE 102 may use channel access Type 2 for transmissions in subframes n+l+i where i=0, 1, ... d−1, irrespective of the channel access Type signaled in the UL grant for those subframes, if the end of UE 102 transmission occurs in or before subframe n+l+d−1.

If the UE 102 scheduled to transmit transmissions including PUSCH in a set subframes $n_0$, $n_1$, ... , $n_{w-1}$ using PDCCH DCI Format 0B/4B, and if the UE 102 cannot access the channel for a transmission in subframe $n_k$, the UE 102 shall attempt to make a transmission in subframe $n_{k+1}$ according to the channel access type indicated in the DCI, where k∈{0, 1, ... w−2}, and w is the number of scheduled subframes indicated in the DCI.

If the beginning of UE 102 transmission in subframe n+1 immediately follows the end of UE 102 transmission in subframe n, the UE 102 is not expected to be indicated with different channel access types for the transmissions in those subframes.

If the UE 102 is scheduled to transmit in subframes $n_0$, $n_1$, ..., $n_{w-1}$ using Type 1 channel access procedure using a PDCCH DCI Format 0B/4B, and if the UE 102 has stopped transmitting during or before subframe $n_{k1}$, $k1 \in \{0, 1, \ldots, w-2\}$, and if the channel is sensed by the UE 102 to be continuously idle after the UE 102 has stopped transmitting, the UE 102 may transmit in a later subframe $n_{k2}$, $k2 \in \{1, \ldots w-1\}$ using Type 2 channel access procedure. If the channel sensed by the UE 102 is not continuously idle after the UE 102 has stopped transmitting, the UE 102 may transmit in a later subframe $n_{k2}$, $k2 \in \{1, \ldots w-1\}$ using Type 1 channel access procedure with the UL channel access priority class indicated in the DCI.

If the UE 102 receives an UL grant and the DCI indicates a PUSCH transmission starting in subframe n using Type 1 channel access procedure, and if the UE 102 has an ongoing Type 1 channel access procedure before subframe n, then if the UL channel access priority class value $p_1$ used for the ongoing Type 1 channel access procedure is same or larger than the UL channel access priority class value $p_2$ indicated in the DCI, the UE 102 may transmit the PUSCH transmission in response to the UL grant by accessing the carrier by using the ongoing Type 1 channel access procedure. If the UL channel access priority class value $p_1$ used for the ongoing Type 1 channel access procedure is smaller than the UL channel access priority class value $p_2$ indicated in the DCI, the UE 102 shall terminate the ongoing channel access procedure.

If the UE 102 is scheduled to transmit on a set of carriers C in subframe n, and if the UL grants scheduling PUSCH transmissions on the set of carriers C indicate Type 1 channel access procedure, and if the same 'PUSCH starting position' is indicated for all carriers in the set of carriers C, then the UE 102 may transmit on carrier $c_i \in C$ using Type 2 channel access procedure if Type 2 channel access procedure is performed on carrier $c_i$ immediately before the UE 102 transmission on carrier $c_i \in C$, $i \neq j$, and if the UE 102 has accessed carrier $c_j$ using Type 1 channel access procedure, where carrier $c_j$ is selected by the UE 102 uniformly randomly from the set of carriers C before performing Type 1 channel access procedure on any carrier in the set of carriers C.

An eNB 160 may indicate Type 2 channel access procedure in the DCI of an UL grant scheduling transmission(s) including PUSCH on a carrier in subframe n, if the eNB 160 has transmitted on the carrier according to the channel access procedure, and if subframe n occurs within the time interval starting at $t_0$ and ending at $t_0 + T_{CO}$, where $T_{CO} = T_{m\_cot,p} + T_g \cdot t_0$ is the time instant when the eNB 160 has started transmission, the $T_{m\_cot,p}$ value is determined by the eNB, and $T_g$ is the total duration of all gaps of duration greater than 25 us that occur between the DL transmission of the eNB 160 and UL transmissions scheduled by the eNB, and between any two UL transmissions scheduled by the eNB 160 starting from $t_0$.

The eNB 160 shall schedule UL transmissions between $t_0$ and $t_0 + T_{CO}$ in contiguous subframes if they can be scheduled contiguously.

A Type 1 UL channel access procedure (also referred to as Category-4 LBT procedure) is also described herein. The UE 102 may transmit the transmission using Type 1 channel access procedure after first sensing the channel to be idle during the slot durations of a defer duration $T_d$; and after the counter N is zero in step 4 below. The counter N is adjusted by sensing the channel for additional slot duration(s) according to the steps described below.

In step 1, set $N=N_{init}$, where $N_{init}$ is a random number uniformly distributed between 0 and $CW_p$, and go to step 4.

In step 2, if N>0 and the UE 102 chooses to decrement the counter, set N=N−1.

In step 3, sense the channel for an additional slot duration, and if the additional slot duration is idle, go to step 4; else, go to step 5.

In step 4, if N=0, stop; else, go to step 2.

In step 5, sense the channel until either a busy slot is detected within an additional defer duration $T_d$ or all the slots of the additional defer duration $T_d$ are detected to be idle.

In step 6, if the channel is sensed to be idle during all the slot durations of the additional defer duration $T_d$, go to step 4; else, go to step 5.

If the UE 102 has not transmitted a transmission including PUSCH on a carrier on which LAA Scell(s) transmission(s) are performed after step 4 in the procedure above, the UE 102 may transmit a transmission including PUSCH on the carrier, if the channel is sensed to be idle at least in a slot duration $T_{sl}$ when the UE 102 is ready to transmit the transmission including PUSCH, and if the channel has been sensed to be idle during all the slot durations of a defer duration $T_d$ immediately before the transmission including PUSCH. If the channel has not been sensed to be idle in a slot duration $T_{sl}$ when the UE 102 first senses the channel after it is ready to transmit, or if the channel has not been sensed to be idle during any of the slot durations of a defer duration $T_d$ immediately before the intended transmission including PUSCH, the UE 102 proceeds to step 1 after sensing the channel to be idle during the slot durations of a defer duration $T_d$.

The defer duration $T_d$ includes duration 16 us ≤ $T_f$ ≤ 16 us+$T_s$ immediately followed by $m_p$ consecutive slot durations where each slot duration is 9 us ≤ $T_{sl}$ ≤ 9 us+$T_s$, and $T_f$ includes an idle slot duration $T_{sl}$ at the start of $T_f$.

A slot duration $T_{sl}$ is considered to be idle if the UE 102 senses the channel during the slot duration, and the power detected by the UE 102 for at least 4 us within the slot duration is less than energy detection threshold $X_{Thresh}$. Otherwise, the slot duration $T_{sl}$ is considered to be busy.

$CW_{min,p} \leq CW_p \leq CW_{max,p}$ is the contention window. $CW_p$ adjustment is described in sub clause 15.2.2. $CW_{min,p}$ and $CW_{max,p}$ are chosen before step 1 of the procedure above. $m_p$, $CW_{min,p}$, and $CW_{max,p}$ are based on the channel access priority class signaled to the UE. $X_{Thresh}$ is an adjustment.

A Type 2 UL channel access procedure (also referred to as Category-2 LBT procedure) is also described herein. If the UL UE 102 uses Type 2 channel access procedure for a transmission including PUSCH, the UE 102 may transmit the transmission including PUSCH immediately after sensing the channel to be idle for at least a sensing interval $T_{short\_ul}$=25 us. $T_{short\_ul}$ includes a duration $T_f$=16 us immediately followed by one slot duration $T_{sl}$=9 us and $T_f$ includes an idle slot duration $T_{sl}$ at the start of $T_f$. The channel is considered to be idle for $T_{short\_ul}$ if it is sensed to be idle during the slot durations of $T_{short\_ul}$.

A possible UL contention window adjustment procedure is also described herein. If the UE 102 transmits transmissions using Type 1 channel access procedure that are associated with channel access priority class p on a carrier, the UE 102 maintains the contention window value $CW_p$ and adjusts $CW_p$ for those transmissions before step 1 of the procedure, using the following procedure if the new data indicator (NDI) value for at least one HARQ process associated with HARQ_ID_ref is toggled, for every priority class $p \in \{1,2,3,4\}$ set $CW_p = CW_{min,p}$. Otherwise, increase $CW_p$ for every priority class $p \in \{1,2,3,4\}$ to the next higher allowed value.

HARQ_ID_ref is the HARQ process ID of UL-SCH in reference subframe $n_{ref}$. The reference subframe $n_{ref}$ is determined as follows. If the UE 102 receives an UL grant in subframe $n_g$, subframe $n_w$ is the most recent subframe before subframe $n_g$−3 in which the UE 102 has transmitted UL-SCH using Type 1 channel access procedure. If the UE 102 transmits transmissions including UL-SCH starting with subframe no and in subframes $n_0, n_1, \ldots, n_w$ and if the subframes are contiguous, reference subframe $n_{ref}$ is subframe $n_0$. Otherwise, reference subframe $n_{ref}$ is subframe $n_w$.

The UE 102 may keep the value of $CW_p$ unchanged for every priority class $p \in \{1,2,3,4\}$, if the UE 102 scheduled to transmit transmissions including PUSCH in a set subframes $n_0, n_1, \ldots, n_{w-1}$ using Type 1 channel access procedure and using DCI Format 0B/4B, and the UE 102 is not able to transmit any transmission including PUSCH in the set of subframes.

If $CW_p = CW_{max,p}$, the next higher allowed value for adjusting $CW_p$ is $CW_{max,p}$. If the $CW_p = CW_{max,p}$ is consecutively used K times for generation of $N_{init}$, $CW_p$ is reset to $CW_{min,p}$ only for that priority class p for which $CW_p = CW_{max,p}$ is consecutively used K times for generation of $N_{init}$. K is selected by UE 102 from the set of values {1, 2, . . . , 8} for each priority class $p \in \{1,2,3,4\}$.

Another possible UL contention window adjustment procedure is also described herein. For category 4 LBT for PUSCH transmission on LAA SCell, the contention window size (CWS) is adjusted per UE 102 and at UE 102 based on the following procedures at UE 102 and eNB 160. If the UE 102 fails to transmit all of the scheduled contiguous subframes with a category 4 LBT, UE 102 may keep the contention window size unchanged for all the LBT priority classes. The first subframe with UL-SCH that was transmitted at least 4 ms prior to the UL grant reception in the most recent transmitted burst of contiguous subframes that is transmitted after performing a category 4 LBT procedure is defined as the reference subframe. The HARQ ID of the reference subframe is HARQ_ID_ref.

Based on the UL grant content, if the NDI bit for at least one of the active HARQ processes (i.e., TB not disabled) of HARQ_ID_ref in the reference subframe is toggled, the contention window size at the UE 102 is reset for all the priority classes. Otherwise (i.e., HARQ_ID_ref not scheduled or NDI of the active HARQ process(es) of HARQ_ID_ref not toggled) the contention window size of all priority classes at the UE 102 is increased to the next higher value. The CWS is reset to the minimum value if the maximum CWS is used for K consecutive LBT attempts for transmission only for the priority class for which maximum CWS is used for K consecutive LBT attempts. K is selected by UE implementation from the set of values from (1, . . . , 8).

The UCI report for an LAA SCell is also described. There may be three cases. In Case 1, all LAA SCell(s) configured to the UE 102 are DL-only LAA SCell(s). In case 2, at least one LAA SCell configured to the UE 102 has UL and the UE 102 is configured with simultaneous PUCCH and PUSCH transmissions. In case 3, at least one LAA SCell configured to the UE 102 has UL and the UE 102 is not configured with simultaneous PUCCH and PUSCH transmissions.

In Case 1, HARQ-ACK for the LAA SCell(s) is transmitted on a serving cell in a licensed carrier (i.e., non-LAA serving cell). More specifically, if the UE 102 has at least one scheduled PUSCH transmission on any of non-LAA serving cell(s) in subframe n, HARQ-ACK for PDSCH on LAA SCell in subframe n−4 is transmitted via the PUSCH of the non-LAA serving cell with the smallest SCell index (e.g., sCellIndex). If there is no scheduled PUSCH in subframe n, HARQ-ACK for PDSCH on LAA SCell in subframe n−4 is transmitted on PUCCH of PCell or PSCell. In Case 2, HARQ-ACK for the LAA SCell(s) is transmitted on PUCCH of PCell or PSCell. In Case 3, HARQ-ACK for the LAA SCell(s) is transmitted on PUCCH or PUSCH of any one of LAA SCells, upon trigger by the eNB.

It should be noted that an information field for a configuration of the simultaneous PUCCH and PUSCH transmissions may be contained in an RRC information element for the PCell, PSCell or PUCCH SCell. To be more specific, E-UTRAN may configure this field for the PCell, only when the nonContiguousUL-RA-WithinCC-Info is set to be supported in the band on which PCell is configured. Likewise, E-UTRAN may configure this field for the PSCell, only when the nonContiguousUL-RA-WithinCC-Info is set to be supported in the band on which PSCell is configured. Likewise, E-UTRAN may configure this field for the PUCCH SCell, only when the nonContiguousUL-RA-WithinCC-Info is set to be supported in the band on which PUCCH SCell is configured. When it has been configured, the configuration may apply to all serving cells if cell group is not configured, otherwise may apply to the cell group including the corresponding PCell, PSCell or PUCCH SCell.

Figure 8:
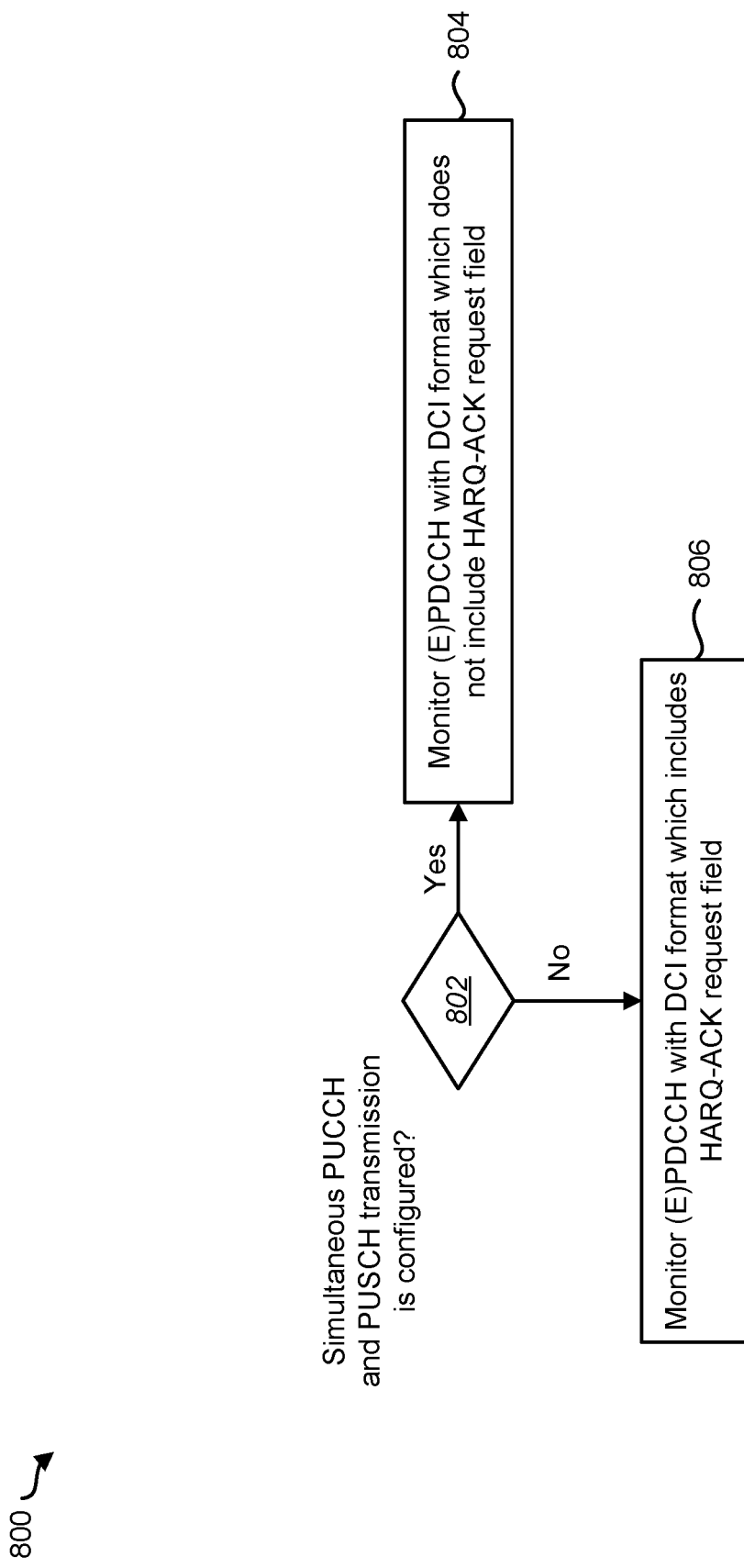
FIG. 8 is a flow diagram illustrating a method for uplink control information (UCI) reporting by a UE.

For example, the following procedure may be applied. FIG. 8 illustrates the following procedure.

If the UE 102 is configured for a single serving cell and is not configured for simultaneous PUSCH and PUCCH transmissions, then in subframe n uplink control information (UCI) may be transmitted (1) on PUCCH using format 1/1a/1b/3 or 2/2a/2b if the UE 102 is not transmitting PUSCH, or (2) on PUSCH if the UE 102 is transmitting PUSCH in subframe n unless the PUSCH transmission corresponds to a Random Access Response Grant or a retransmission of the same transport block as part of the contention based random access procedure, in which case UCI is not transmitted.

If the UE 102 is configured for a single serving cell and simultaneous PUSCH and PUCCH transmission, then in subframe n UCI may be transmitted (1) on PUCCH using format 1/1a/1b/3 if the UCI includes only HARQ-ACK and/or SR; (2) on PUCCH using format 2 if the UCI includes only periodic CSI; (3) on PUCCH using format 2/2a/2b/3 if the UCI includes periodic CSI and HARQ-ACK and if the UE 102 is not transmitting PUSCH; or (4) on PUCCH and PUSCH if the UCI includes HARQ-ACK/HARQ-ACK+SR/ positive SR and periodic/aperiodic CSI and if the UE 102 is transmitting PUSCH in subframe n, in which case the HARQ-ACK/HARQ-ACK+SR/positive SR is transmitted on PUCCH using format 1/1a/1b/3 and the periodic/aperiodic CSI transmitted on PUSCH unless the PUSCH transmission corresponds to a Random Access Response Grant or a retransmission of the same transport block as part of the contention based random access procedure, in which case periodic/aperiodic CSI is not transmitted.

If the UE 102 is configured with more than one serving cell and is not configured for simultaneous PUSCH and PUCCH transmission and if the UE 102 is not configured with LAA SCell with UL, then in subframe UCI may be transmitted (1) on PUCCH using format 1/1a/1b/3/4/5 or 2/2a/2b if the UE 102 is not transmitting PUSCH; (2) on PUSCH of the serving cell on which aperiodic CSI report is to be transmitted if the UCI includes aperiodic CSI or aperiodic CSI and HARQ-ACK; (3) on primary cell PUSCH if the UCI includes periodic CSI and/or HARQ-ACK and if the UE 102 is transmitting on the primary cell PUSCH in subframe n unless the primary cell PUSCH transmission corresponds to a Random Access Response Grant or a retransmission of the same transport block as part of the contention based random access procedure, in which case UCI is not transmitted; or (4) on PUSCH of the secondary cell with smallest SCellIndex if the UCI includes periodic CSI and/or HARQ-ACK and if the UE 102 is not transmitting PUSCH on primary cell but is transmitting PUSCH on at least one secondary cell.

If the UE 102 is configured with more than one serving cell and is not configured for simultaneous PUSCH and PUCCH transmission and if the UE 102 is configured with LAA SCell with UL and HARQ-ACK feedback in subframe n for LAA SCell is not triggered, then in the subframe n UCI may be transmitted (1) on PUCCH using format 1/1a/1b/3/4/5 or 2/2a/2b if the UE 102 is not transmitting PUSCH; (2) on PUSCH of the serving cell on which aperiodic CSI report is to be transmitted if the UCI includes aperiodic CSI or aperiodic CSI and HARQ-ACK (not including HARQ-ACK for LAA SCell); (3) on primary cell PUSCH if the UCI includes periodic CSI and/or HARQ-ACK (not including HARQ-ACK for LAA SCell) and if the UE 102 is transmitting on the primary cell PUSCH in subframe n unless the primary cell PUSCH transmission corresponds to a Random Access Response Grant or a retransmission of the same transport block as part of the contention based random access procedure, in which case UCI is not transmitted; or (4) on PUSCH of the secondary cell with smallest SCellIndex if the UCI includes periodic CSI and/or HARQ-ACK (not including HARQ-ACK for LAA SCell) and if the UE 102 is not transmitting PUSCH on primary cell but is transmitting PUSCH on at least one secondary cell.

If the UE 102 is configured with more than one serving cell and is not configured for simultaneous PUSCH and PUCCH transmission and if the UE 102 is configured with LAA SCell with UL and HARQ-ACK feedback in subframe n for LAA SCell is triggered in the subframe n−x (the details of x are explained later), then in the subframe n HARQ-ACK for non-LAA serving cells is dropped and UCI may be transmitted subject to the following: (1) on PUCCH using format 6 if the HARQ-ACK feedback in subframe n for LAA SCell is triggered via DL assignment (e.g. DCI format 1, 1A, 1B, 1C, 1D, 2, 2A, 2B, 2C, and 2D). For HARQ-ACK triggering only (HARQ-ACK triggering without scheduling PDSCH, i.e., all TBs are disabled) may be able to be indicated by using a certain code point of information field(s) in the DCI format. (2) The subframe n HARQ-ACK for non-LAA serving cells is dropped and UCI may be transmitted on PUCCH using format 6 if the HARQ-ACK feedback in subframe n for LAA SCell is triggered via group HARQ-ACK triggering DCI format (e.g., DCI format 3/3A). This DCI format includes multiple HARQ-ACK request fields (e.g., HARQ-ACK request number 1, HARQ-ACK request number 2, . . . , HARQ-ACK request number N). Each of the N HARQ-ACK request fields may contain 1 or 2 bits. If the UE 102 is configured with a HARQ-ACK request number via higher layer signaling, the UE 102 monitors the corresponding HARQ-ACK request field in this DCI format. (3) The subframe n HARQ-ACK for non-LAA serving cells is dropped and UCI may be transmitted on PUSCH of the serving cell on which aperiodic HARQ-ACK feedback is to be transmitted if the HARQ-ACK feedback in subframe n for LAA SCell is triggered via UL grant (e.g. DCI format 0, 0A, 0B, 4, 4A, and 4B).

If the UE 102 is configured with more than one serving cell and simultaneous PUSCH and PUCCH transmission, then in subframe n UCI may be transmitted subject to the following conditions: (1) on PUCCH using format 1/1a/1b/3 if the UCI includes only HARQ-ACK and/or SR; (2) on PUCCH using format 4/5 if the UCI includes only HARQ-ACK and/or SR and/or periodic CSI; (3) on PUCCH using format 2 if the UCI includes only periodic CSI corresponding to one serving cell; (4) CSI is dropped unless simultaneous HARQ-ACK and CSI transmission is configured, if the UCI includes periodic CSI and HARQ-ACK and if the UE 102 is not transmitting on PUSCH; (5) on PUCCH and primary cell PUSCH if the UCI includes HARQ-ACK and periodic CSI and the UE 102 is transmitting PUSCH on the primary cell, in which case the HARQ-ACK (including HARQ-ACK for PDSCH transmitted on LAA SCell) is transmitted on PUCCH using format 1a/1b/3 and the periodic CSI is transmitted on PUSCH unless the primary cell PUSCH transmission corresponds to a Random Access Response Grant or a retransmission of the same transport block as part of the contention based random access procedure, in which case periodic CSI is not transmitted; (6) on PUCCH and PUSCH of the secondary cell (other than a LAA SCell) with the smallest SCellIndex if the UCI includes HARQ-ACK and periodic CSI and if the UE 102 is not transmitting PUSCH on primary cell but is transmitting PUSCH on at least one secondary cell, in which case, the HARQ-ACK (including HARQ-ACK for PDSCH transmitted on LAA SCell) is transmitted on PUCCH using format 1a/1b/3 and the periodic CSI is transmitted on PUSCH; and (7) on PUCCH and PUSCH if the UCI includes HARQ-ACK/HARQ-ACK+SR/positive SR and aperiodic CSI in which case the HARQ-ACK/HARQ-ACK+SR/positive SR (including HARQ-ACK for PDSCH transmitted on LAA SCell) is transmitted on PUCCH using format 1/1a/1b/3 and the aperiodic CSI is transmitted on PUSCH of the serving cell on which aperiodic CSI report is to be transmitted.

A HARQ-ACK request field may be additionally included in DCI format(s). The HARQ-ACK request field may be included in DL assignment only. Alternatively, the HARQ-ACK request field may be included in both DL assignment and UL grant.

The HARQ-ACK request field may be present in DCI format(s) only if the UE 102 is not configured with simultaneous PUSCH and PUCCH transmissions for a cell group. Alternatively, the presence of the HARQ-ACK request field may be configured (e.g., higher-layer signaled) independently of the configuration of simultaneous PUSCH and PUCCH transmissions. In another example, a UE 102 not supporting simultaneous PUSCH and PUCCH transmissions may have to support the DCI format(s) with the HARQ-ACK request field and may have to monitor the DCI format(s) with the HARQ-ACK request field if at least one LAA cell having UL is configured.

Other examples of UCI reporting for an LAA SCell are shown in FIGS. 9A-9D and FIGS. 10A-10D. In these examples, HARQ-ACK for an LAA SCell may be able to piggyback on a non-LAA cell.

Further examples of UCI reporting for an LAA SCell are shown in FIGS. 11A-11D. In these examples, HARQ-ACK for an LAA SCell may not piggyback on a non-LAA cell if the LAA cell has PUSCH transmission.

Yet other examples of UCI reporting for an LAA SCell are shown in FIGS. 12A-12D. In these examples, HARQ-ACK for LAA SCell may be carried on a PUSCH-like PUCCH (also referred to as ePUCCH and PUCCH format 6) on an LAA SCell (i.e., simultaneous ePUCCH and PUSCH transmission is allowed even if simultaneous PUCCH and PUSCH transmission is not configured) if no PUSCH transmission exists on the LAA SCell.

Figure 13A:
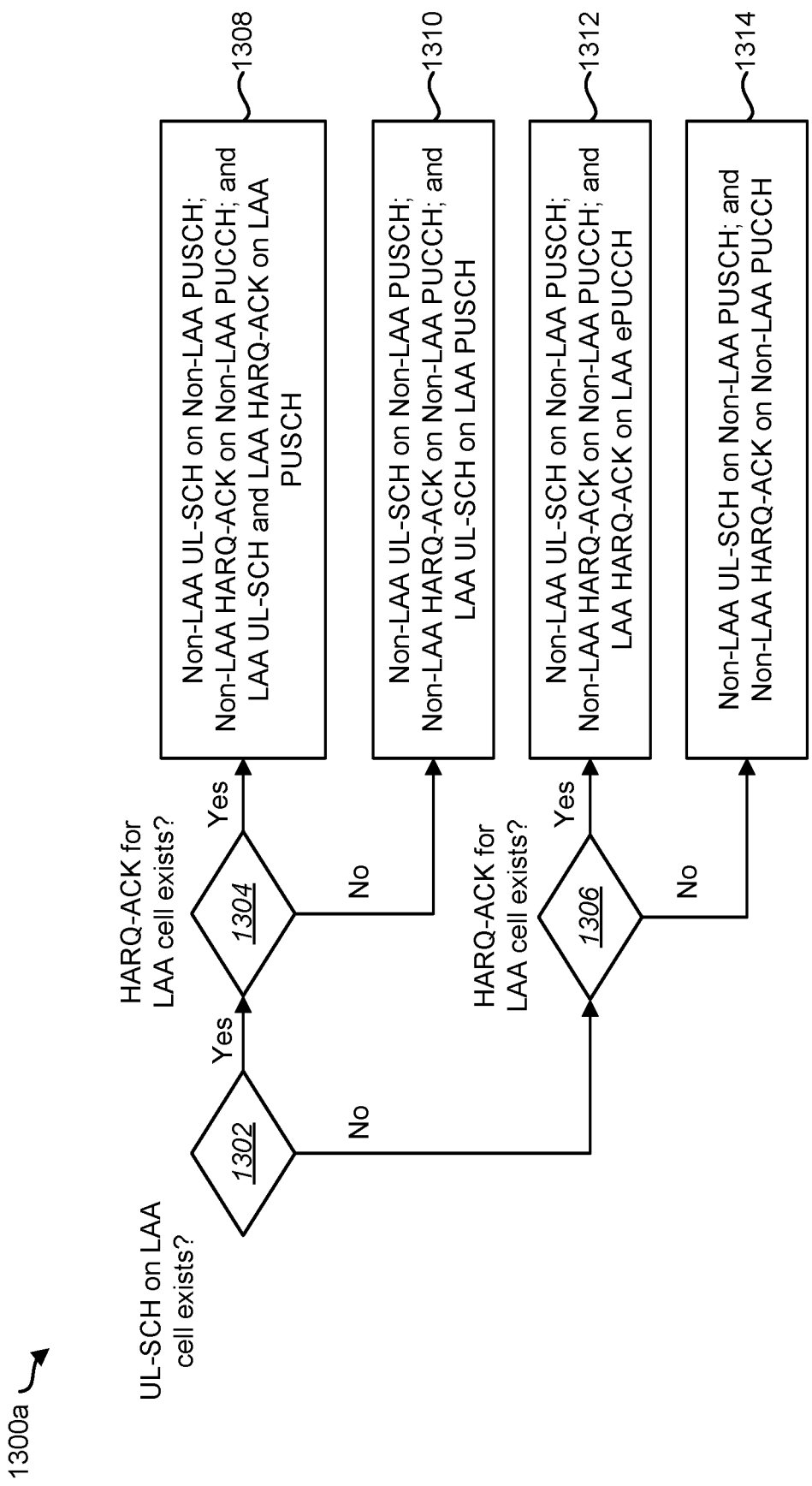
FIGS. 13A-13D are flow diagrams illustrating methods for UCI reporting by a UE where the PUSCH-like PUCCH may be used even if simultaneous PUCCH and PUSCH transmission is configured.
Figure 13B:
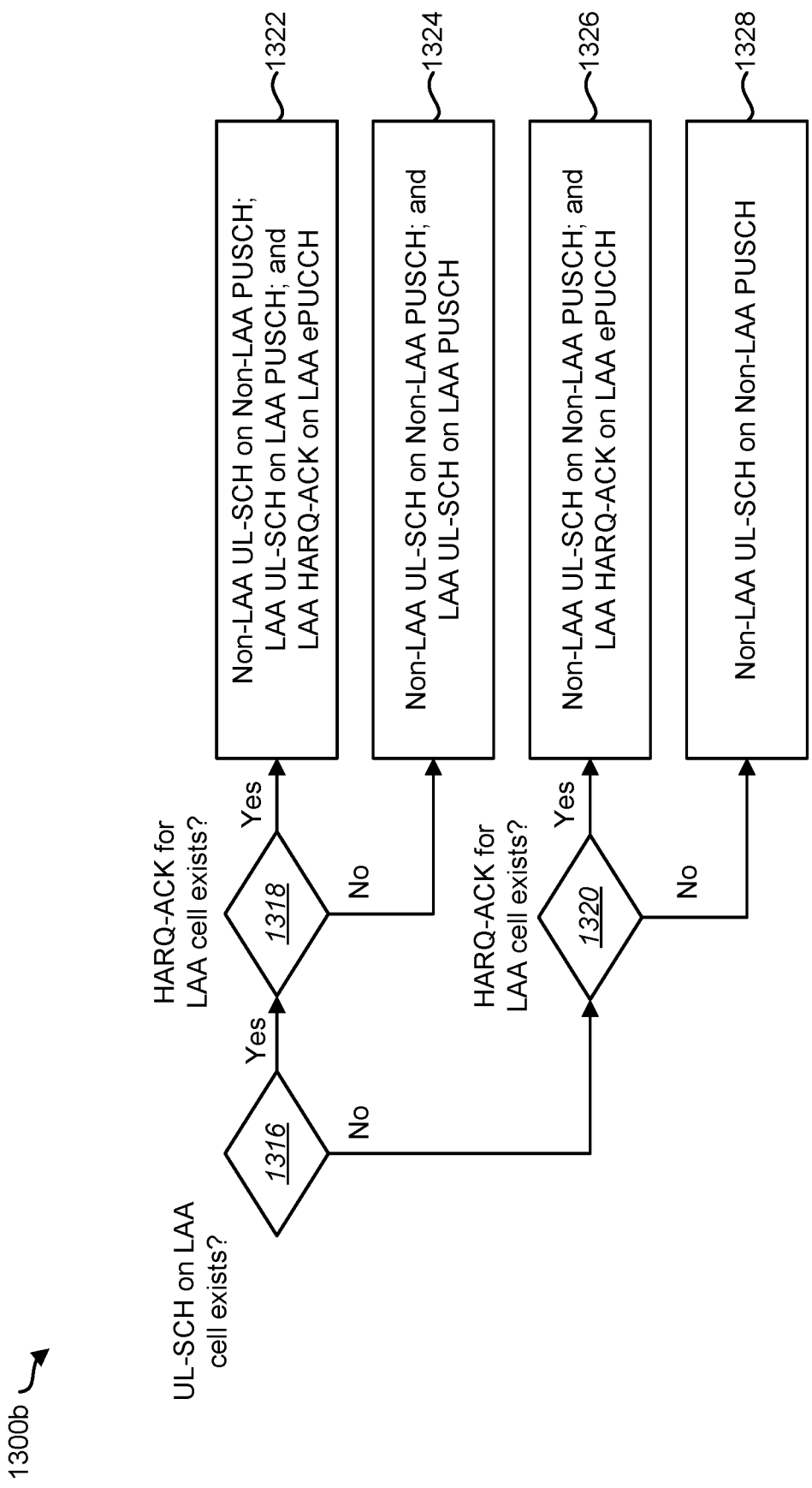

Further examples of UCI reporting for an LAA SCell are shown in FIGS. 13A-13B. In these examples, a PUSCH-like PUCCH may be used even if simultaneous PUCCH and PUSCH transmission is configured.

For the LAA SCell(s) for which HARQ-ACK is fedback, there may be several options. In Option 1, HARQ-ACKs for all HARQ processes of all LAA SCell(s) configured to the UE 102 are fedback. In Option 2, HARQ-ACKs for all HARQ processes of all LAA SCell(s) within the cell group including the serving cell that the HARQ-ACKs are transmitted are fedback. In Option 3, HARQ-ACKs for all HARQ processes of the LAA SCell that the HARQ-ACKs are transmitted are fedback. In Option 4, HARQ-ACKs for all HARQ processes of the LAA SCell that the HARQ-ACK request is triggered are fedback.

In Option 5, HARQ-ACKs for all HARQ processes of the LAA SCell(s) that is indicated by the HARQ-ACK request field are fedback. For example, several sets of LAA SCell indices are configured through a dedicated RRC message. The HARQ-ACK field may indicate one of the values, the first value corresponding to no HARQ-ACK, each of the other values corresponding to each of the LAA SCell index sets.

In Option 6, HARQ-ACKs for the HARQ process(es) that is indicated by the HARQ-ACK request field are fedback. In Option 6A, the HARQ-ACK request field indicates HARQ process number(s). HARQ-ACKs for the indicated HARQ process(es) of all LAA SCell(s) are fedback. For example, several sets of HARQ process number(s) are configured through a dedicated RRC message. The HARQ-ACK field may indicate one of the values, the first value corresponding to no HARQ-ACK, each the other values corresponding to each of the HARQ process number sets.

In Option 6B, the HARQ-ACK request field indicates combination(s) of LAA SCell(s) and HARQ process number(s). HARQ-ACKs for the indicated HARQ process(es) of the indicated LAA SCell are fedback. For example, several sets of combination(s) of LAA SCell index and HARQ process number(s) are configured through a dedicated RRC message. The HARQ-ACK field may indicate one of the values, the first value corresponding to no HARQ-ACK, each the other values corresponding to each of the sets.

An example of the HARQ-ACK request values for Option 1, 2, 3 and 4 is shown in Table 15. Another example of the HARQ-ACK request values for Option 1 to 6 is shown in Table 16. Yet another example is shown in Table 17. In this case, the value '01' may indicate that HARQ-ACK feedback for the current HARQ process is performed in a given subframe.

TABLE 15

| Value of HARQ-ACK request field | Description |
| --- | --- |
| '0' | No HARQ-ACK trigger |
| '1' | HARQ-ACK trigger |

TABLE 16

| Value of HARQ-ACK request field | Description |
| --- | --- |
| '00' | No HARQ-ACK trigger |
| '01' | The 1st HARQ-ACK feedback parameter set configured by higher layers |

TABLE 16-continued

| Value of HARQ-ACK request field | Description |
| --- | --- |
| '10' | The 2nd HARQ-ACK feedback parameter set configured by higher layers |
| '11' | The 3rd HARQ-ACK feedback parameter set configured by higher layers |

TABLE 17

| Value of HARQ-ACK request field | Description |
| --- | --- |
| '00' | No HARQ-ACK trigger |
| '01' | HARQ-ACK feedback for the current HARQ process |
| '10' | The 1st HARQ-ACK feedback parameter set configured by higher layers |
| '11' | The 2nd HARQ-ACK feedback parameter set configured by higher layers |

For Option 5 and 6, if the HARQ-ACK is triggered by multi-subframe scheduling grant (e.g., DCI format 0B or 4B), the HARQ-ACK request field may also indicate one UL subframe out of the multiple subframes scheduled by the UL grant. The HARQ-ACK feedback may be done in the indicated UL subframe. The parameter indicating the UL subframe may be included in the parameter sets that are configured by the dedicated RRC messages. In this case, the HARQ-ACK feedback may be done in the UL subframe which is set in the parameter set indicated by the HARQ-ACK request field. The HARQ-ACK request field in the other DCI format than UL grant might not indicate the subframe.

The HARQ-ACK request field in the DL assignment and the group HARQ-ACK triggering DCI format may also indicate the PUCCH resource for the HARQ-ACK transmission. For example, several PUCCH resources are configured by a dedicated RRC message, and then the HARQ-ACK field may indicate one of the values, the first value corresponding to no HARQ-ACK, each of the other values corresponding to each of the configured PUCCH resources.

In another example, the HARQ-ACK request field may indicate one of the values, the first value corresponding to no HARQ-ACK, the other values corresponding to different offset values that apply to PUCCH resource. To be more specific, if the HARQ-ACK request field indicates that the HARQ-ACK is to be transmitted, the HARQ-ACK request field also indicates a certain offset value.

The index of the PUCCH resource that is used for the HARQ-ACK transmission may be derived by at least the lowest (E)CCE index used for the corresponding (E)PDCCH transmission and the offset value (e.g., the index is derived from a sum of these values). Another offset value could also be applied on top of them. The HARQ-ACK request field in UL grant might not indicate the PUCCH resource.

The HARQ-ACK request field in the DL assignment and the group HARQ-ACK triggering DCI format may also indicate one or more parameters of the channel access procedure for the PUCCH transmission (e.g., whether LBT category 2 or 3 with fixed CWS 3, and/or whether PUCCH transmission starts at the starting position of the first DFT-S-OFDM symbol, starting position of the second DFT-S-OFDM symbol, 25 μs after starting position of the first DFT-S-OFDM symbol, or 25+TA μs after starting position of the first DFT-S-OFDM symbol). Table 18 provides HARQ-ACK request values.

TABLE 18

| Value of HARQ-ACK request field | Description for DL assignment or group HARQ-ACK feedback triggering | Description for UL grant |
| --- | --- | --- |
| '00' | No HARQ-ACK trigger | |
| '01' | The 1st PUCCH parameter set configured by higher layers | The 1st scheduled subframe |
| '10' | The 2nd PUCCH parameter set configured by higher layers | The 2nd scheduled subframe |
| '11' | The 3rd PUCCH parameter set configured by higher layers | The 3rd scheduled subframe |

There are several approached to determine the subframe where HARQ-ACK is fedback upon the HARQ-ACK request in subframe N. In Option 1, HARQ-ACK is transmitted in subframe N+4. In Option 2, HARQ-ACK is transmitted in subframe N+Y, where Y is a subframe offset indicated by C-PDCCH in the subframe N. In this case, the UE 102 may not be required to update HARQ-ACK which corresponding to PDSCH in subframes later than subframe N+Y−4. In Option 3, HARQ-ACK is transmitted in subframe max(N+Y, N+4), where Y is a subframe offset indicated by C-PDCCH in the subframe N.

In Option 4, HARQ-ACK is transmitted in subframe N+K+4, where K is a subframe offset indicated by a given information field in the DCI format which includes the concerned HARQ-ACK request. The 3-bit SRS timing offset field in DCI format 1A, 2B, 2C and 2D may be reused to indicate the HARQ-ACK timing offset K. SRS request field could be extended to more than one-bit field indicating for example one of the following states. In State 0, there is no SRS trigger, and no HARQ-ACK trigger. In state 1 there is an SRS trigger, and no HARQ-ACK trigger. In state 2, there is no SRS trigger, and a HARQ-ACK trigger with the 1st parameter set. In state 3, there is no SRS trigger, and a HARQ-ACK trigger with the 2nd parameter set. In this Option 4, the SRS request field can also be referred to as SRS and/or HARQ-ACK request field, and the SRS timing offset field can also be referred to as SRS and/or HARQ-ACK timing offset field.

In Option 5, HARQ-ACK is transmitted in subframe N+K+4, where K is a subframe offset indicated by a given information field in the DCI format which includes the concerned HARQ-ACK request. The x-bit HARQ-ACK timing offset field may be added to indicate the HARQ-ACK timing offset K.

In Option 6, HARQ-ACK is transmitted in subframe N+Y+K. Y may be derived by the same way as in Option 2 or 3. K may be derived by the same way as in Option 4 or 5.

In Option 7, HARQ-ACK is transmitted in X+Y subframes after than the subframe where C-PDCCH indicates triggering with 1-bit trigger. Y may be derived by the same way as in Option 2 or 3. $X \in \{0,1,2,3\}$ may be indicated reusing the 2 bits in the DCI.

For an interlaced PUCCH wave form, each of the PUCCH indices may be tied to and identify each interlace. Given that a 10 PRB spacing interlace is adopted for the PUCCH wave form, each interlace includes every M (e.g., 5 or 10) PRB starting either one of PRB #0 to PRB # M−1. For example, if one PUCCH includes 10 PRB, the 1st interlace includes PRB #0, PRB #10, PRB #20, PRB #30, PRB #40, PRB #50, PRB #60, PRB #70, PRB #80, and PRB #90. The k-th interlace includes PRB #0+k−1, PRB #10+k−1, PRB #20+k−1, PRB #30+k−1, PRB #40+k−1, PRB #50+k−1, PRB #60+k−1, PRB #70+k−1, PRB #80+k−1, and PRB #90+k−1.

The PUCCH indices may identify the starting PRB. Eventually, the range of PUCCH indices may be from 0 to M−1. The value of M may depend on the UL system bandwidth of the LAA SCell or could also be indicated by the HARQ-ACK request field. Alternatively, the value of M may be configured by the UE 102 dedicated RRC messages. Or, the values of M may be linked to the PUCCH indices, for example, PUCCH indices smaller than or equal to a certain value may indicate interlaces with M=10 while PUCCH indices greater than the certain value may indicate interlaces with M=5. In addition to the interlace, the PUCCH index may also identify a sequence of PUCCH and/or the associated DM-RS. This enables PUCCH multiplexing within even a single interlace.

The UE operations module 124 may provide information 148 to the one or more receivers 120. For example, the UE operations module 124 may inform the receiver(s) 120 when to receive retransmissions.

The UE operations module 124 may provide information 138 to the demodulator 114. For example, the UE operations module 124 may inform the demodulator 114 of a modulation pattern anticipated for transmissions from the eNB 160.

The UE operations module 124 may provide information 136 to the decoder 108. For example, the UE operations module 124 may inform the decoder 108 of an anticipated encoding for transmissions from the eNB 160.

The UE operations module 124 may provide information 142 to the encoder 150. The information 142 may include data to be encoded and/or instructions for encoding. For example, the UE operations module 124 may instruct the encoder 150 to encode transmission data 146 and/or other information 142. The other information 142 may include PDSCH HARQ-ACK information.

The encoder 150 may encode transmission data 146 and/or other information 142 provided by the UE operations module 124. For example, encoding the data 146 and/or other information 142 may involve error detection and/or correction coding, mapping data to space, time and/or frequency resources for transmission, multiplexing, etc. The encoder 150 may provide encoded data 152 to the modulator 154.

The UE operations module 124 may provide information 144 to the modulator 154. For example, the UE operations module 124 may inform the modulator 154 of a modulation type (e.g., constellation mapping) to be used for transmissions to the eNB 160. The modulator 154 may modulate the encoded data 152 to provide one or more modulated signals 156 to the one or more transmitters 158.

The UE operations module 124 may provide information 140 to the one or more transmitters 158. This information 140 may include instructions for the one or more transmitters 158. For example, the UE operations module 124 may instruct the one or more transmitters 158 when to transmit a signal to the eNB 160. For instance, the one or more transmitters 158 may transmit during a UL subframe. The one or more transmitters 158 may upconvert and transmit the modulated signal(s) 156 to one or more eNBs 160.

The eNB 160 may include one or more transceivers 176, one or more demodulators 172, one or more decoders 166, one or more encoders 109, one or more modulators 113, a data buffer 162 and an eNB operations module 182. For example, one or more reception and/or transmission paths may be implemented in an eNB 160. For convenience, only a single transceiver 176, decoder 166, demodulator 172, encoder 109 and modulator 113 are illustrated in the eNB 160, though multiple parallel elements (e.g., transceivers 176, decoders 166, demodulators 172, encoders 109 and modulators 113) may be implemented.

The transceiver 176 may include one or more receivers 178 and one or more transmitters 117. The one or more receivers 178 may receive signals from the UE 102 using one or more antennas 180a-n. For example, the receiver 178 may receive and downconvert signals to produce one or more received signals 174. The one or more received signals 174 may be provided to a demodulator 172. The one or more transmitters 117 may transmit signals to the UE 102 using one or more antennas 180a-n. For example, the one or more transmitters 117 may upconvert and transmit one or more modulated signals 115.

The demodulator 172 may demodulate the one or more received signals 174 to produce one or more demodulated signals 170. The one or more demodulated signals 170 may be provided to the decoder 166. The eNB 160 may use the decoder 166 to decode signals. The decoder 166 may produce one or more decoded signals 164, 168. For example, a first eNB-decoded signal 164 may comprise received payload data, which may be stored in a data buffer 162. A second eNB-decoded signal 168 may comprise overhead data and/or control data. For example, the second eNB-decoded signal 168 may provide data (e.g., PDSCH HARQ-ACK information) that may be used by the eNB operations module 182 to perform one or more operations.

In general, the eNB operations module 182 may enable the eNB 160 to communicate with the one or more UEs 102. The eNB operations module 182 may include one or more of an eNB uplink LAA module 194.

The eNB uplink LAA module 194 may perform UL LAA operations. In an implementation, the eNB uplink LAA module 194 may transmit, in a subframe n, a physical downlink control channel (PDCCH). The eNB uplink LAA module 194 may also transmit, in the subframe n, a physical downlink shared channel (PDSCH) corresponding to the PDCCH, the PDSCH being transmitted in a license-assisted access (LAA) cell. The eNB uplink LAA module 194 may receive, in a subframe n+k, uplink control information (UCI).

In a case that the UE 102 is configured with simultaneous physical uplink control channel (PUCCH) and physical uplink shared channel (PUSCH) transmissions, the UCI may include a HARQ-ACK corresponding to the PDSCH. In this case, the k is equal to 4.

In a case that the UE 102 is not configured with the simultaneous PUCCH and PUSCH transmissions, the UCI may include includes HARQ-ACKs for all HARQ processes in the LAA cell. In this case, the k is derived from an information field in the PDCCH.

In a case that the UE 102 is configured with the simultaneous PUCCH and PUSCH transmissions, the PDCCH does not have the information field.

In a case that the UE 102 is configured with the simultaneous PUCCH and PUSCH transmissions, the UCI may be fed back via a PUCCH in a primary cell. In a case that the UE 102 is not configured with the simultaneous PUCCH and PUSCH transmissions, the UCI may be fed back via a PUCCH.

The eNB operations module 182 may provide information 188 to the demodulator 172. For example, the eNB operations module 182 may inform the demodulator 172 of a modulation pattern anticipated for transmissions from the UE(s) 102.

The eNB operations module 182 may provide information 186 to the decoder 166. For example, the eNB operations module 182 may inform the decoder 166 of an anticipated encoding for transmissions from the UE(s) 102.

The eNB operations module 182 may provide information 101 to the encoder 109. The information 101 may include data to be encoded and/or instructions for encoding. For example, the eNB operations module 182 may instruct the encoder 109 to encode information 101, including transmission data 105.

The encoder 109 may encode transmission data 105 and/or other information included in the information 101 provided by the eNB operations module 182. For example, encoding the data 105 and/or other information included in the information 101 may involve error detection and/or correction coding, mapping data to space, time and/or frequency resources for transmission, multiplexing, etc. The encoder 109 may provide encoded data 111 to the modulator 113. The transmission data 105 may include network data to be relayed to the UE 102.

The eNB operations module 182 may provide information 103 to the modulator 113. This information 103 may include instructions for the modulator 113. For example, the eNB operations module 182 may inform the modulator 113 of a modulation type (e.g., constellation mapping) to be used for transmissions to the UE(s) 102. The modulator 113 may modulate the encoded data 111 to provide one or more modulated signals 115 to the one or more transmitters 117.

The eNB operations module 182 may provide information 192 to the one or more transmitters 117. This information 192 may include instructions for the one or more transmitters 117. For example, the eNB operations module 182 may instruct the one or more transmitters 117 when to (or when not to) transmit a signal to the UE(s) 102. The one or more transmitters 117 may upconvert and transmit the modulated signal(s) 115 to one or more UEs 102.

It should be noted that a DL subframe may be transmitted from the eNB 160 to one or more UEs 102 and that a UL subframe may be transmitted from one or more UEs 102 to the eNB 160. Furthermore, both the eNB 160 and the one or more UEs 102 may transmit data in a standard special subframe.

It should also be noted that one or more of the elements or parts thereof included in the eNB(s) 160 and UE(s) 102 may be implemented in hardware. For example, one or more of these elements or parts thereof may be implemented as a chip, circuitry or hardware components, etc. It should also be noted that one or more of the functions or methods described herein may be implemented in and/or performed using hardware. For example, one or more of the methods described herein may be implemented in and/or realized using a chipset, an application-specific integrated circuit (ASIC), a large-scale integrated circuit (LSI) or integrated circuit, etc.

Figure 2:
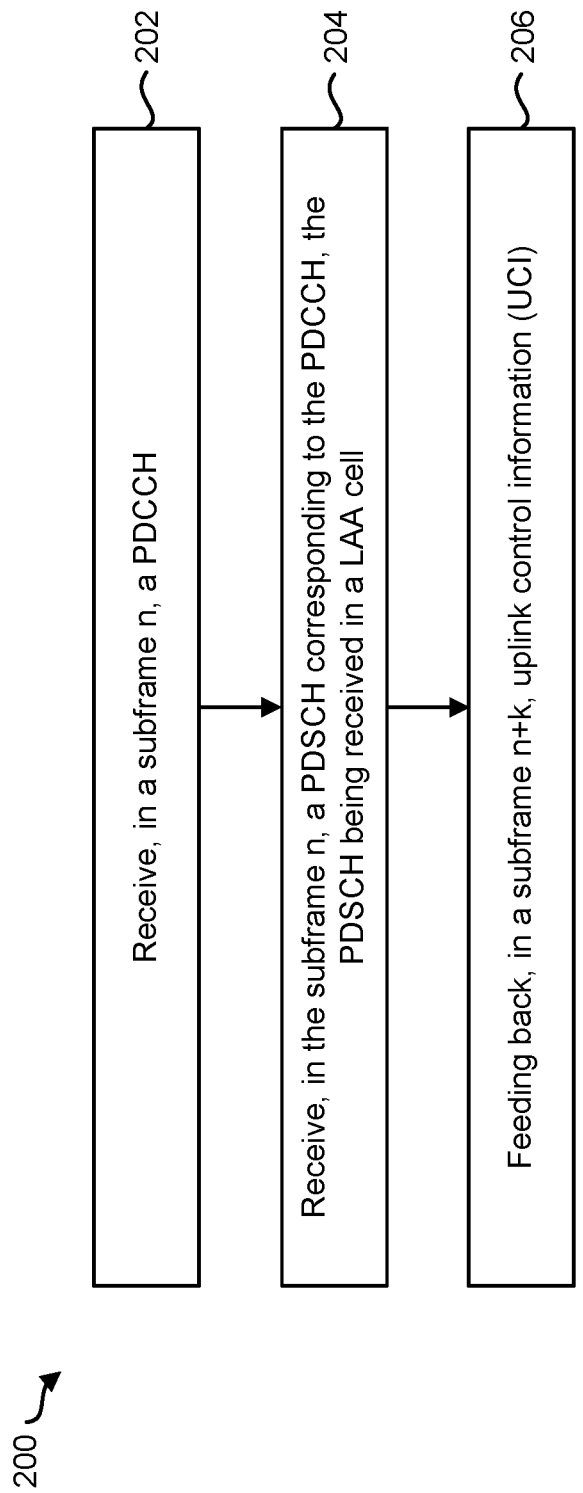
FIG. 2 is a flow diagram illustrating a method by a UE.

FIG. 2 is a flow diagram illustrating a method 200 by a UE 102. The UE 102 may communicate with one or more eNBs 160 in a wireless communication network. In one implementation, the wireless communication network may include an LTE network.

The UE 102 may receive 202, in a subframe n, a PDCCH. For example, the UE 102 may include a PDCCH receiver configured to receive the PDCCH.

The UE 102 may receive 204, in the subframe n, a PDSCH corresponding to the PDCCH, the PDSCH being received in a license-assisted access (LAA) cell. For example, the UE 102 may include a PDSCH receiver configured to receive the PDSCH.

The UE 102 may feed back 206, in a subframe n+k, uplink control information (UCI). For example, the UE 102 may include uplink transmitter configured to transmit UCI.

In a case that the UE 102 is configured with simultaneous physical uplink control channel (PUCCH) and physical uplink shared channel (PUSCH) transmissions, the UCI may include a HARQ-ACK corresponding to the PDSCH. In this case, the k is equal to 4.

In a case that the UE 102 is not configured with the simultaneous PUCCH and PUSCH transmissions, the UCI may include includes HARQ-ACKs for all HARQ processes in the LAA cell. In this case, the k is derived from an information field in the PDCCH.

In a case that the UE 102 is configured with the simultaneous PUCCH and PUSCH transmissions, the PDCCH does not have the information field.

In a case that the UE 102 is configured with the simultaneous PUCCH and PUSCH transmissions, the UCI may be fed back via a PUCCH in a primary cell. In a case that the UE 102 is not configured with the simultaneous PUCCH and PUSCH transmissions, the UCI may be fed back via a PUCCH.

Figure 3:
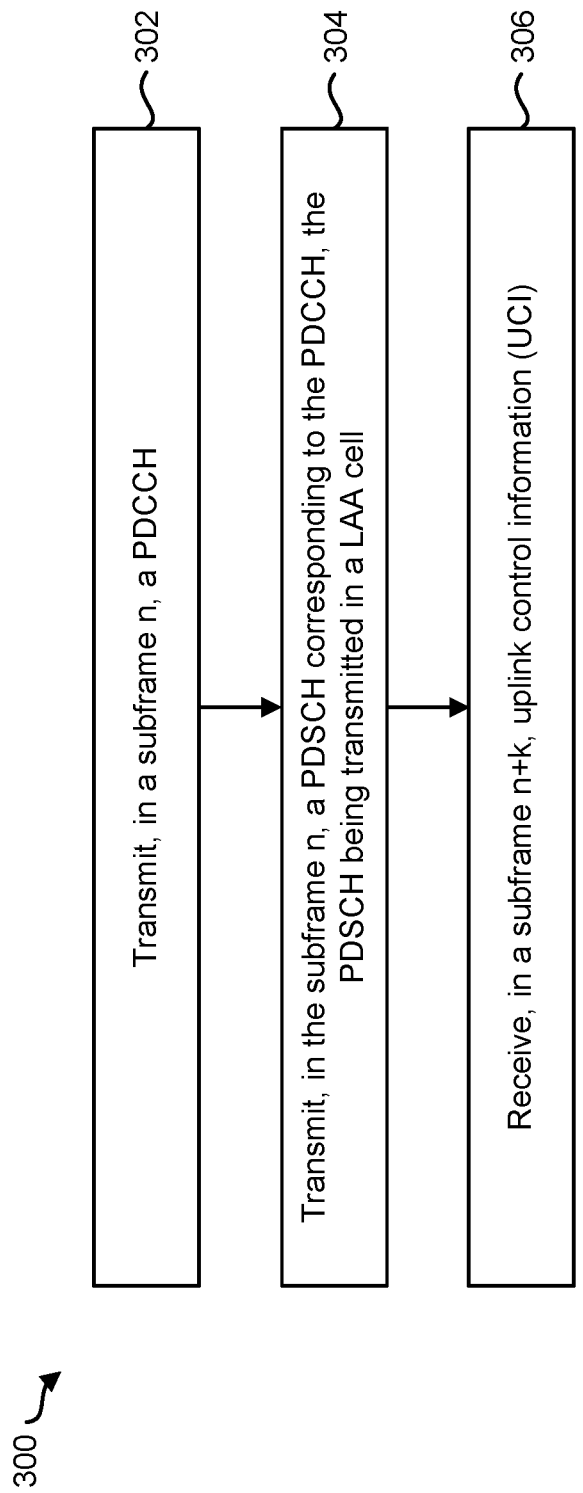
FIG. 3 is a flow diagram illustrating a method by an eNB.

FIG. 3 is a flow diagram illustrating a method 300 by an eNB 160. The eNB 160 may communicate with one or more UEs 102 in a wireless communication network. In one implementation, the wireless communication network may include an LTE network.

The eNB 160 may transmit 302, in a subframe n, a PDCCH. For example, the eNB 160 may include a PDCCH transmitter configured to transmit the PDCCH.

The eNB 160 may transmit 304, in the subframe n, a PDSCH corresponding to the PDCCH, the PDSCH being transmitted in a license-assisted access (LAA) cell. For example, the eNB 160 may include a PDSCH transmitter configured to transmit the PDSCH.

The eNB 160 may receive 306, in a subframe n+k, uplink control information (UCI). For example, the eNB 160 may include uplink receiver configured to receive UCI.

In a case that the UE 102 is configured with simultaneous physical uplink control channel (PUCCH) and physical uplink shared channel (PUSCH) transmissions, the UCI may include a HARQ-ACK corresponding to the PDSCH. In this case, the k is equal to 4.

In a case that the UE 102 is not configured with the simultaneous PUCCH and PUSCH transmissions, the UCI may include includes HARQ-ACKs for all HARQ processes in the LAA cell. In this case, the k is derived from an information field in the PDCCH.

In a case that the UE 102 is configured with the simultaneous PUCCH and PUSCH transmissions, the PDCCH does not have the information field.

In a case that the UE 102 is configured with the simultaneous PUCCH and PUSCH transmissions, the UCI may be fed back via a PUCCH in a primary cell. In a case that the UE 102 is not configured with the simultaneous PUCCH and PUSCH transmissions, the UCI may be fed back via a PUCCH.

Figure 4:
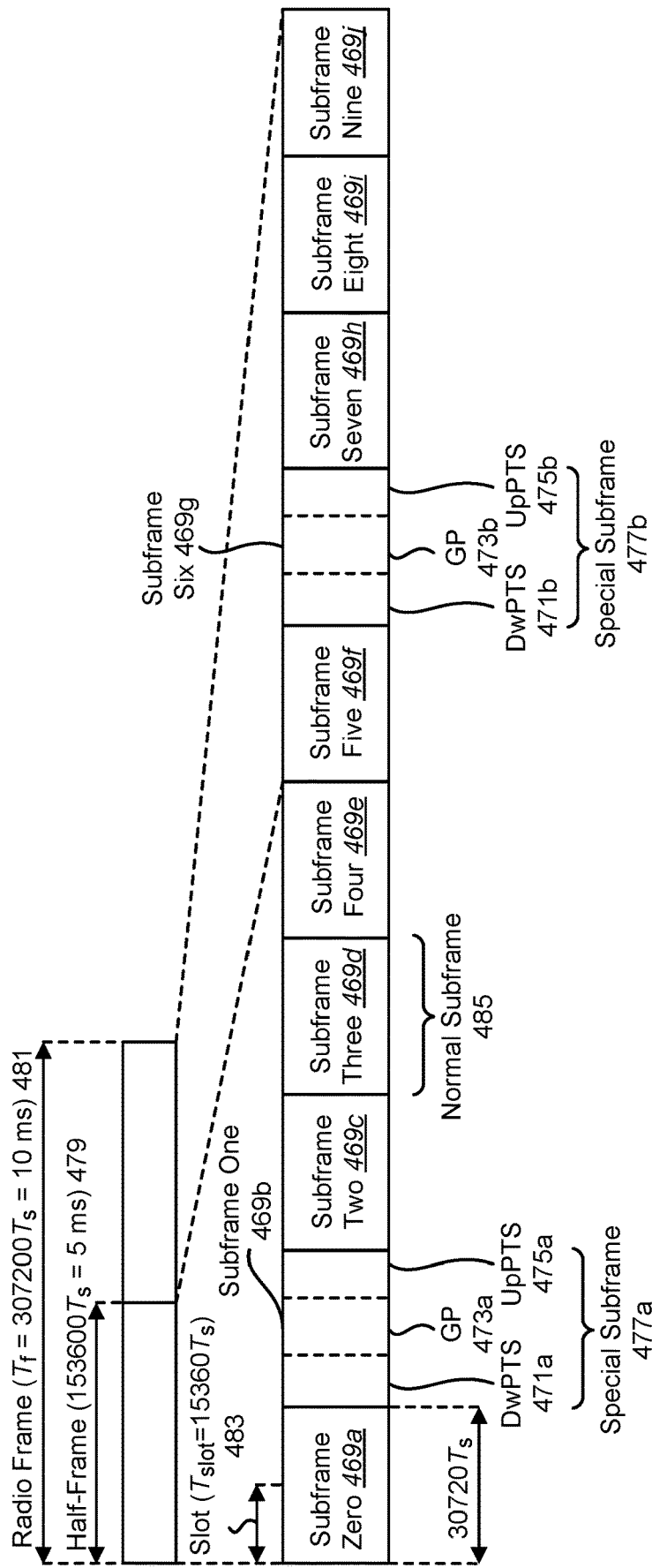
FIG. 4 is a diagram illustrating one example of a radio frame that may be used in accordance with the systems and methods disclosed herein.

FIG. 4 is a diagram illustrating one example of a radio frame 481 that may be used in accordance with the systems and methods disclosed herein. This radio frame 481 structure illustrates a TDD structure. Each radio frame 481 may have a length of $T_f=307200 \cdot T_s=10$ ms, where $T_f$ is a radio frame 481 duration and $T_s$ is a time unit equal to $$\frac{1}{(15000 \times 2048)}$$

seconds. The radio frame 481 may include two half-frames 479, each having a length of 153600 $T_s=5$ ms. Each half-frame 479 may include five subframes 469a-e, 469f-j each having a length of $30720 \cdot T_s=1$ ms. Each subframe 469 may include two slots 483 each having a length of 15360 $T_s=\frac{1}{2}$ ms.

TDD UL/DL configurations 0-6 are given below in Table 19 (from Table 4.2-2 in 3GPP TS 36.211). UL/DL configurations with both 5 millisecond (ms) and 10 ms downlink-to-uplink switch-point periodicity may be supported. In particular, seven UL/DL configurations are specified in 3GPP specifications, as shown in Table 19 below. In Table 19, "D" denotes a downlink subframe, "S" denotes a special subframe and "U" denotes a UL subframe.

TABLE 19

| TDD UL/DL Configuration Number | Downlink-to-Uplink Switch-Point Periodicity | Subframe Number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 19 above, for each subframe in a radio frame, "D" indicates that the subframe is reserved for downlink transmissions, "U" indicates that the subframe is reserved for uplink transmissions and "S" indicates a special subframe with three fields: a downlink pilot time slot (DwPTS), a guard period (GP) and an uplink pilot time slot (UpPTS). The length of DwPTS and UpPTS is given in Table 20 (from Table 4.2-1 of 3GPP TS 36.211) subject to the total length of DwPTS, GP and UpPTS being equal to $30720 \cdot T_s=1$ ms. In Table 20, "cyclic prefix" is abbreviated as "CP" and "configuration" is abbreviated as "Config" for convenience.

TABLE 20

| Special Subframe Config | Normal CP in downlink | | | Extended CP in downlink | | |
|---|---|---|---|---|---|---|
| | | UpPTS | | | UpPTS | |
| | DwPTS | Normal CP in uplink | Extended CP in uplink | DwPTS | Normal CP in uplink | Extended CP in uplink |
| 0 | $6592 \cdot T_s$ | $2192 \cdot T_s$ | $2560 \cdot T_s$ | $7680 \cdot T_s$ | $2192 \cdot T_s$ | $2560 \cdot T_s$ |
| 1 | $19760 \cdot T_s$ | | | $20480 \cdot T_s$ | | |
| 2 | $21952 \cdot T_s$ | | | $23040 \cdot T_s$ | | |
| 3 | $24144 \cdot T_s$ | | | $25600 \cdot T_s$ | | |
| 4 | $26336 \cdot T_s$ | | | $7680 \cdot T_s$ | $4384 \cdot T_s$ | $5120 \cdot T_s$ |

TABLE 20-continued

| | Normal CP in downlink | | | Extended CP in downlink | | |
| | | UpPTS | | | UpPTS | |
| Special Subframe Config | DwPTS | Normal CP in uplink | Extended CP in uplink | DwPTS | Normal CP in uplink | Extended CP in uplink |
|---|---|---|---|---|---|---|
| 5 | $6592 \cdot T_s$ | $4384 \cdot T_s$ | $5120 \cdot T_s$ | $20480 \cdot T_s$ | | |
| 6 | $19760 \cdot T_s$ | | | $23040 \cdot T_s$ | | |
| 7 | $21952 \cdot T_s$ | | | — | — | — |
| 8 | $24144 \cdot T_s$ | | | — | — | — |

UL/DL configurations with both 5 ms and 10 ms downlink-to-uplink switch-point periodicity are supported. In the case of 5 ms downlink-to-uplink switch-point periodicity, the special subframe exists in both half-frames. In the case of 10 ms downlink-to-uplink switch-point periodicity, the special subframe exists in the first half-frame only. Subframes 0 and 5 and DwPTS may be reserved for downlink transmission. UpPTS and the subframe immediately following the special subframe may be reserved for uplink transmission.

In accordance with the systems and methods disclosed herein, some types of subframes 469 that may be used include a downlink subframe, an uplink subframe and a special subframe 477. In the example illustrated in FIG. 4, which has a 5 ms periodicity, two standard special subframes 477a-b are included in the radio frame 481. The remaining subframes 469 are normal subframes 485.

The first special subframe 477a includes a downlink pilot time slot (DwPTS) 471a, a guard period (GP) 473a and an uplink pilot time slot (UpPTS) 475a. In this example, the first standard special subframe 477a is included in subframe one 469b. The second standard special subframe 477b includes a downlink pilot time slot (DwPTS) 471b, a guard period (GP) 473b and an uplink pilot time slot (UpPTS) 475b. In this example, the second standard special subframe 477b is included in subframe six 469g. The length of the DwPTS 471a-b and UpPTS 475a-b may be given by Table 4.2-1 of 3GPP TS 36.211 (illustrated in Table 20 above) subject to the total length of each set of DwPTS 471, GP 473 and UpPTS 475 being equal to $30720 \cdot T_s = 1$ ms.

Each subframe i 469a-j (where i denotes a subframe ranging from subframe zero 469a (e.g., 0) to subframe nine 469j (e.g., 9) in this example) is defined as two slots, 2i and 2i+1 of length $T_{slot} = 15360 \cdot T_s = 0.5$ ms in each subframe 469. For example, subframe zero (e.g., 0) 469a may include two slots, including a first slot.

UL/DL configurations with both 5 ms and 10 ms downlink-to-uplink switch-point periodicity may be used in accordance with the systems and methods disclosed herein. FIG. 4 illustrates one example of a radio frame 481 with 5 ms switch-point periodicity. In the case of 5 ms downlink-to-uplink switch-point periodicity, each half-frame 479 includes a standard special subframe 477a-b. In the case of 10 ms downlink-to-uplink switch-point periodicity, a special subframe 477 may exist in the first half-frame 479 only.

Subframe zero (e.g., 0) 469a and subframe five (e.g., 5) 469f and DwPTS 471a-b may be reserved for downlink transmission. The UpPTS 475a-b and the subframe(s) immediately following the special subframe(s) 477a-b (e.g., subframe two 469c and subframe seven 469h) may be reserved for uplink transmission. It should be noted that, in some implementations, special subframes 477 may be considered DL subframes in order to determine a set of DL subframe associations that indicate UCI transmission uplink subframes of a UCI transmission cell.

LTE license access with TDD can have the special subframe as well as the normal subframe. The lengths of DwPTS, GP and UpPTS can be configured by using a special subframe configuration. Any one of the following ten configurations may be set as a special subframe configuration.

1) Special subframe configuration 0: DwPTS includes 3 OFDM symbols. UpPTS includes 1 single carrier frequency-division multiple access (SC-FDMA) symbol.

2) Special subframe configuration 1: DwPTS includes 9 OFDM symbols for normal CP and 8 OFDM symbols for extended CP. UpPTS includes 1 SC-FDMA symbol.

3) Special subframe configuration 2: DwPTS includes 10 OFDM symbols for normal CP and 9 OFDM symbols for extended CP. UpPTS includes 1 SC-FDMA symbol.

4) Special subframe configuration 3: DwPTS includes 11 OFDM symbols for normal CP and 10 OFDM symbols for extended CP. UpPTS includes 1 SC-FDMA symbol.

5) Special subframe configuration 4: DwPTS includes 12 OFDM symbols for normal CP and 3 OFDM symbols for extended CP. UpPTS includes 1 SC-FDMA symbol for normal CP and 2 SC-FDMA symbol for extended CP.

6) Special subframe configuration 5: DwPTS includes 3 OFDM symbols for normal CP and 8 OFDM symbols for extended CP. UpPTS includes 2 SC-FDMA symbols.

7) Special subframe configuration 6: DwPTS includes 9 OFDM symbols. UpPTS includes 2 SC-FDMA symbols.

8) Special subframe configuration 7: DwPTS includes 10 OFDM symbols for normal CP and 5 OFDM symbols for extended CP. UpPTS includes 2 SC-FDMA symbols.

9) Special subframe configuration 8: DwPTS includes 11 OFDM symbols. UpPTS includes 2 SC-FDMA symbols. Special subframe configuration 8 can be configured only for normal CP.

10) Special subframe configuration 9: DwPTS includes 6 OFDM symbols. UpPTS includes 2 SC-FDMA symbols. Special subframe configuration 9 can be configured only for normal CP.

Figure 5:
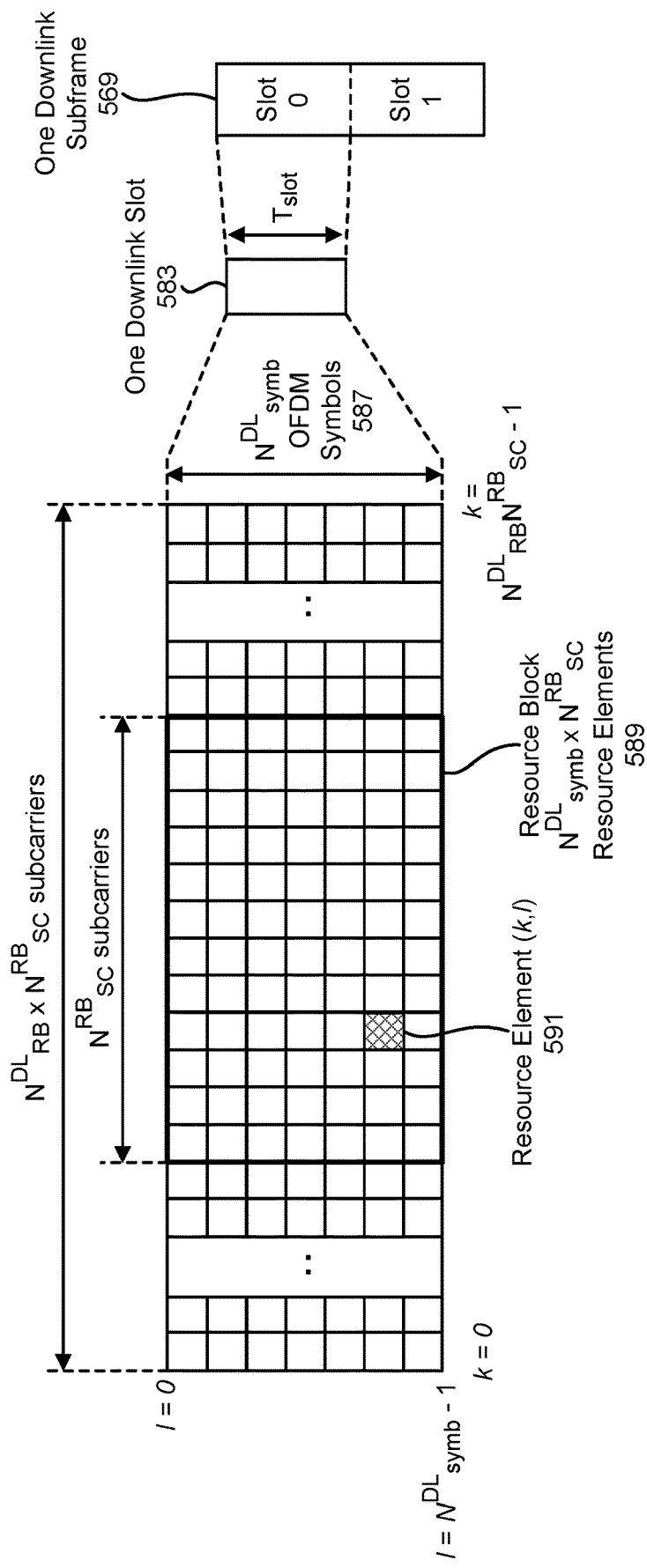
FIG. 5 is a diagram illustrating one example of a resource grid for the downlink.

FIG. 5 is a diagram illustrating one example of a resource grid for the downlink. The resource grid illustrated in FIG. 5 may be utilized in some implementations of the systems and methods disclosed herein. More detail regarding the resource grid is given in connection with FIG. 1.

In FIG. 5, one downlink subframe 569 may include two downlink slots 583. $N^{DL}_{RB}$ is downlink bandwidth configuration of the serving cell, expressed in multiples of $N^{RB}_{sc}$, where $N^{RB}_{sc}$ is a resource block 589 size in the frequency domain expressed as a number of subcarriers, and $N^{DL}_{symb}$ is the number of OFDM symbols 587 in a downlink slot 583. A resource block 589 may include a number of resource elements (RE) 591.

For a PCell, $N^{DL}$ RB is broadcast as a part of system information. For an SCell (including an LAA SCell), $N^{DL}_{RB}$ is configured by a RRC message dedicated to a UE 102. For PDSCH mapping, the available RE 591 may be the RE 591 whose index 1 fulfils $1 \geq l_{data,start}$ and/or $l_{data,end} \geq 1$ in a subframe.

Figure 6:
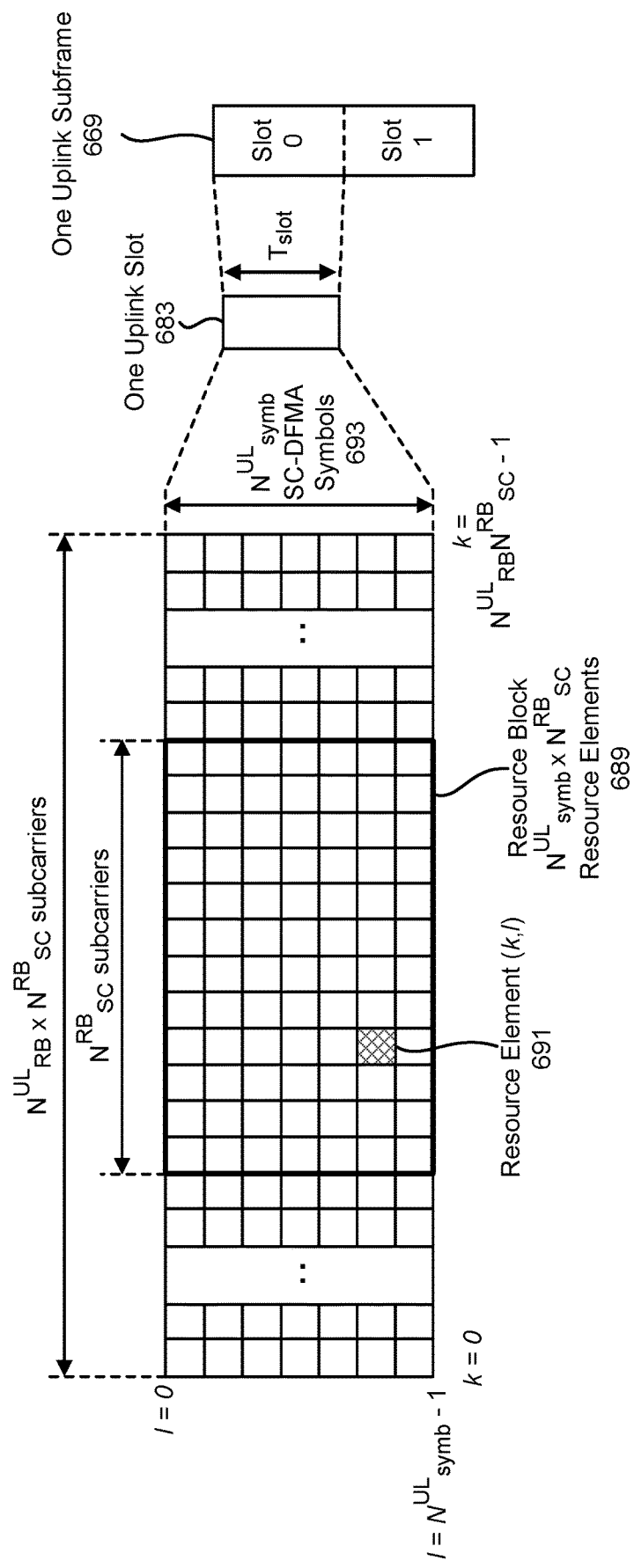
FIG. 6 is a diagram illustrating one example of a resource grid for the uplink.

FIG. 6 is a diagram illustrating one example of a resource grid for the uplink. The resource grid illustrated in FIG. 6 may be utilized in some implementations of the systems and methods disclosed herein. More detail regarding the resource grid is given in connection with FIG. 1.

In FIG. 6, one uplink subframe 669 may include two uplink slots 683. $N^{UL}_{RB}$ is uplink bandwidth configuration of the serving cell, expressed in multiples of $N^{RB}_{sc}$, where $N^{RB}_{sc}$ is a resource block 689 size in the frequency domain expressed as a number of subcarriers, and $N^{UL}_{symb}$ is the number of SC-FDMA symbols 693 in an uplink slot 683. A resource block 689 may include a number of resource elements (RE) 691.

For a PCell, $N^{UL}_{RB}$ is broadcast as a part of system information. For an SCell (including an LAA SCell), $N^{UL}_{RB}$ is configured by a RRC message dedicated to a UE 102.

FIG. 7 is an example illustrating a triggered grant. The eNB 760 may send a UL grant 703 to the UE 702. If the UL grant 703 in subframe n is not a triggered grant, the UE 702 transmits, in subframe n+k+4, the corresponding UL transmission subject to LBT. If UL grant 703 in subframe n is a triggered grant, the UE 702 transmits, after receiving a triggering C-PDCCH 707, the corresponding UL transmission (e.g., PUSCH 709) subject to LBT.

In this example, the eNB 760 sends the C-PDCCH 707 (with a 1-bit trigger) during a valid duration 705 after sending the UL grant 703. Upon receiving the C-PDCCH 707, the UE 702 may start the timing to send the PUSCH 709.

FIG. 8 is a flow diagram illustrating a method 800 for UCI reporting by a UE 102. The UE 102 may communicate with one or more eNBs 160 in a wireless communication network. In one implementation, the wireless communication network may include an LTE network.

The UE 102 may determine 802 whether simultaneous PUCCH and PUSCH transmission is configured. If simultaneous PUCCH and PUSCH transmission is configured, then the UE 102 may monitor 804 (E)PDCCH with DCI format which does not include HARQ-ACK request field. If simultaneous PUCCH and PUSCH transmission is not configured, then the UE 102 may monitor 806 (E)PDCCH with DCI format which includes the HARQ-ACK request field.

Figure 9A:
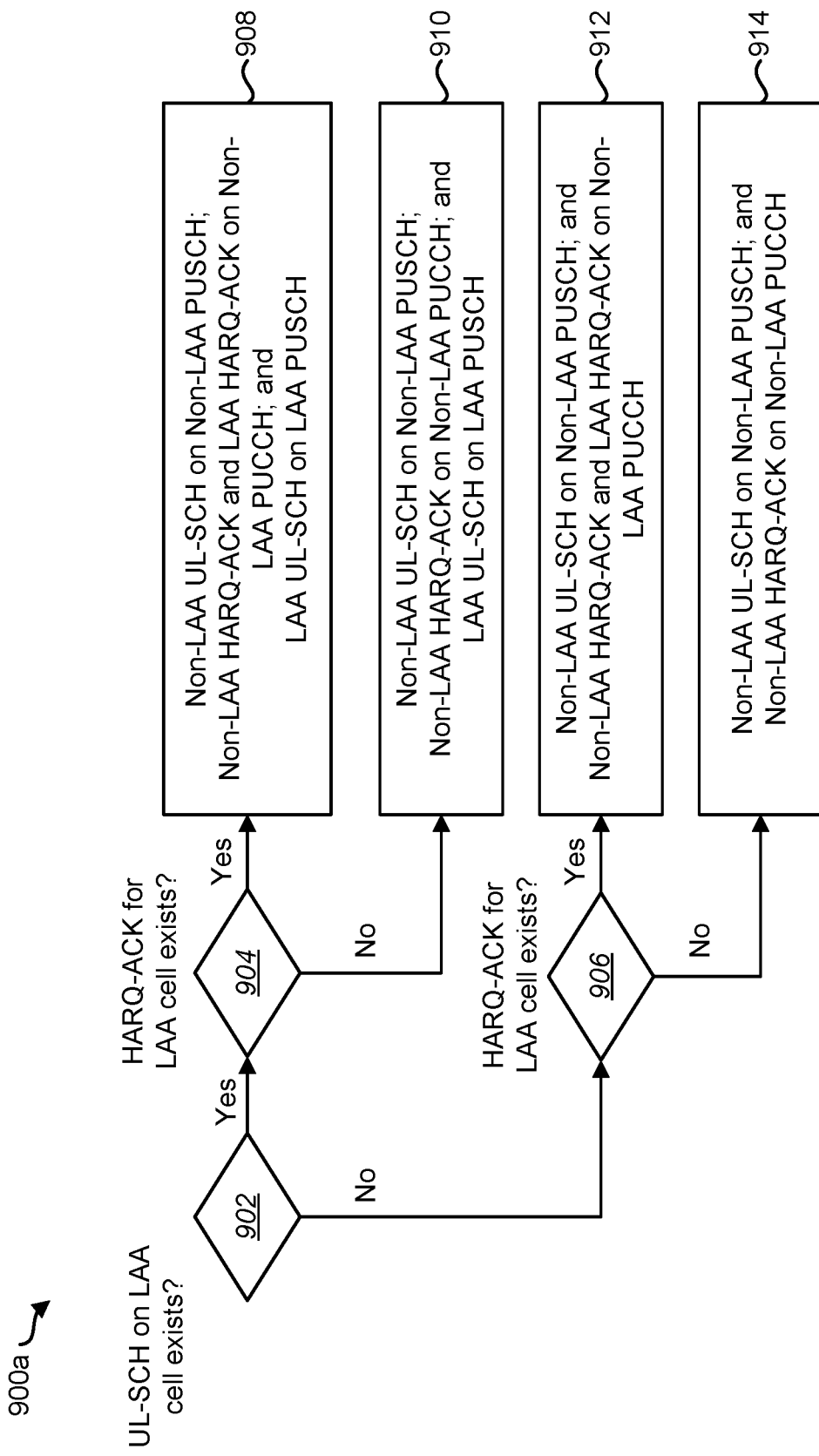
FIGS. 9A-9D are flow diagrams illustrating methods for UCI reporting by a UE where hybrid automatic repeat request-acknowledgement (HARQ-ACK) for a LAA secondary cell (SCell) may piggyback on a non-LAA cell.

FIGS. 9A-9D are flow diagrams illustrating methods for UCI reporting by a UE 102 where HARQ-ACK for an LAA SCell may piggyback on a non-LAA cell. In FIG. 9A, if simultaneous PUCCH and PUSCH is configured and if an UL-SCH on a non-LAA cell and HARQ-ACK for a non-LAA cell exists (i.e., there are PUSCH and PUCCH on a non-LAA cell), then method 900a may be implemented.

The UE 102 may determine 902 whether a UL-SCH on the LAA cell exists. If the UL-SCH on the LAA cell exists, then the UE 102 may determine 904 whether HARQ-ACK for the LAA cell exists. If HARQ-ACK for the LAA cell exists, then the UE 102 may transmit 908 the non-LAA UL-SCH on a non-LAA PUSCH. The UE 102 may also transmit 908 non-LAA HARQ-ACK and LAA HARQ-ACK on a non-LAA PUCCH. The UE 102 may further transmit 908 LAA UL-SCH on the LAA PUSCH.

If the UE 102 determines 904 that HARQ-ACK for the LAA cell does not exist, then the UE 102 may transmit 910 the non-LAA UL-SCH on the non-LAA PUSCH. The UE 102 may also transmit 910 non-LAA HARQ-ACK on the non-LAA PUCCH. The UE 102 may further transmit 910 the LAA UL-SCH on the LAA PUSCH.

If the UE 102 determines 902 that the UL-SCH on the LAA cell does not exist, then the UE 102 may determine 906 whether HARQ-ACK for the LAA cell exists. If HARQ-ACK for the LAA cell exists, then the UE 102 may transmit 912 the non-LAA UL-SCH on a non-LAA PUSCH. The UE 102 may also transmit 912 non-LAA HARQ-ACK and LAA HARQ-ACK on the non-LAA PUCCH.

If the UE 102 determines 906 that HARQ-ACK for the LAA cell does not exist, then the UE 102 may transmit 914 the non-LAA UL-SCH on the non-LAA PUSCH. The UE 102 may also transmit 914 non-LAA HARQ-ACK on the non-LAA PUCCH.

Figure 9B:
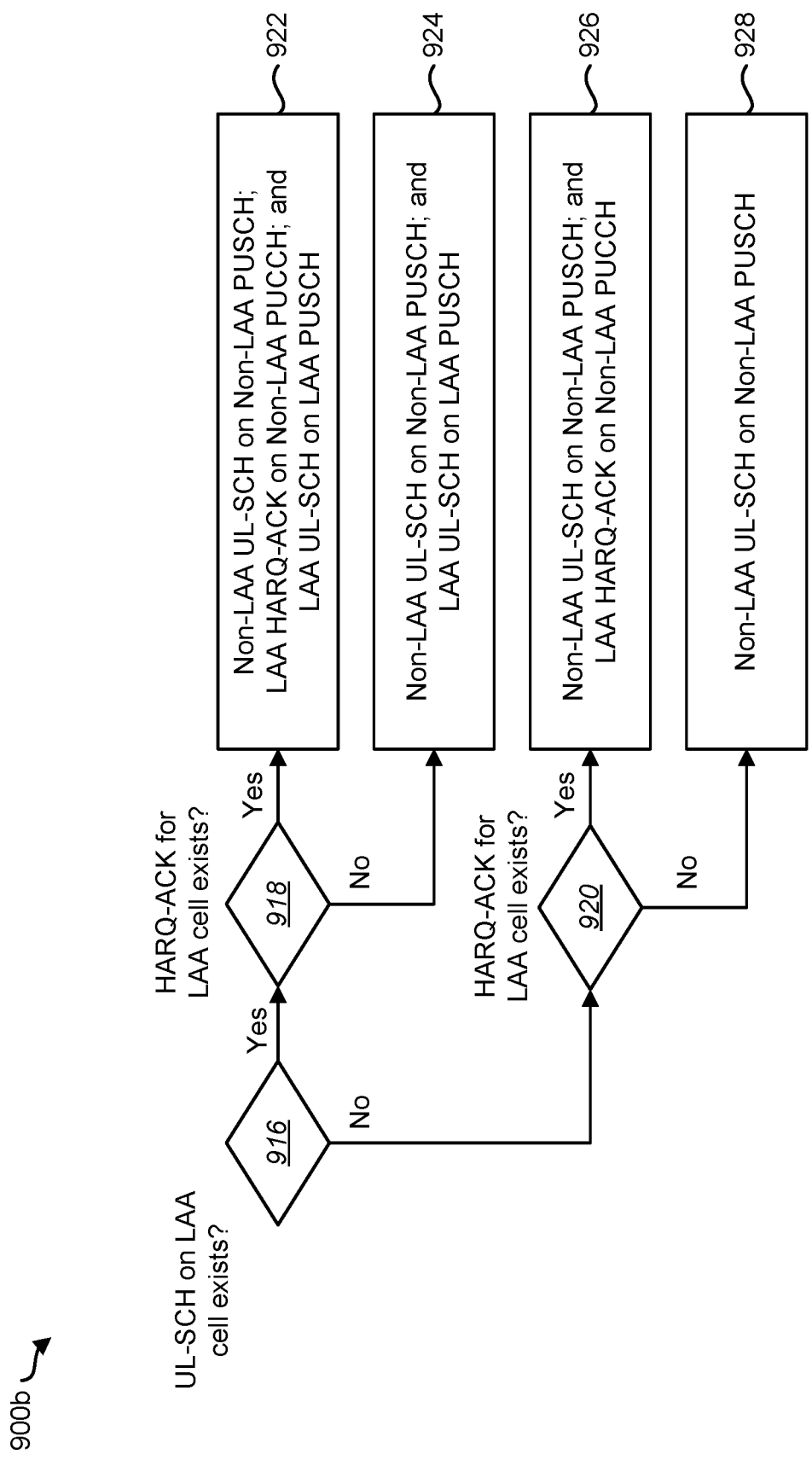

In FIG. 9B, if simultaneous PUCCH and PUSCH is configured and if UL-SCH on a non-LAA cell exists but HARQ-ACK for the non-LAA cell does not exist, then method 900b may be implemented.

The UE 102 may determine 916 whether a UL-SCH on the LAA cell exists. If the UL-SCH on the LAA cell exists, then the UE 102 may determine 918 whether HARQ-ACK for the LAA cell exists. If HARQ-ACK for the LAA cell exists, then the UE 102 may transmit 922 the non-LAA UL-SCH on the non-LAA PUSCH. The UE 102 may also transmit 922 LAA HARQ-ACK on the non-LAA PUCCH. The UE 102 may further transmit 922 the LAA UL-SCH on the LAA PUSCH.

If the UE 102 determines 918 that HARQ-ACK for the LAA cell does not exist, then the UE 102 may transmit 924 the non-LAA UL-SCH on the non-LAA PUSCH. The UE 102 may also transmit 924 the LAA UL-SCH on the LAA PUSCH.

If the UE 102 determines 916 that a UL-SCH on the LAA cell does not exist, the UE 102 may determine 920 whether HARQ-ACK for the LAA cell exists. If HARQ-ACK for the LAA cell exists, then the UE 102 may transmit 926 the non-LAA UL-SCH on the non-LAA PUSCH. The UE 102 may also transmit 926 LAA HARQ-ACK on the non-LAA PUCCH. If the UE 102 determines 920 that HARQ-ACK for the LAA cell does not exist, the UE 102 may transmit 928 non-LAA UL-SCH on the non-LAA PUSCH.

Figure 9C:
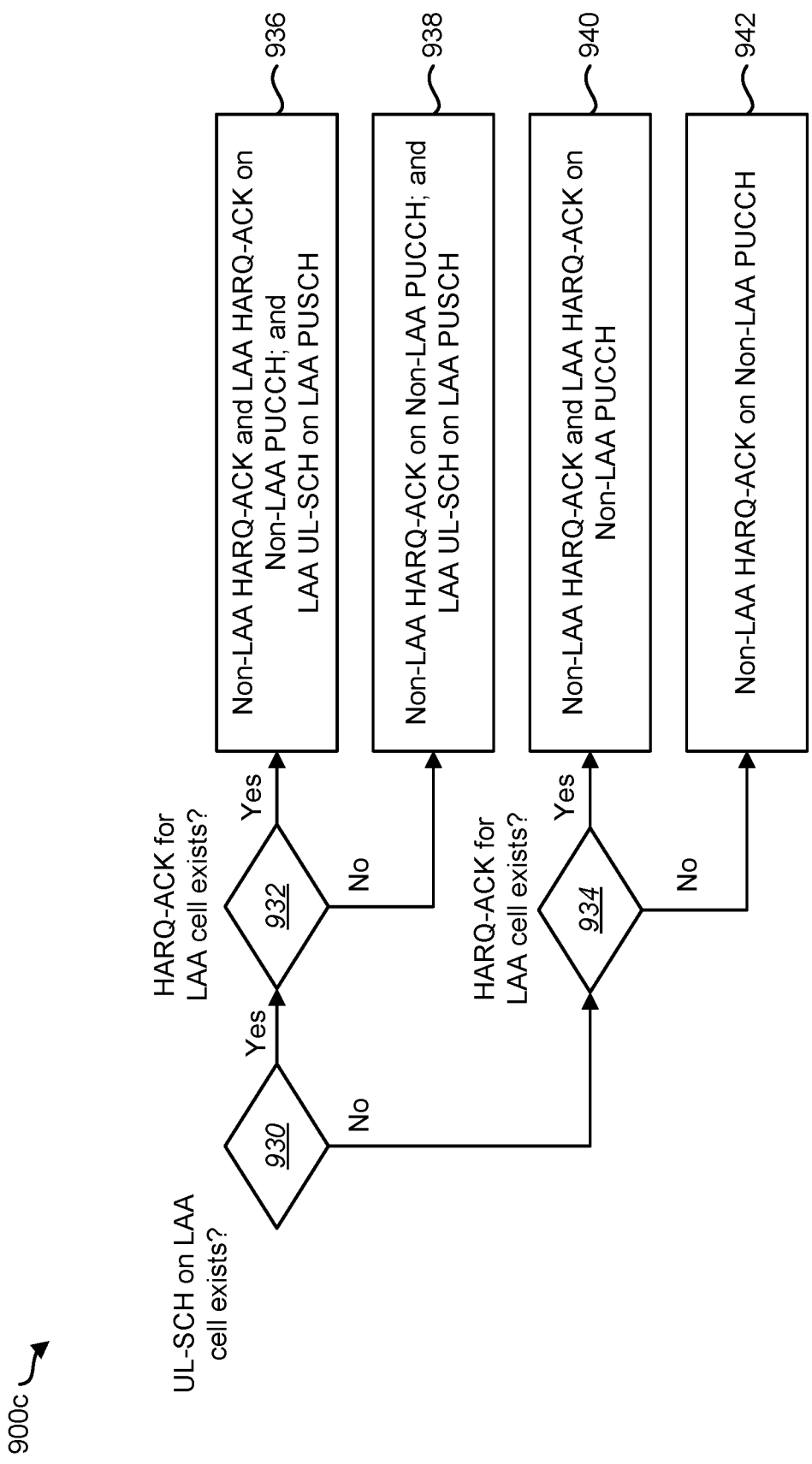

In FIG. 9C, if simultaneous PUCCH and PUSCH is configured and if UL-SCH on the non-LAA cell does not exist, but HARQ-ACK for the non-LAA cell exists (i.e., there is PUCCH on the non-LAA cell), then method 900c may be implemented.

The UE 102 may determine 930 whether a UL-SCH on the LAA cell exists. If the UL-SCH on the LAA cell exists, then the UE 102 may determine 932 whether HARQ-ACK for the LAA cell exists. If HARQ-ACK for the LAA cell exists, then the UE 102 may transmit 936 the non-LAA HARQ-ACK and LAA HARQ-ACK on the non-LAA PUCCH. The UE 102 may also transmit 936 the LAA UL-SCH on the LAA PUSCH.

If the UE 102 determines 932 that HARQ-ACK for the LAA cell does not exist, then the UE 102 may transmit 938 the non-LAA HARQ-ACK on the non-LAA PUCCH. The UE 102 may also transmit 938 the LAA UL-SCH on the LAA PUSCH.

If the UE 102 determines 930 that a UL-SCH on the LAA cell does not exist, then the UE 102 may determine 934 whether HARQ-ACK for the LAA cell exists. If HARQ-ACK for the LAA cell exists, then the UE 102 may transmit 940 the non-LAA HARQ-ACK and LAA HARQ-ACK on the non-LAA PUCCH. If the UE 102 determines 934 that HARQ-ACK for the LAA cell does not exist, then the UE 102 may transmit 942 the non-LAA HARQ-ACK on the non-LAA PUCCH.

Figure 9D:
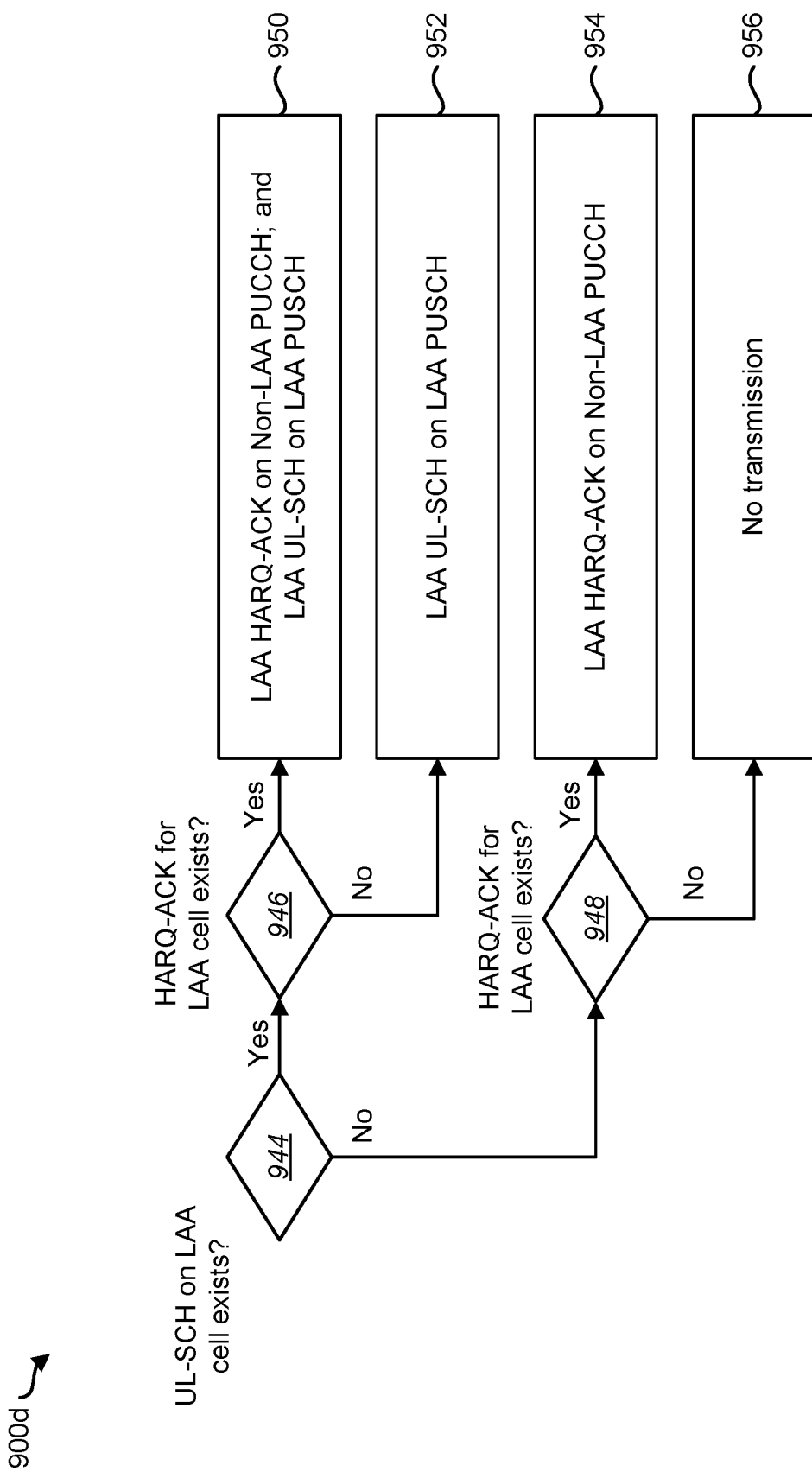

In FIG. 9D, if simultaneous PUCCH and PUSCH is configured and if neither UL-SCH on the non-LAA cell nor HARQ-ACK for the non-LAA cell exists, then method 900*d* may be implemented.

The UE 102 may determine 944 whether a UL-SCH on the LAA cell exists. If the UL-SCH on the LAA cell exists, then the UE 102 may determine 946 whether HARQ-ACK for the LAA cell exists. If HARQ-ACK for the LAA cell exists, then the UE 102 may transmit 950 LAA HARQ-ACK on the non-LAA PUCCH. The UE 102 may also transmit 950 the LAA UL-SCH on the LAA PUSCH. If the UE 102 determines 946 that HARQ-ACK for the LAA cell does not exist, then the UE 102 may transmit 952 the LAA UL-SCH on the LAA PUSCH.

If the UE 102 determines 944 a UL-SCH on the LAA cell does not exist, then the UE 102 may determine 948 whether HARQ-ACK for the LAA cell exists. If HARQ-ACK for the LAA cell exists, then the UE 102 may transmit 954 LAA HARQ-ACK on the non-LAA PUCCH. If the UE 102 determines 948 that HARQ-ACK for the LAA cell does not exist, then in step 956, the UE 102 may not send a transmission.

Figure 10A:
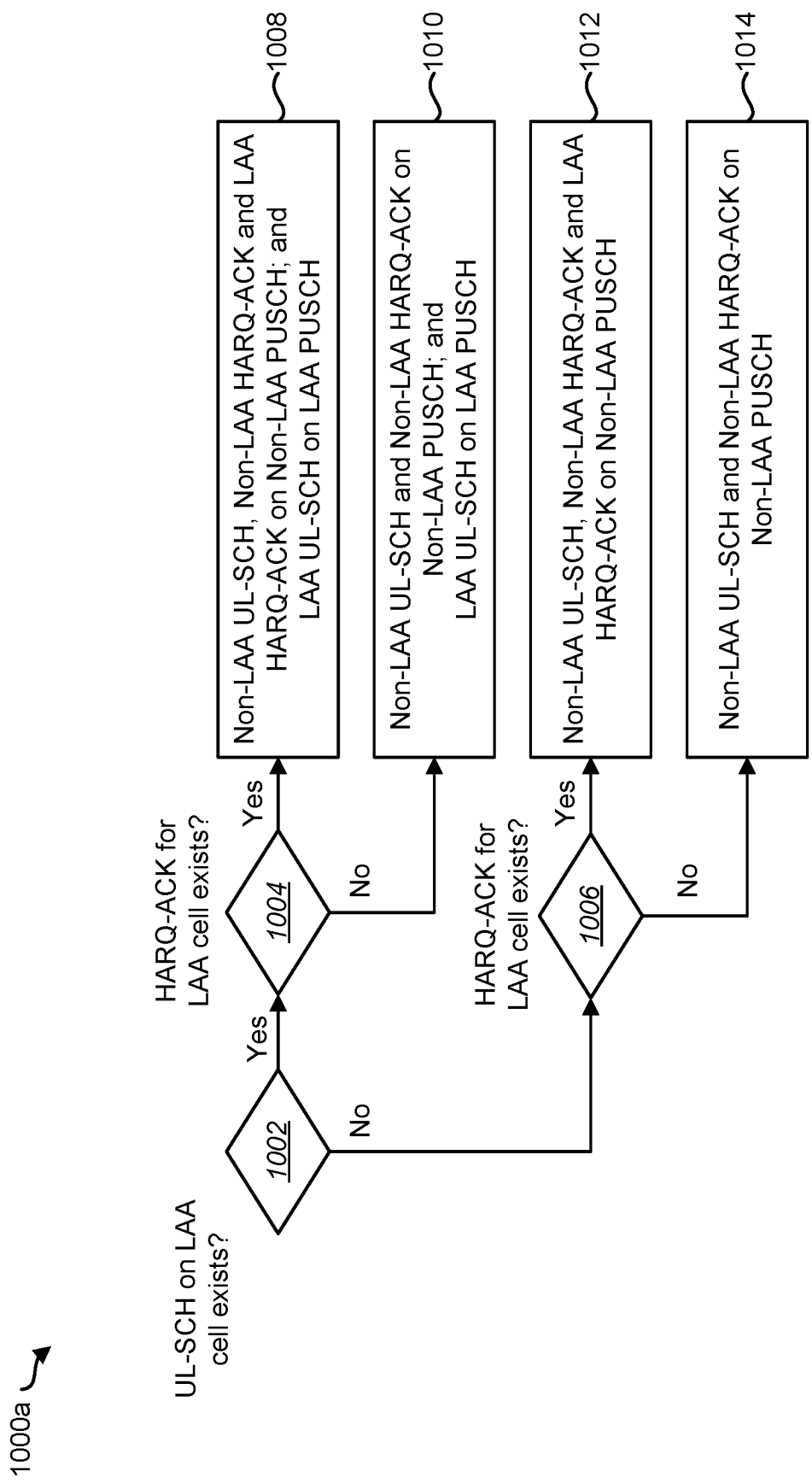
FIGS. 10A-10D are flow diagrams illustrating additional methods for UCI reporting by a UE where HARQ-ACK for an LAA SCell may piggyback on a non-LAA cell.

FIGS. 10A-10D are flow diagrams illustrating additional methods for UCI reporting by a UE 102 where HARQ-ACK for an LAA SCell may piggyback on a non-LAA cell. In FIG. 10A, if simultaneous PUCCH and PUSCH is not configured and if UL-SCH on the non-LAA cell and HARQ-ACK for the non-LAA cell exists (i.e., there is PUSCH on the non-LAA cell), then method 1000*a* may be implemented.

The UE 102 may determine 1002 whether a UL-SCH on the LAA cell exists. If the UL-SCH on the LAA cell exists, then the UE 102 may determine 1004 whether HARQ-ACK for the LAA cell exists. If HARQ-ACK for the LAA cell exists, then the UE 102 may transmit 1008 the non-LAA UL-SCH, non-LAA HARQ-ACK and LAA HARQ-ACK on the non-LAA PUSCH. The UE 102 may also transmit 1008 the LAA UL-SCH on the LAA PUSCH.

If the UE 102 determines 1004 that HARQ-ACK for the LAA cell does not exist, then the UE 102 may transmit 1010 the non-LAA UL-SCH and non-LAA HARQ-ACK on the non-LAA PUSCH. The UE 102 may also transmit 1010 the LAA UL-SCH on the LAA PUSCH.

If the UE 102 determines 1002 that a UL-SCH on the LAA cell does not exist, the UE 102 may determine 1006 whether HARQ-ACK for the LAA cell exists. If HARQ-ACK for the LAA cell exists, then the UE 102 may transmit 1012 the non-LAA UL-SCH, non-LAA HARQ-ACK, and LAA HARQ-ACK on the non-LAA PUSCH. If the UE 102 determines 1006 that HARQ-ACK for the LAA cell does not exist, the UE 102 may transmit 1014 the non-LAA UL-SCH and non-LAA HARQ-ACK on the non-LAA PUSCH.

Figure 10B:
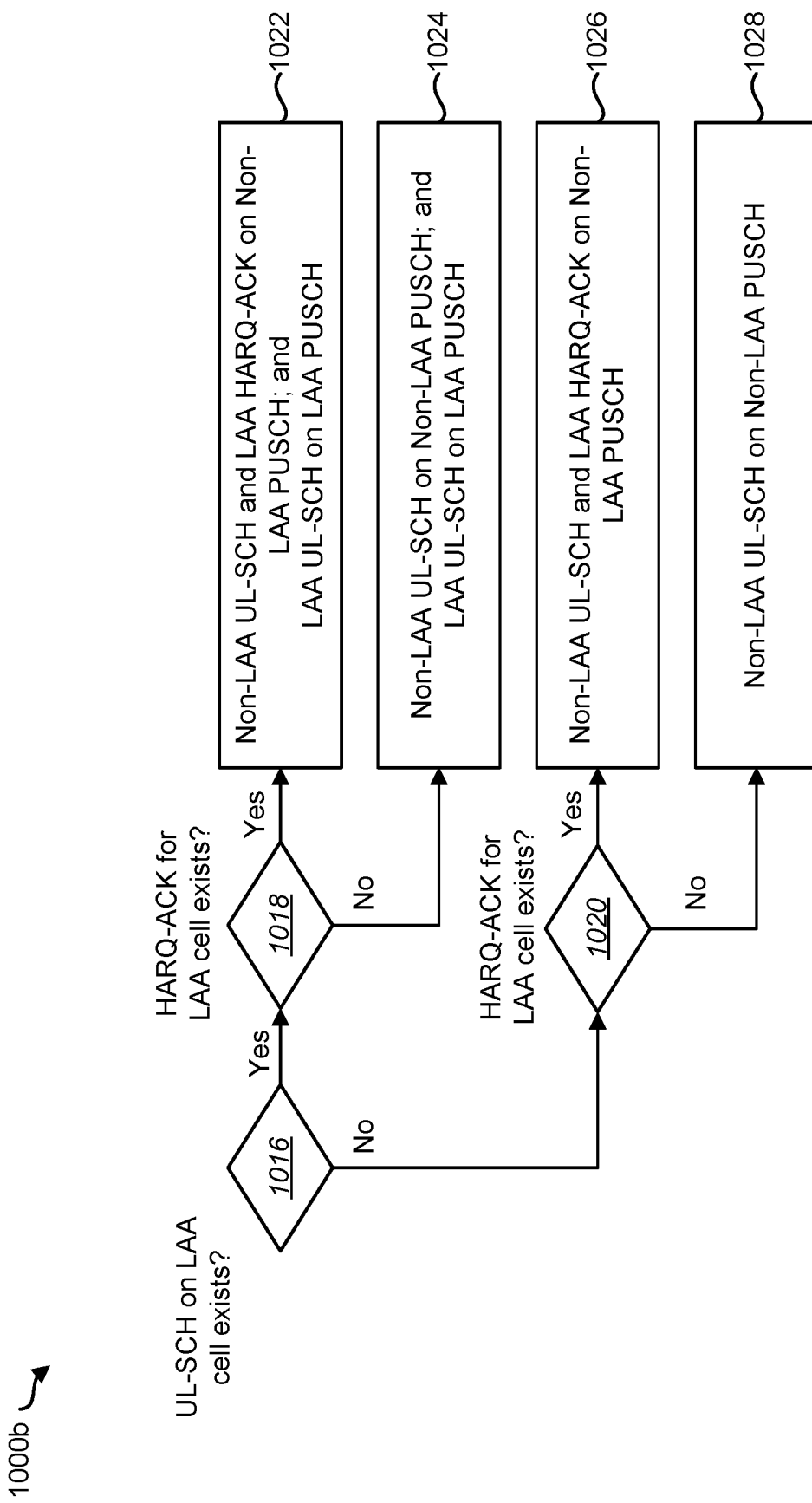

In FIG. 10B, if simultaneous PUCCH and PUSCH is configured and if UL-SCH on the non-LAA cell exists but HARQ-ACK for the non-LAA cell does not exist, then method 1000*b* may be implemented.

The UE 102 may determine 1016 whether a UL-SCH on the LAA cell exists. If the UL-SCH on the LAA cell exists, then the UE 102 may determine 1018 whether HARQ-ACK for the LAA cell exists. If HARQ-ACK for the LAA cell exists, then the UE 102 may transmit 1022 the non-LAA UL-SCH and LAA HARQ-ACK on the non-LAA PUSCH. The UE 102 may also transmit 1022 the LAA UL-SCH on the LAA PUSCH.

If the UE 102 determines 1018 that HARQ-ACK for the LAA cell does not exist, then the UE 102 may transmit 1024 the non-LAA UL-SCH on the non-LAA PUSCH. The UE 102 may also transmit 1024 the LAA UL-SCH on the LAA PUSCH.

If the UE 102 determines 1016 that a UL-SCH on the LAA cell does not exist, the UE 102 may determine 1020 whether HARQ-ACK for the LAA cell exists. If HARQ-ACK for the LAA cell exists, then the UE 102 may transmit 1026 the non-LAA UL-SCH and LAA HARQ-ACK on the non-LAA PUSCH. If the UE 102 determines 1020 that HARQ-ACK for the LAA cell does not exist, the UE 102 may transmit 1028 the non-LAA UL-SCH on the non-LAA PUSCH.

Figure 10C:
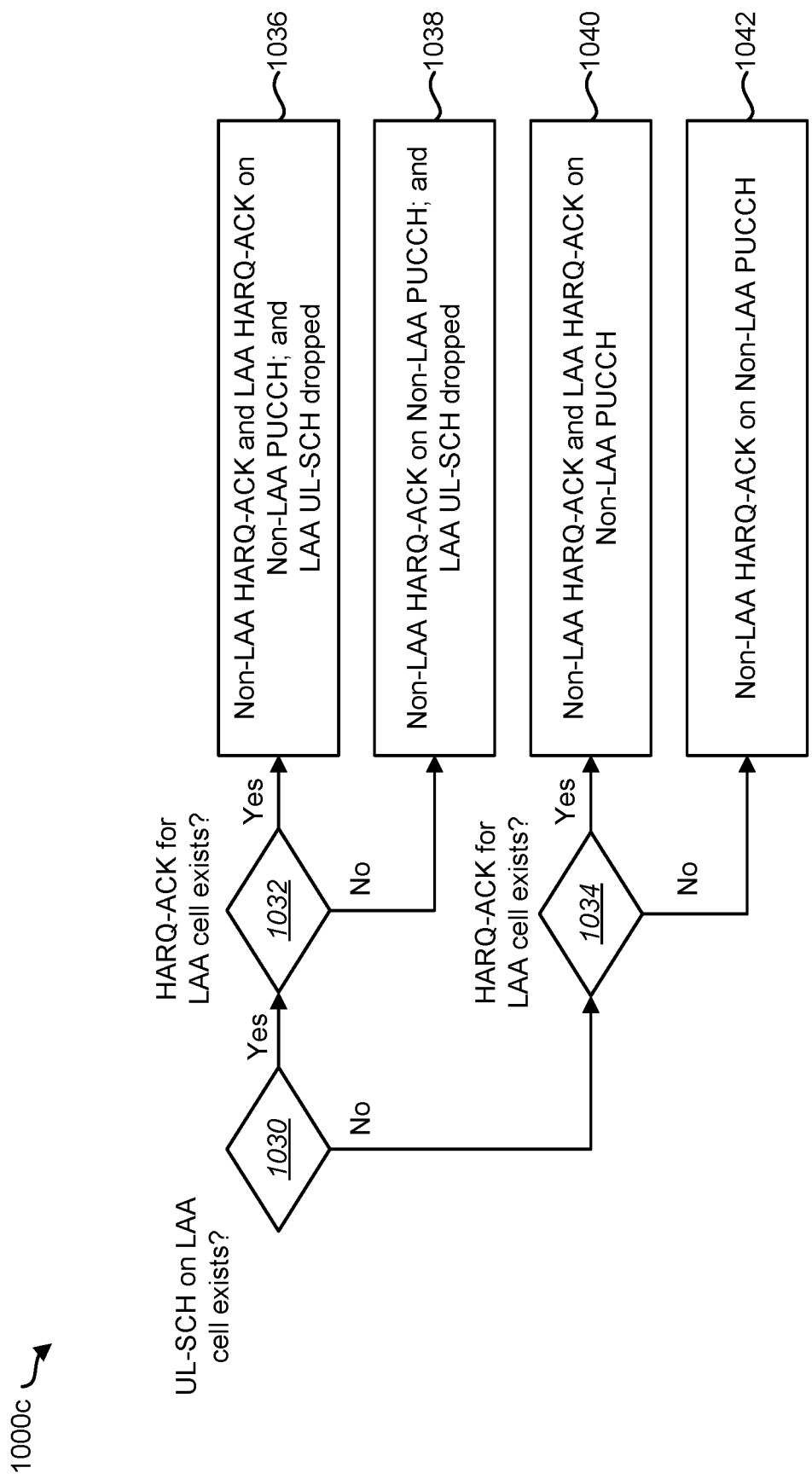

In FIG. 10C, if simultaneous PUCCH and PUSCH is not configured and if UL-SCH on the non-LAA cell does not exist but HARQ-ACK for the non-LAA cell exists (i.e., there is PUCCH on the non-LAA cell), then method 1000*c* may be implemented.

The UE 102 may determine 1030 whether a UL-SCH on the LAA cell exists. If the UL-SCH on the LAA cell exists, then the UE 102 may determine 1032 whether HARQ-ACK for the LAA cell exists. If HARQ-ACK for the LAA cell exists, then in step 1036, the UE 102 may transmit non-LAA HARQ-ACK and LAA HARQ-ACK on the non-LAA PUCCH. In step 1036, the UE 102 may also drop the LAA UL-SCH. It should be noted that step 1036 may not be valid scheduling.

If the UE 102 determines 1032 that HARQ-ACK for the LAA cell does not exist, then in step 1038, the UE 102 may transmit non-LAA HARQ-ACK on the non-LAA PUCCH. In step 1038, the UE 102 may also drop the LAA UL-SCH. It should be noted that step 1038 may not be valid scheduling.

If the UE 102 determines 1030 that a UL-SCH on the LAA cell does not exist, the UE 102 may determine 1034 whether HARQ-ACK for the LAA cell exists. If HARQ-ACK for the LAA cell exists, then the UE 102 may transmit 1040 non-LAA HARQ-ACK and LAA HARQ-ACK on the non-LAA PUCCH. If the UE 102 determines 1034 that HARQ-ACK for the LAA cell does not exist, the UE 102 may transmit 1042 non-LAA HARQ-ACK on the non-LAA PUCCH.

Figure 10D:
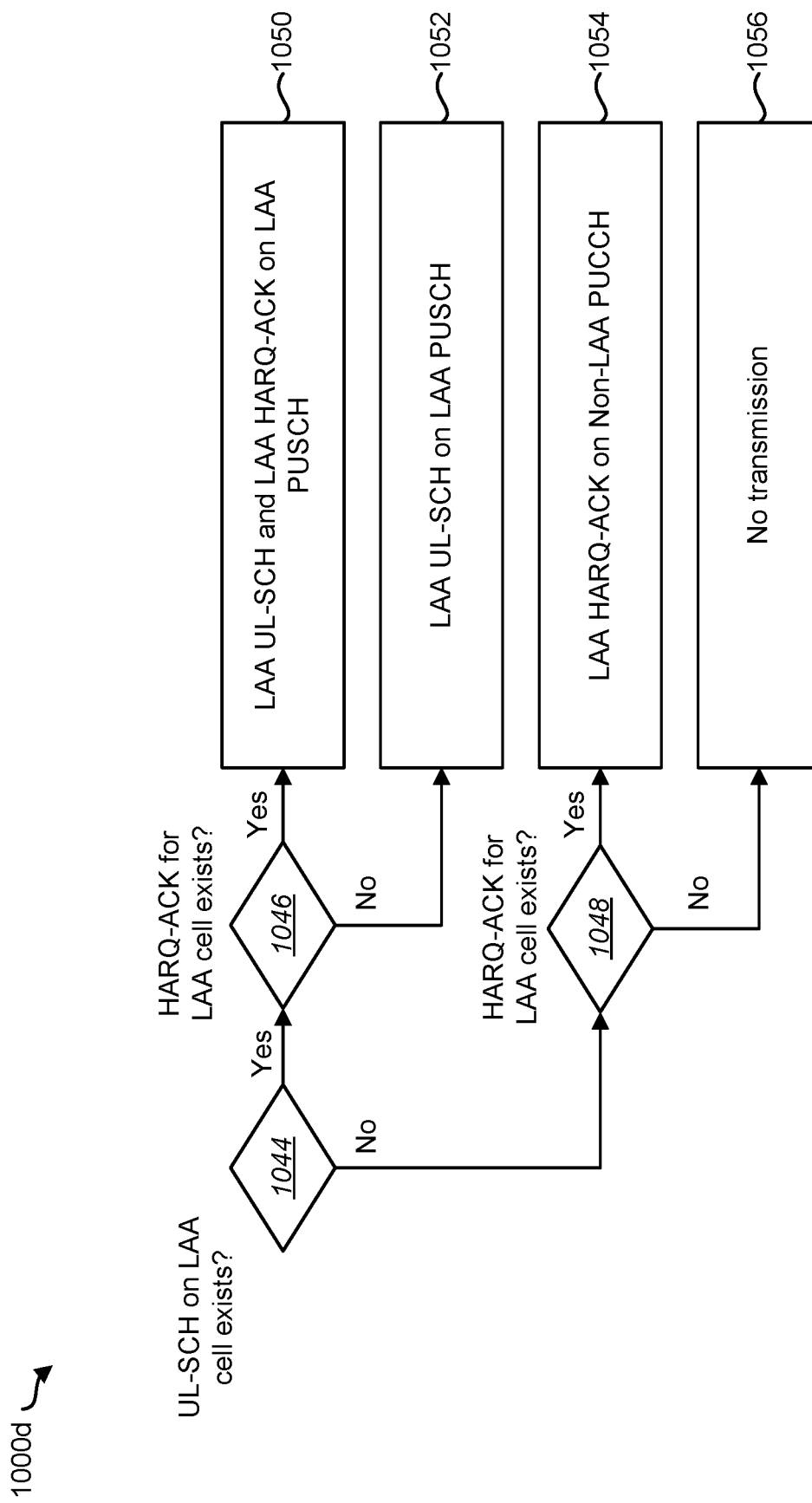

In FIG. 10D, if simultaneous PUCCH and PUSCH is not configured and if neither UL-SCH on the non-LAA cell nor HARQ-ACK for the non-LAA cell exists, then method 1000*d* may be implemented.

The UE 102 may determine 1044 whether a UL-SCH on the LAA cell exists. If the UL-SCH on the LAA cell exists, then the UE 102 may determine 1046 whether HARQ-ACK for the LAA cell exists. If HARQ-ACK for the LAA cell exists, then the UE 102 may transmit 1050 the LAA UL-SCH and the LAA HARQ-ACK on the LAA PUSCH. If the UE 102 determines 1046 that HARQ-ACK for the LAA cell does not exist, then the UE 102 may transmit 1052 the LAA UL-SCH on the LAA PUSCH.

If the UE 102 determines 1044 that a UL-SCH on the LAA cell does not exist, the UE 102 may determine 1048 whether HARQ-ACK for the LAA cell exists. If HARQ-ACK for the LAA cell exists, then the UE 102 may transmit 1054 LAA HARQ-ACK on the non-LAA PUCCH. If the UE 102 determines 1048 that HARQ-ACK for the LAA cell does not exist, then in step 1056, the UE 102 may then not send a transmission.

Figure 11A:
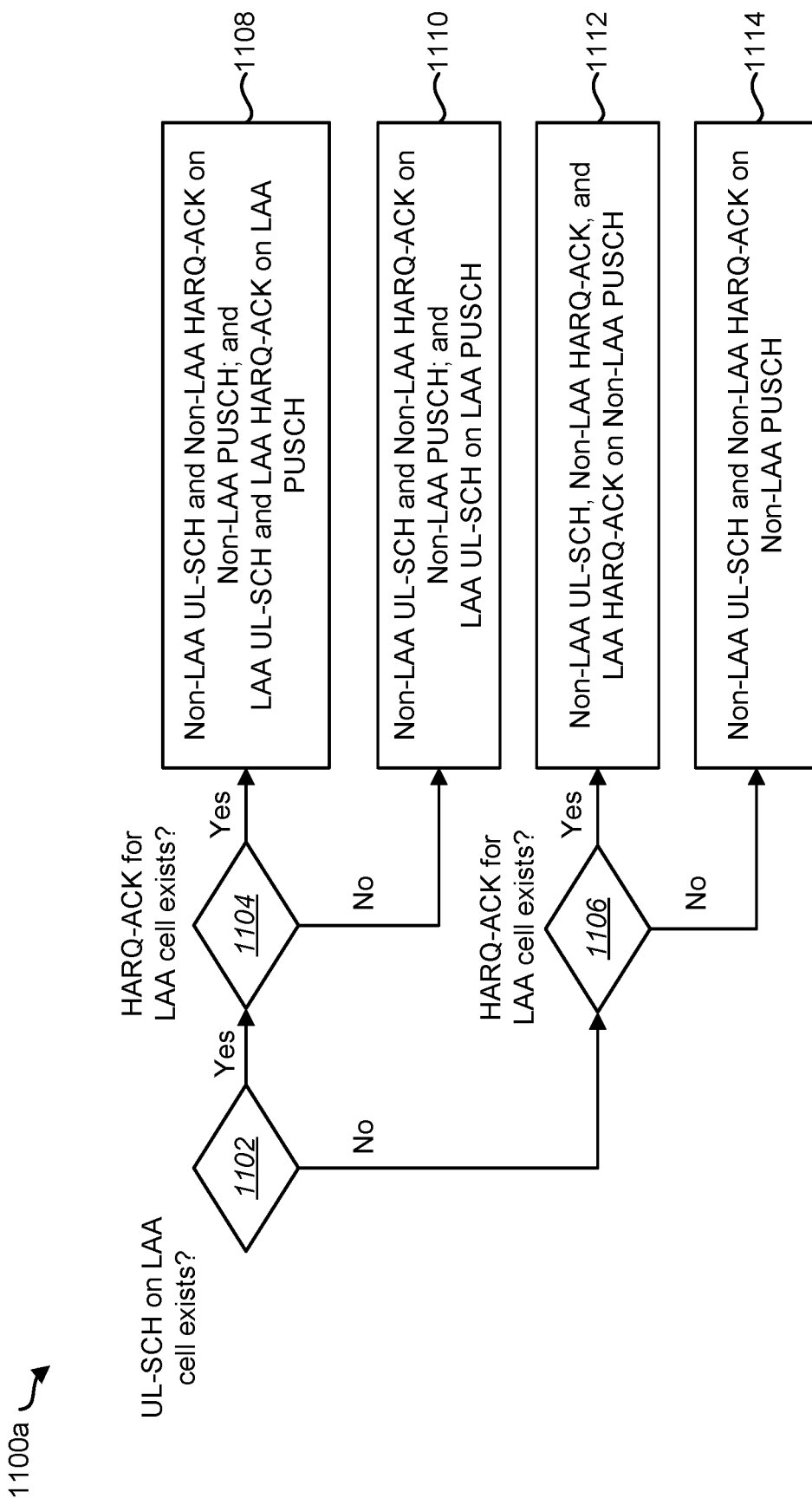
FIGS. 11A-11D are flow diagrams illustrating methods for UCI reporting by a UE where HARQ-ACK for an LAA SCell may not piggyback on a non-LAA cell if the LAA cell has a physical uplink shared channel (PUSCH) transmission.

FIGS. 11A-11D are flow diagrams illustrating methods for UCI reporting by a UE 102 where HARQ-ACK for an LAA SCell may not piggyback on a non-LAA cell if the LAA cell has a PUSCH transmission. In FIG. 11A, if simultaneous PUCCH and PUSCH is not configured and if UL-SCH on the non-LAA cell and HARQ-ACK for the non-LAA cell exists (i.e., there is PUSCH on the non-LAA cell), then method 1100*a* may be implemented.

The UE 102 may determine 1102 whether a UL-SCH on the LAA cell exists. If the UL-SCH on the LAA cell exists, then the UE 102 may determine 1104 whether HARQ-ACK for the LAA cell exists. If HARQ-ACK for the LAA cell exists, then the UE 102 may transmit 1108 the non-LAA UL-SCH and non-LAA HARQ-ACK on the non-LAA PUSCH. The UE 102 may also transmit 1108 the LAA UL-SCH and LAA HARQ-ACK on the LAA PUSCH.

If the UE 102 determines 1104 that HARQ-ACK for the LAA cell does not exist, then the UE 102 may transmit 1110 the non-LAA UL-SCH and non-LAA HARQ-ACK on the non-LAA PUSCH. The UE 102 may also transmit 1110 the LAA UL-SCH on the LAA PUSCH.

If the UE 102 determines 1102 that a UL-SCH on the LAA cell does not exist, the UE 102 may determine 1106 whether HARQ-ACK for the LAA cell exists. If HARQ-ACK for the LAA cell exists, then the UE 102 may transmit 1112 the non-LAA UL-SCH, non-LAA HARQ-ACK, and LAA HARQ-ACK on the non-LAA PUSCH. If the UE 102 determines 1106 that HARQ-ACK for the LAA cell does not exist, the UE 102 may transmit 1114 the non-LAA UL-SCH and non-LAA HARQ-ACK on the non-LAA PUSCH.

Figure 11B:
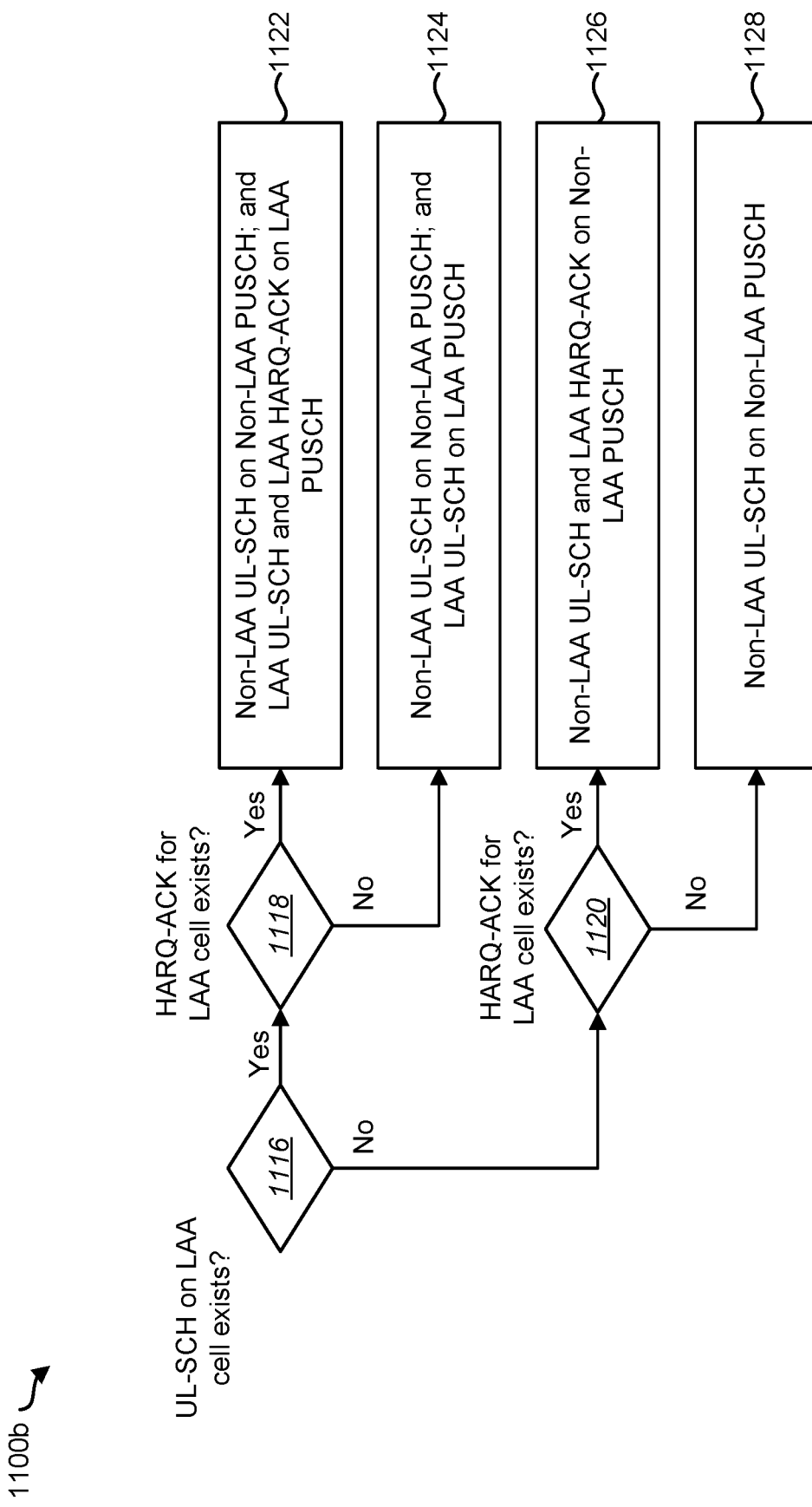

In FIG. 11B, if simultaneous PUCCH and PUSCH is configured and if UL-SCH on the non-LAA cell exists but HARQ-ACK for the non-LAA cell does not exist, then method 1100*b* may be implemented.

The UE 102 may determine 1116 whether a UL-SCH on the LAA cell exists. If the UL-SCH on the LAA cell exists, then the UE 102 may determine 1118 whether HARQ-ACK for the LAA cell exists. If HARQ-ACK for the LAA cell exists, then the UE 102 may transmit 1122 the non-LAA UL-SCH on the non-LAA PUSCH. The UE 102 may also transmit 1122 the LAA UL-SCH and LAA HARQ-ACK on the LAA PUSCH.

If the UE 102 determines 1118 that HARQ-ACK for the LAA cell does not exist, then the UE 102 may transmit 1124 the non-LAA UL-SCH on the non-LAA PUSCH. The UE 102 may also transmit 1124 the LAA UL-SCH on the LAA PUSCH.

If the UE 102 determines 1116 that a UL-SCH on the LAA cell does not exist, the UE 102 may determine 1120 whether HARQ-ACK for the LAA cell exists. If HARQ-ACK for the LAA cell exists, then the UE 102 may transmit 1126 the non-LAA UL-SCH and LAA HARQ-ACK on the non-LAA PUSCH. If the UE 102 determines 1120 that HARQ-ACK for the LAA cell does not exist, the UE 102 may transmit 1128 the non-LAA UL-SCH on the non-LAA PUSCH.

Figure 11C:
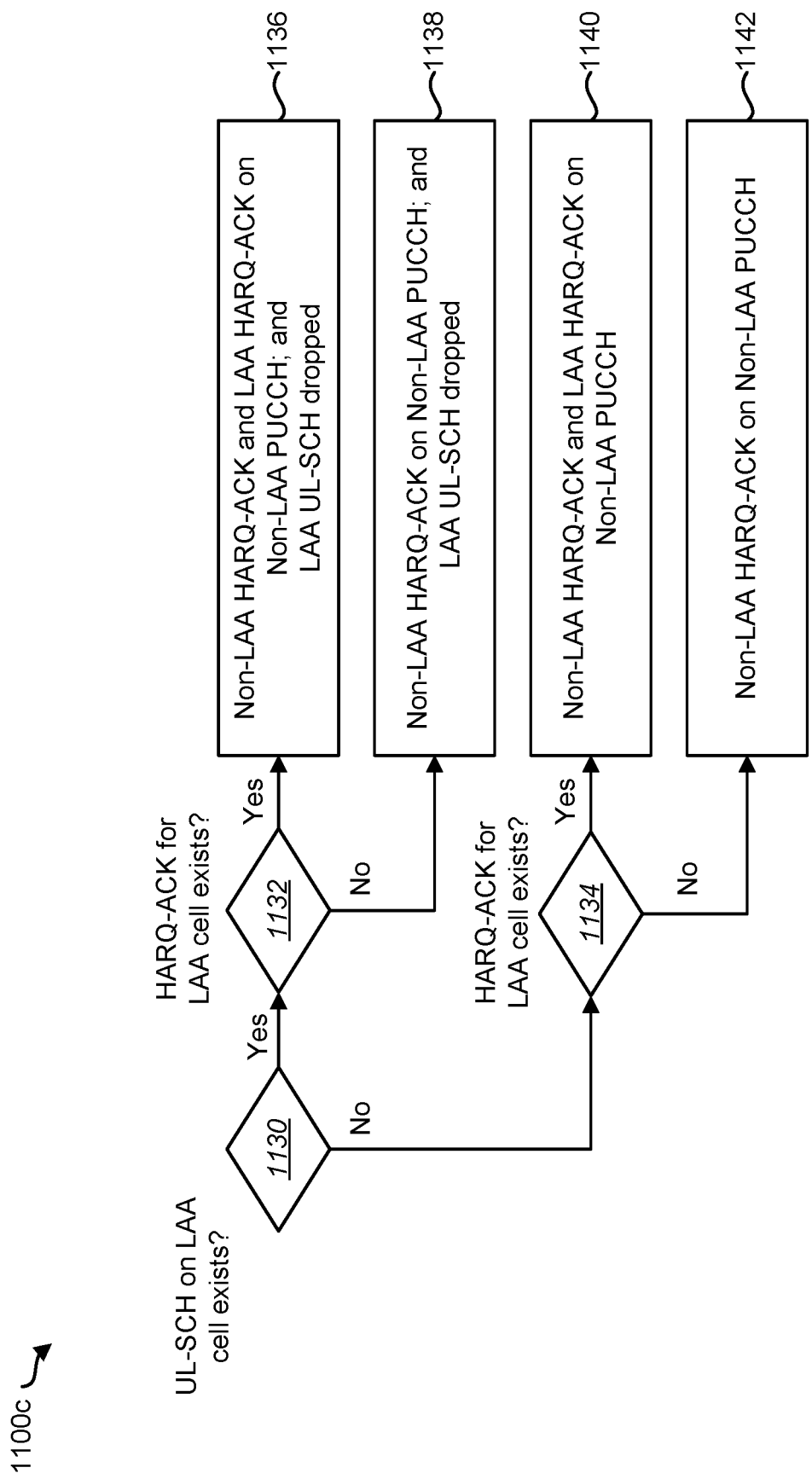

In FIG. 11C, if simultaneous PUCCH and PUSCH is not configured and if UL-SCH on the non-LAA cell does not exist but HARQ-ACK for the non-LAA cell exists (i.e., there is PUCCH on the non-LAA cell), then method 1100*c* may be implemented.

The UE 102 may determine 1130 whether a UL-SCH on the LAA cell exists. If the UL-SCH on the LAA cell exists, then the UE 102 may determine 1132 whether HARQ-ACK for the LAA cell exists. If HARQ-ACK for the LAA cell exists, then in step 1136 the UE 102 may transmit non-LAA HARQ-ACK and LAA HARQ-ACK on the non-LAA PUCCH. In step 1136, the UE 102 may also drop the LAA UL-SCH. It should be noted that step 1136 may not be valid scheduling.

If the UE 102 determines 1132 that HARQ-ACK for the LAA cell does not exist, then in step 1138 the UE 102 may transmit non-LAA HARQ-ACK on the non-LAA PUCCH. In step 1138, the UE 102 may also drop the LAA UL-SCH. It should be noted that step 1138 may not be valid scheduling.

If the UE 102 determines 1130 that a UL-SCH on the LAA cell does not exist, the UE 102 may determine 1134 whether HARQ-ACK for the LAA cell exists. If HARQ-ACK for the LAA cell exists, then the UE 102 may transmit 1140 non-LAA HARQ-ACK and LAA HARQ-ACK on the non-LAA PUCCH. If the UE 102 determines 1134 that HARQ-ACK for the LAA cell does not exist, the UE 102 may transmit 1142 non-LAA HARQ-ACK on the non-LAA PUCCH.

Figure 11D:
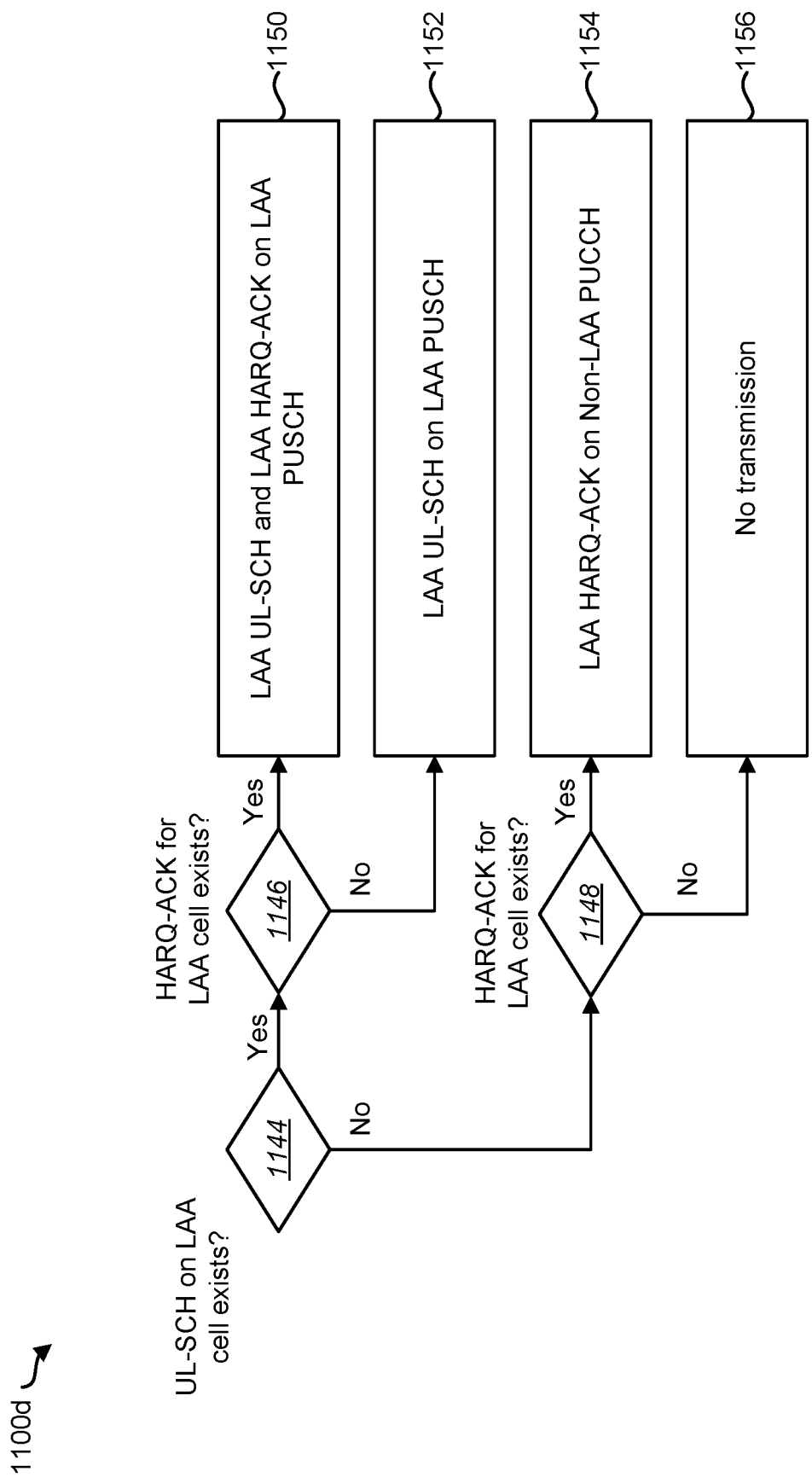

In FIG. 11D, if simultaneous PUCCH and PUSCH is not configured and if neither UL-SCH on the non-LAA cell nor HARQ-ACK for the non-LAA cell exists, then method 1100*c* may be implemented.

The UE 102 may determine 1144 whether a UL-SCH on the LAA cell exists. If the UL-SCH on the LAA cell exists, then the UE 102 may determine 1146 whether HARQ-ACK for the LAA cell exists. If HARQ-ACK for the LAA cell exists, then the UE 102 may transmit 1150 the LAA UL-SCH and LAA HARQ-ACK on the LAA PUSCH. If the UE 102 determines 1146 that HARQ-ACK for the LAA cell does not exist, then the UE 102 may transmit 1152 the LAA UL-SCH on the LAA PUSCH.

If the UE 102 determines 1144 that a UL-SCH on the LAA cell does not exist, the UE 102 may determine 1148 whether HARQ-ACK for the LAA cell exists. If HARQ-ACK for the LAA cell exists, then the UE 102 may transmit 1154 LAA HARQ-ACK on the non-LAA PUCCH. If the UE 102 determines 1148 that HARQ-ACK for the LAA cell does not exist, then in step 1156 the UE 102 may not send a transmission.

FIGS. 12A-12D are flow diagrams illustrating methods for UCI reporting by a UE 102 where HARQ-ACK for an LAA SCell may be carried by a PUSCH-like PUCCH on an LAA SCell if no PUSCH transmission exists on the LAA SCell. The PUSCH-like PUCCH may also be referred to as ePUCCH and PUCCH format 6. In this case, simultaneous ePUCCH and PUSCH transmission is allowed even if simultaneous PUCCH and PUSCH transmission is not configured.

Figure 12A:
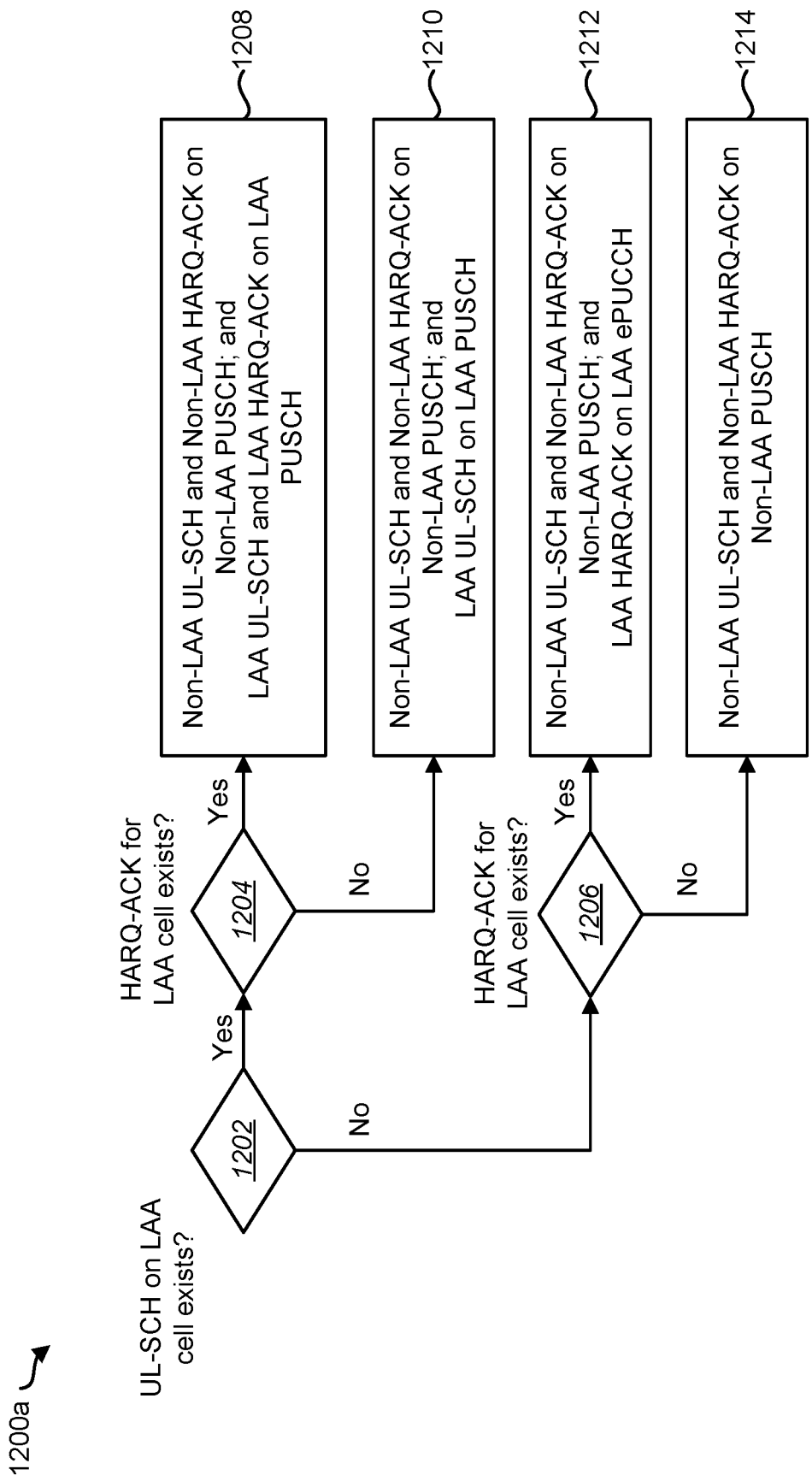
FIGS. 12A-12D are flow diagrams illustrating methods for UCI reporting by a UE where HARQ-ACK for an LAA SCell may be carried by a PUSCH-like physical uplink control channel (PUCCH) on an LAA SCell if no PUSCH transmission exists on the LAA SCell.

In FIG. 12A, if simultaneous PUCCH and PUSCH is not configured and if UL-SCH on the non-LAA cell and HARQ-ACK for the non-LAA cell exists (i.e., there is PUSCH on the non-LAA cell), then method 1200*a* may be implemented.

The UE 102 may determine 1202 whether a UL-SCH on the LAA cell exists. If the UL-SCH on the LAA cell exists, then the UE 102 may determine 1204 whether HARQ-ACK for the LAA cell exists. If HARQ-ACK for the LAA cell exists, then the UE 102 may transmit 1208 the non-LAA UL-SCH and non-LAA HARQ-ACK on the non-LAA PUSCH. The UE 102 may also transmit 1208 the LAA UL-SCH and LAA HARQ-ACK on the LAA PUSCH.

If the UE 102 determines 1204 that HARQ-ACK for the LAA cell does not exist, then the UE 102 may transmit 1210 the non-LAA UL-SCH and non-LAA HARQ-ACK on the non-LAA PUSCH. The UE 102 may also transmit 1210 the LAA UL-SCH on the LAA PUSCH.

If the UE 102 determines 1202 that a UL-SCH on the LAA cell does not exist, the UE 102 may determine 1206 whether HARQ-ACK for the LAA cell exists. If HARQ-ACK for the LAA cell exists, then the UE 102 may transmit 1212 the non-LAA UL-SCH and non-LAA HARQ-ACK on the non-LAA PUSCH. The UE 102 may also transmit 1212 LAA HARQ-ACK on the LAA ePUCCH.

If the UE 102 determines 1206 that HARQ-ACK for the LAA cell does not exist, the UE 102 may transmit 1214 the non-LAA UL-SCH and non-LAA HARQ-ACK on the non-LAA PUSCH.

Figure 12B:
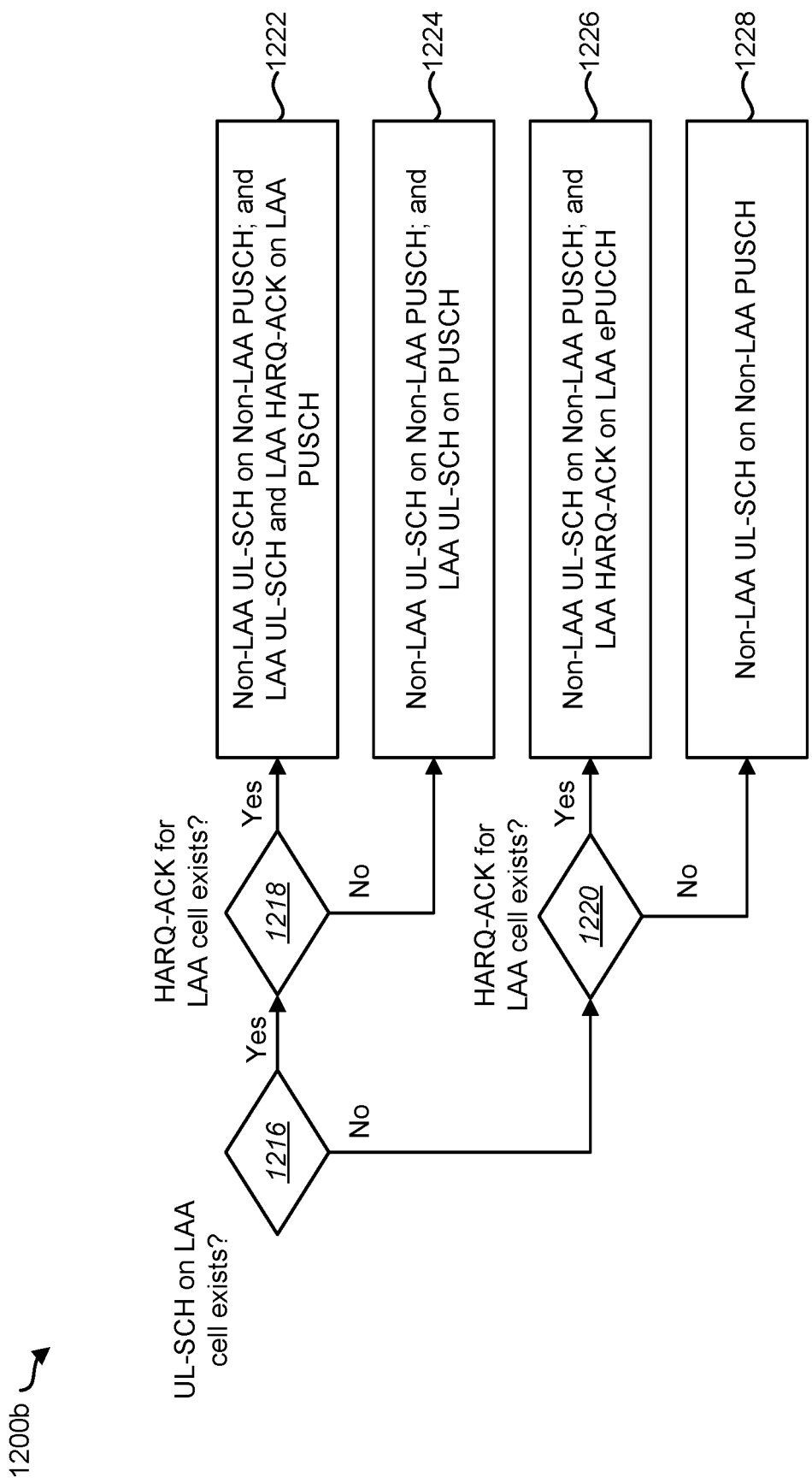

In FIG. 12B, if simultaneous PUCCH and PUSCH is configured and if UL-SCH on the non-LAA cell exists but HARQ-ACK for the non-LAA cell does not exist, then method 1200b may be implemented.

The UE 102 may determine 1216 whether a UL-SCH on the LAA cell exists. If the UL-SCH on the LAA cell exists, then the UE 102 may determine 1218 whether HARQ-ACK for the LAA cell exists. If HARQ-ACK for the LAA cell exists, then the UE 102 may transmit 1222 the non-LAA UL-SCH on the non-LAA PUSCH. The UE 102 may also transmit 1222 the LAA UL-SCH and LAA HARQ-ACK on the LAA PUSCH.

If the UE 102 determines 1218 that HARQ-ACK for the LAA cell does not exist, then the UE 102 may transmit 1224 the non-LAA UL-SCH on the non-LAA PUSCH. The UE 102 may also transmit 1224 the LAA UL-SCH on the PUSCH.

If the UE 102 determines 1216 that a UL-SCH on the LAA cell does not exist, the UE 102 may determine 1220 whether HARQ-ACK for the LAA cell exists. If HARQ-ACK for the LAA cell exists, then the UE 102 may transmit 1226 the non-LAA UL-SCH on the non-LAA PUSCH. The UE 102 may also transmit 1226 LAA HARQ-ACK on the LAA ePUCCH. If the UE 102 determines 1220 that HARQ-ACK for the LAA cell does not exist, the UE 102 may transmit 1228 the non-LAA UL-SCH on the non-LAA PUSCH.

Figure 12C:
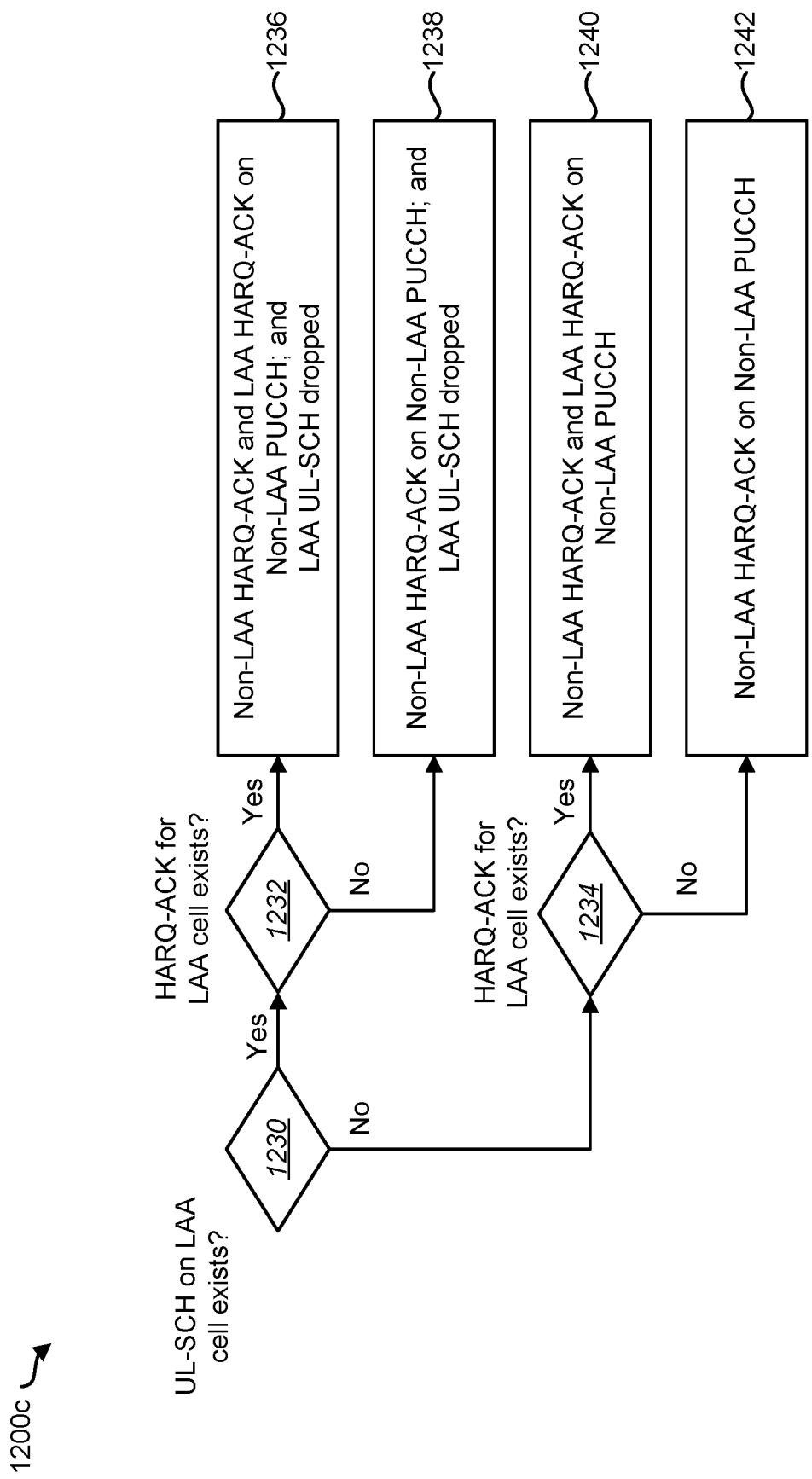

In FIG. 12C, if simultaneous PUCCH and PUSCH is not configured and if UL-SCH on the non-LAA cell does not exist but HARQ-ACK for the non-LAA cell exists (i.e., there is PUCCH on the non-LAA cell), then method 1200c may be implemented.

The UE 102 may determine 1230 whether a UL-SCH on the LAA cell exists. If the UL-SCH on the LAA cell exists, then the UE 102 may determine 1232 whether HARQ-ACK for the LAA cell exists. If HARQ-ACK for the LAA cell exists, then in step 1236 the UE 102 may transmit non-LAA HARQ-ACK and LAA HARQ-ACK on the non-LAA PUCCH. In step 1236, the UE 102 may also drop the LAA UL-SCH. It should be noted that step 1236 may not be valid scheduling.

If the UE 102 determines 1232 that HARQ-ACK for the LAA cell does not exist, then the UE 102 may in step 1238 transmit non-LAA HARQ-ACK on the non-LAA PUCCH. In step 1238, the UE 102 may also drop the LAA UL-SCH. It should be noted that step 1238 may not be valid scheduling.

If the UE 102 determines 1230 that a UL-SCH on the LAA cell does not exist, the UE 102 may determine 1234 whether HARQ-ACK for the LAA cell exists. If HARQ-ACK for the LAA cell exists, then the UE 102 may transmit 1240 non-LAA HARQ-ACK and LAA HARQ-ACK on the non-LAA PUCCH. If the UE 102 determines 1234 that HARQ-ACK for the LAA cell does not exist, the UE 102 may transmit 1242 non-LAA HARQ-ACK on the non-LAA PUCCH.

Figure 12D:
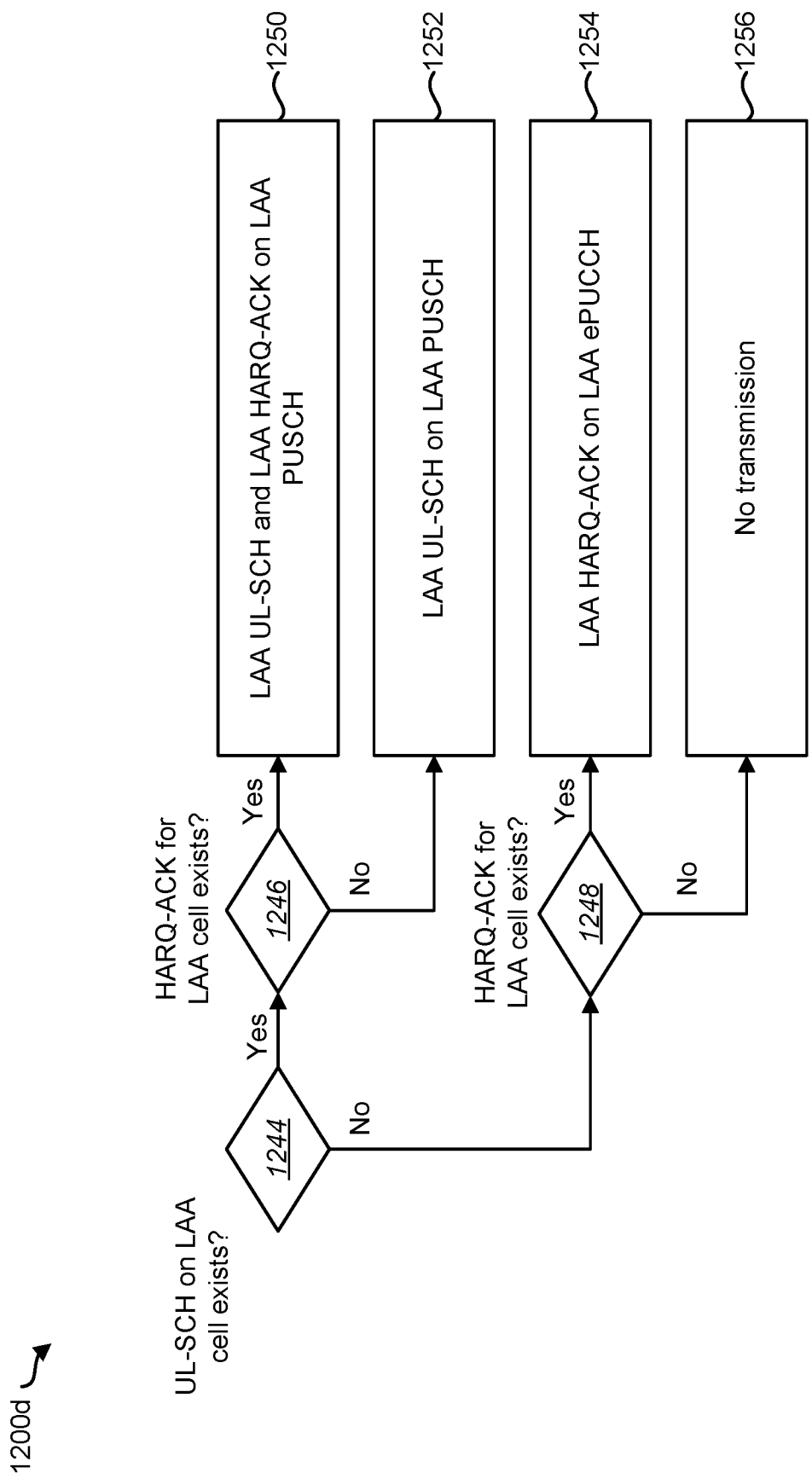

In FIG. 12D, if simultaneous PUCCH and PUSCH is not configured and if neither UL-SCH on the non-LAA cell nor HARQ-ACK for the non-LAA cell exists, then method 1200d may be implemented.

The UE 102 may determine 1244 whether a UL-SCH on the LAA cell exists. If the UL-SCH on the LAA cell exists, then the UE 102 may determine 1246 whether HARQ-ACK for the LAA cell exists. If HARQ-ACK for the LAA cell exists, then the UE 102 may transmit 1250 the LAA UL-SCH and LAA HARQ-ACK on the LAA PUSCH. If the UE 102 determines 1246 that HARQ-ACK for the LAA cell does not exist, then the UE 102 may transmit 1252 the LAA UL-SCH on the LAA PUSCH.

If the UE 102 determines 1244 that a UL-SCH on the LAA cell does not exist, the UE 102 may determine 1248 whether HARQ-ACK for the LAA cell exists. If HARQ-ACK for the LAA cell exists, then the UE 102 may transmit 1254 LAA HARQ-ACK on the LAA ePUCCH. If the UE 102 determines 1248 that HARQ-ACK for the LAA cell does not exist, then in step 1256 the UE 102 may not send a transmission.

FIGS. 13A-13D are flow diagrams illustrating methods for UCI reporting by a UE 102 where the PUSCH-like PUCCH may be used even if simultaneous PUCCH and PUSCH transmission is configured. In FIG. 13A, if simultaneous PUCCH and PUSCH is configured and if UL-SCH on the non-LAA cell and HARQ-ACK for the non-LAA cell exists (i.e., there are PUSCH and PUCCH on the non-LAA cell), then method 1300a may be implemented.

The UE 102 may determine 1302 whether a UL-SCH on the LAA cell exists. If the UL-SCH on the LAA cell exists, then the UE 102 may determine 1304 whether HARQ-ACK for the LAA cell exists. If HARQ-ACK for the LAA cell exists, then the UE 102 may transmit 1308 the non-LAA UL-SCH on the non-LAA PUSCH. The UE 102 may also transmit 1308 non-LAA HARQ-ACK on the non-LAA PUCCH. The UE 102 may further transmit 1308 the LAA UL-SCH and LAA HARQ-ACK on the LAA PUSCH.

If the UE 102 determines 1304 that HARQ-ACK for the LAA cell does not exist, then the UE 102 may transmit 1310 the non-LAA UL-SCH on the non-LAA PUSCH. The UE 102 may also transmit 1310 non-LAA HARQ-ACK on the non-LAA PUCCH. The UE 102 may further transmit 1310 the LAA UL-SCH on the LAA PUSCH.

If the UE 102 determines 1302 that a UL-SCH on the LAA cell does not exist, the UE 102 may determine 1306 whether HARQ-ACK for the LAA cell exists. If HARQ-ACK for the LAA cell exists, then the UE 102 may transmit 1312 the non-LAA UL-SCH on the non-LAA PUSCH. The UE 102 may also transmit 1312 non-LAA HARQ-ACK on the non-LAA PUCCH. The UE 102 may further transmit 1312 LAA HARQ-ACK on the LAA ePUCCH.

If the UE 102 determines 1306 that HARQ-ACK for the LAA cell does not exist, the UE 102 may transmit 1314 the non-LAA UL-SCH on the non-LAA PUSCH. The UE 102 may also transmit 1314 non-LAA HARQ-ACK on the non-LAA PUCCH.

In FIG. 13B, if simultaneous PUCCH and PUSCH is configured and if UL-SCH on the non-LAA cell exists but HARQ-ACK for the non-LAA cell does not exist, then method 1300b may be implemented.

The UE 102 may determine 1316 whether a UL-SCH on the LAA cell exists. If the UL-SCH on the LAA cell exists, then the UE 102 may determine 1318 whether HARQ-ACK for the LAA cell exists. If HARQ-ACK for the LAA cell exists, then the UE 102 may transmit 1322 the non-LAA UL-SCH on the non-LAA PUSCH. The UE 102 may also transmit 1322 the LAA UL-SCH on the LAA PUSCH. The UE 102 may further transmit 1322 LAA HARQ-ACK on the LAA ePUCCH.

If the UE 102 determines 1318 that HARQ-ACK for the LAA cell does not exist, then the UE 102 may transmit 1324 the non-LAA UL-SCH on the non-LAA PUSCH. The UE 102 may also transmit 1324 the LAA UL-SCH on the LAA PUSCH.

If the UE 102 determines 1316 that a UL-SCH on the LAA cell does not exist, the UE 102 may determine 1320 whether HARQ-ACK for the LAA cell exists. If HARQ-ACK for the LAA cell exists, then the UE 102 may transmit 1326 the non-LAA UL-SCH on the non-LAA PUSCH. The UE 102 may also transmit 1326 LAA HARQ-ACK on the LAA ePUCCH. If the UE 102 determines 1320 that HARQ-ACK for the LAA cell does not exist, the UE 102 may transmit 1328 the non-LAA UL-SCH on the non-LAA PUSCH.

Figure 13C:
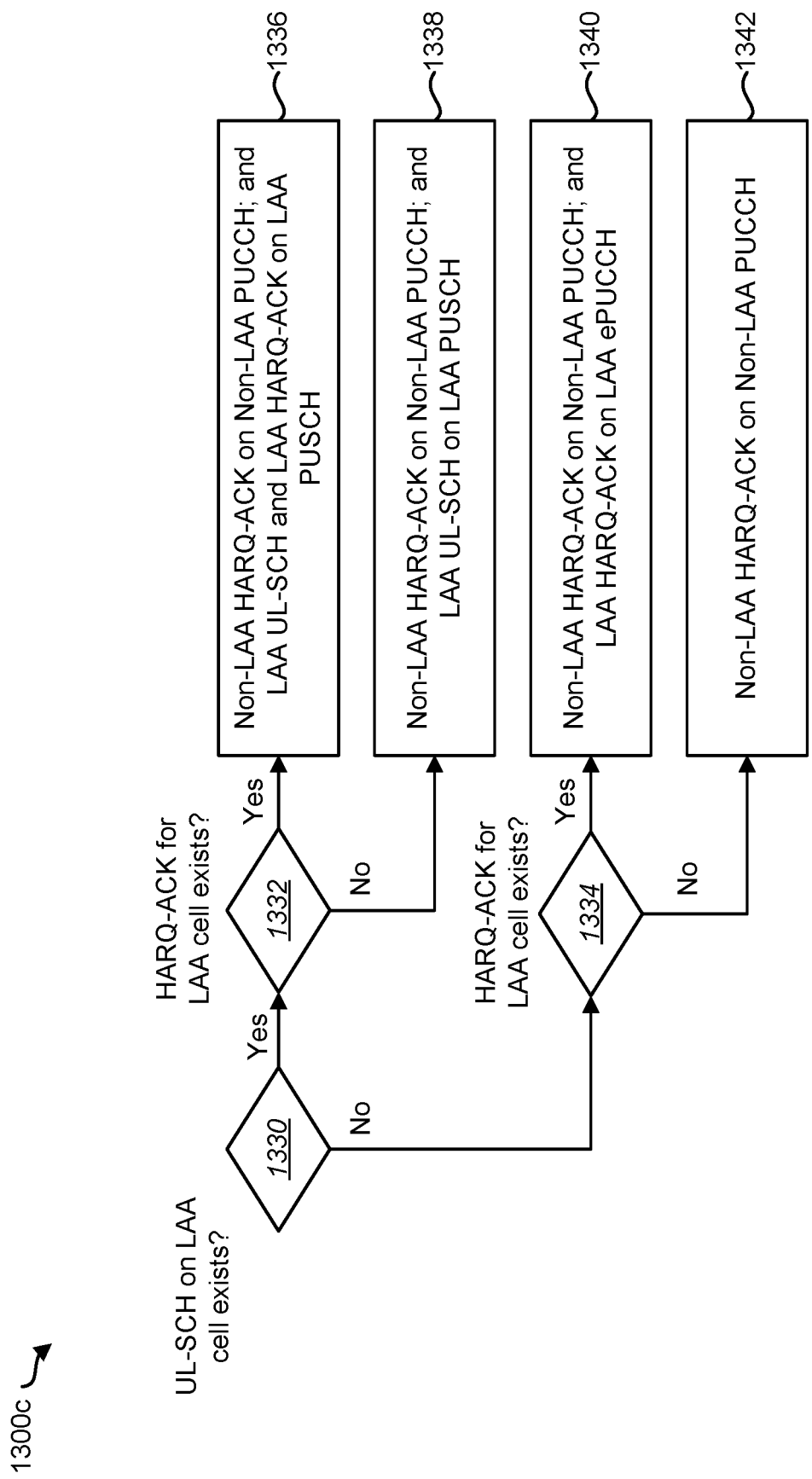

In FIG. 13C, if simultaneous PUCCH and PUSCH is configured and if UL-SCH on the non-LAA cell does not exist but HARQ-ACK for the non-LAA cell exists (i.e., there is PUCCH on the non-LAA cell), then method 1300c may be implemented.

The UE 102 may determine 1330 whether a UL-SCH on the LAA cell exists. If the UL-SCH on the LAA cell exists, then the UE 102 may determine 1332 whether HARQ-ACK for the LAA cell exists. If HARQ-ACK for the LAA cell exists, then the UE 102 may transmit 1336 non-LAA HARQ-ACK on the non-LAA PUCCH. The UE 102 may also transmit 1336 the LAA UL-SCH and LAA HARQ-ACK on the LAA PUSCH.

If the UE 102 determines 1332 that HARQ-ACK for the LAA cell does not exist, then the UE 102 may transmit 1338 non-LAA HARQ-ACK on the non-LAA PUCCH. The UE 102 may also transmit 1338 the LAA UL-SCH on the LAA PUSCH.

If the UE 102 determines 1330 that a UL-SCH on the LAA cell does not exist, the UE 102 may determine 1334 whether HARQ-ACK for the LAA cell exists. If HARQ-ACK for the LAA cell exists, then the UE 102 may transmit 1340 non-LAA HARQ-ACK on the non-LAA PUCCH. The UE 102 may also transmit 1340 LAA HARQ-ACK on the LAA ePUCCH. If the UE 102 determines 1334 that HARQ-ACK for the LAA cell does not exist, the UE 102 may transmit 1342 non-LAA HARQ-ACK on the non-LAA PUCCH.

Figure 13D:
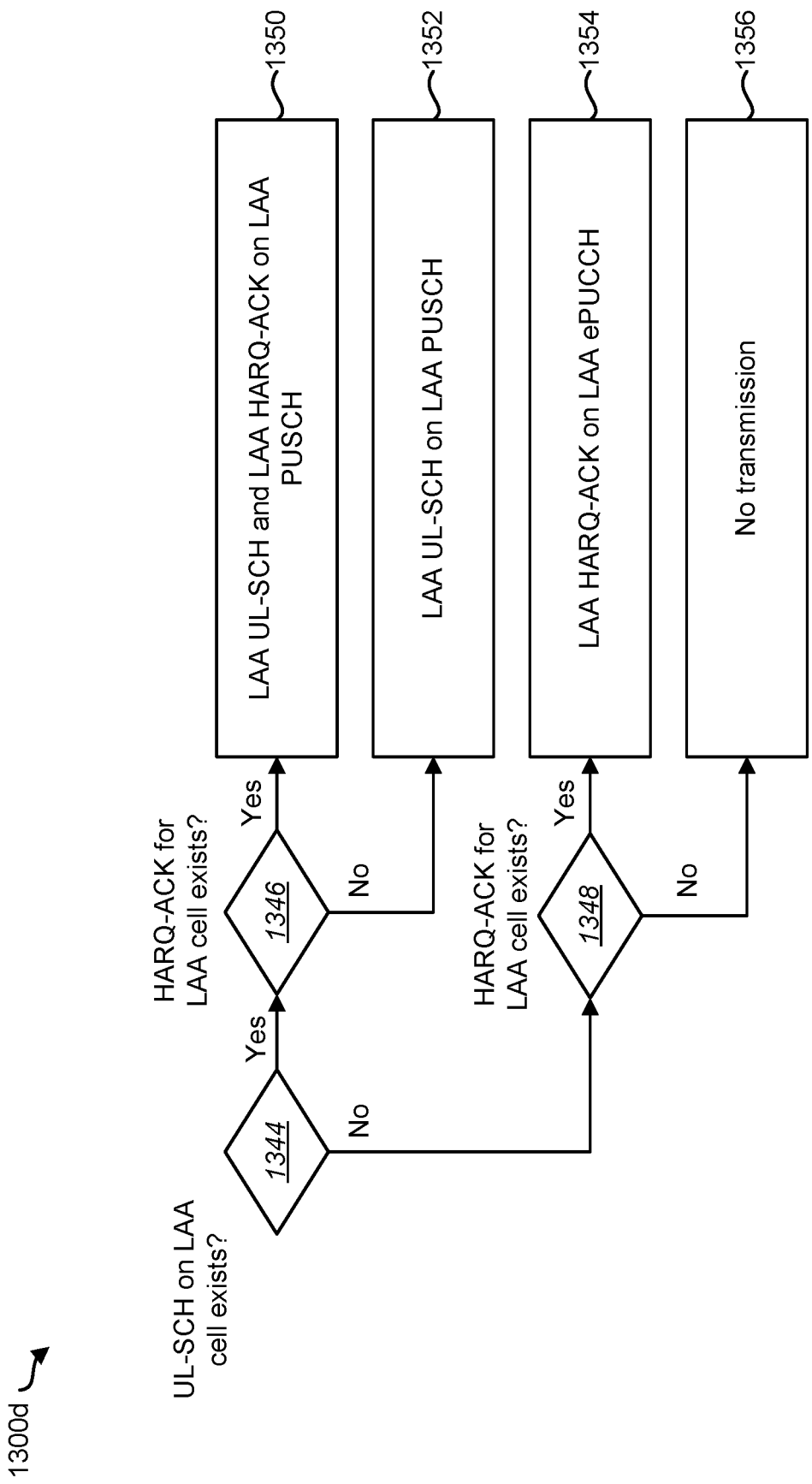

In FIG. 13D, if simultaneous PUCCH and PUSCH is configured and if neither UL-SCH on the non-LAA cell nor HARQ-ACK for the non-LAA cell exist, then method 1300d may be implemented.

The UE 102 may determine 1344 whether a UL-SCH on the LAA cell exists. If the UL-SCH on the LAA cell exists, then the UE 102 may determine 1346 whether HARQ-ACK for the LAA cell exists. If HARQ-ACK for the LAA cell exists, then the UE 102 may transmit 1350 the LAA UL-SCH and LAA HARQ-ACK on the LAA PUSCH. If the UE 102 determines 1346 that HARQ-ACK for the LAA cell does not exist, then the UE 102 may transmit 1352 the LAA UL-SCH on the LAA PUSCH.

If the UE 102 determines 1344 that a UL-SCH on the LAA cell does not exist, the UE 102 may determine 1348 whether HARQ-ACK for the LAA cell exists. If HARQ-ACK for the LAA cell exists, then the UE 102 may transmit 1354 LAA HARQ-ACK on the LAA ePUCCH. If the UE 102 determines 1356 that HARQ-ACK for the LAA cell does not exist, then in step 1356 the UE 102 may not send a transmission.

Figure 14:
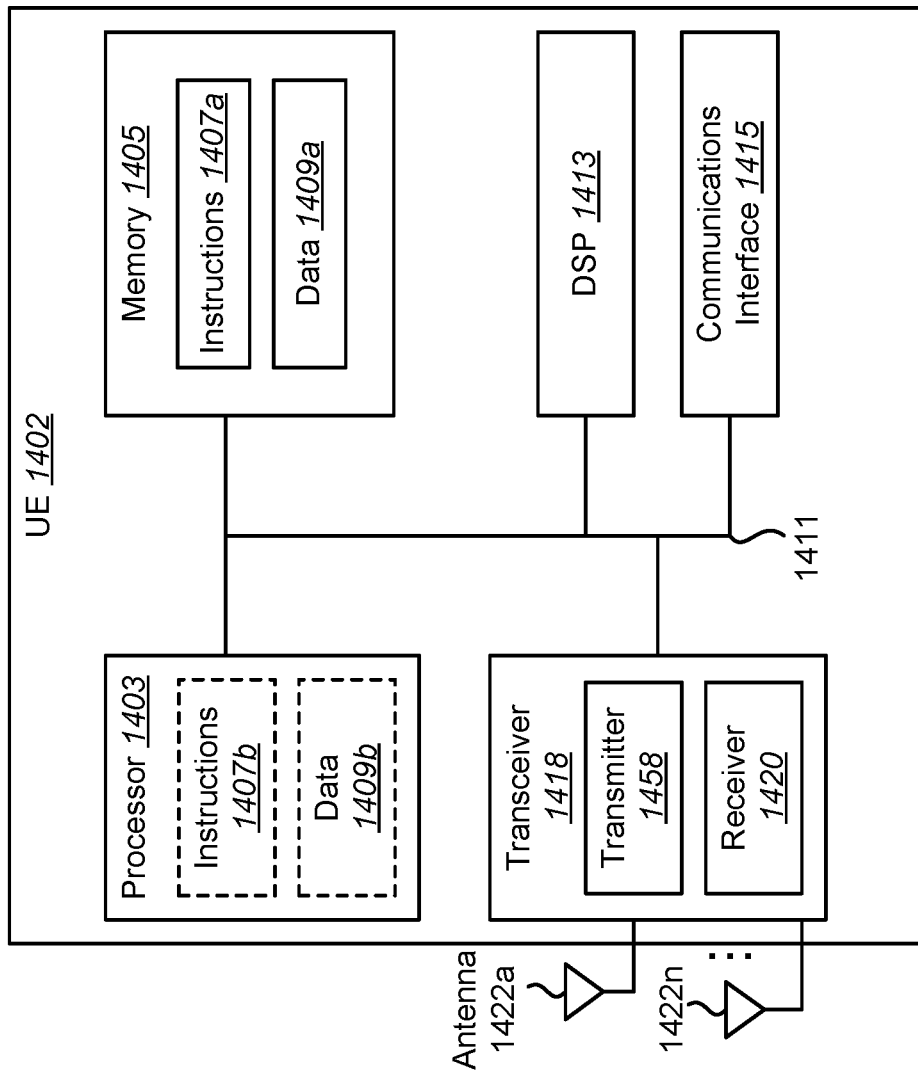
FIG. 14 illustrates various components that may be utilized in a UE.

FIG. 14 illustrates various components that may be utilized in a UE 1402. The UE 1402 described in connection with FIG. 14 may be implemented in accordance with the UE 102 described in connection with FIG. 1. The UE 1402 includes a processor 1403 that controls operation of the UE 1402. The processor 1403 may also be referred to as a central processing unit (CPU). Memory 1405, which may include read-only memory (ROM), random access memory (RAM), a combination of the two or any type of device that may store information, provides instructions 1407a and data 1409a to the processor 1403. A portion of the memory 1405 may also include non-volatile random access memory (NVRAM). Instructions 1407b and data 1409b may also reside in the processor 1403. Instructions 1407b and/or data 1409b loaded into the processor 1403 may also include instructions 1407a and/or data 1409a from memory 1405 that were loaded for execution or processing by the processor 1403. The instructions 1407b may be executed by the processor 1403 to implement the methods described above.

The UE 1402 may also include a housing that contains one or more transmitters 1458 and one or more receivers 1420 to allow transmission and reception of data. The transmitter(s) 1458 and receiver(s) 1420 may be combined into one or more transceivers 1418. One or more antennas 1422a-n are attached to the housing and electrically coupled to the transceiver 1418.

The various components of the UE 1402 are coupled together by a bus system 1411, which may include a power bus, a control signal bus and a status signal bus, in addition to a data bus. However, for the sake of clarity, the various buses are illustrated in FIG. 14 as the bus system 1411. The UE 1402 may also include a digital signal processor (DSP) 1413 for use in processing signals. The UE 1402 may also include a communications interface 1415 that provides user access to the functions of the UE 1402. The UE 1402 illustrated in FIG. 14 is a functional block diagram rather than a listing of specific components.

Figure 15:
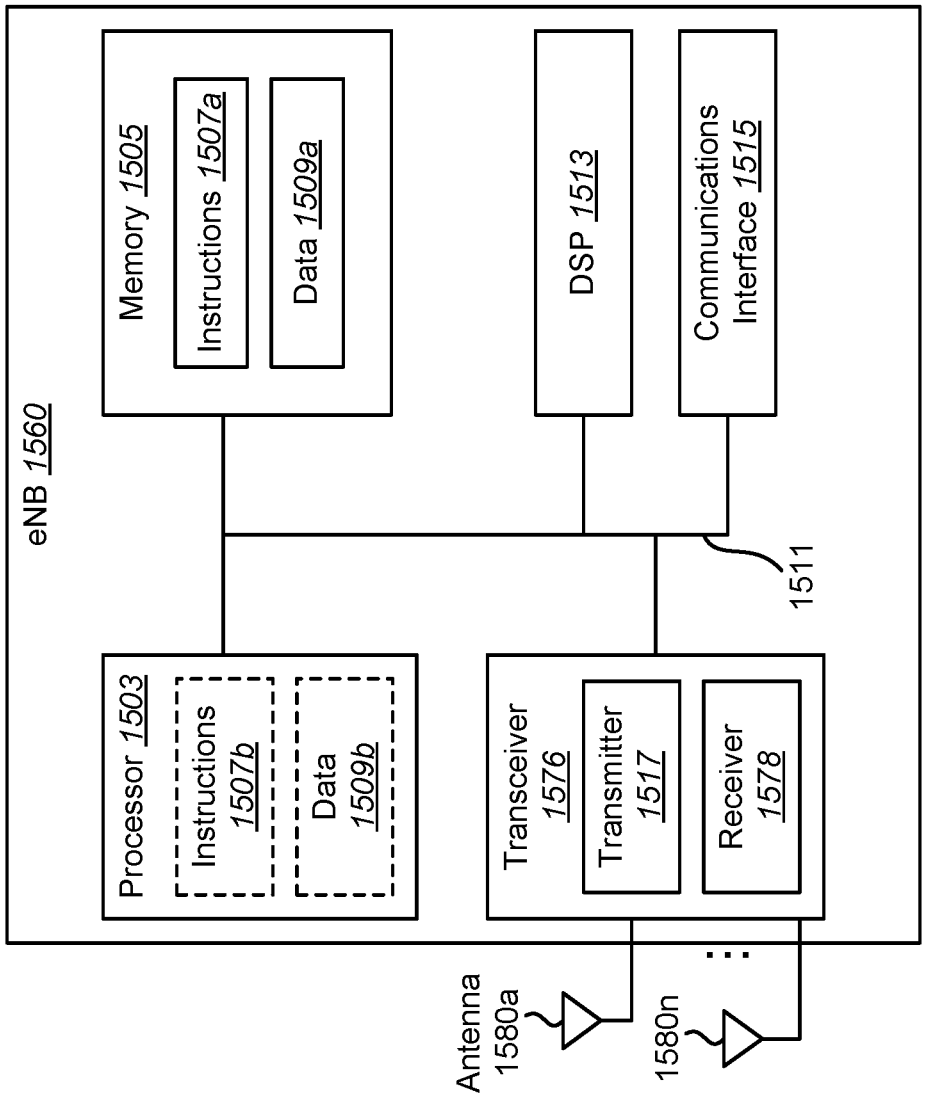
FIG. 15 illustrates various components that may be utilized in an eNB.

FIG. 15 illustrates various components that may be utilized in an eNB 1560. The eNB 1560 described in connection with FIG. 15 may be implemented in accordance with the eNB 160 described in connection with FIG. 1. The eNB 1560 includes a processor 1503 that controls operation of the eNB 1560. The processor 1503 may also be referred to as a central processing unit (CPU). Memory 1505, which may include read-only memory (ROM), random access memory (RAM), a combination of the two or any type of device that may store information, provides instructions 1507a and data 1509a to the processor 1503. A portion of the memory 1505 may also include non-volatile random access memory (NVRAM). Instructions 1507b and data 1509b may also reside in the processor 1503. Instructions 1507b and/or data 1509b loaded into the processor 1503 may also include instructions 1507a and/or data 1509a from memory 1505 that were loaded for execution or processing by the processor 1503. The instructions 1507b may be executed by the processor 1503 to implement the methods described above.

The eNB 1560 may also include a housing that contains one or more transmitters 1517 and one or more receivers 1578 to allow transmission and reception of data. The transmitter(s) 1517 and receiver(s) 1578 may be combined into one or more transceivers 1576. One or more antennas 1580a-n are attached to the housing and electrically coupled to the transceiver 1576.

The various components of the eNB 1560 are coupled together by a bus system 1511, which may include a power bus, a control signal bus and a status signal bus, in addition to a data bus. However, for the sake of clarity, the various buses are illustrated in FIG. 15 as the bus system 1511. The eNB 1560 may also include a digital signal processor (DSP) 1513 for use in processing signals. The eNB 1560 may also include a communications interface 1515 that provides user access to the functions of the eNB 1560. The eNB 1560 illustrated in FIG. 15 is a functional block diagram rather than a listing of specific components.

Figure 16:
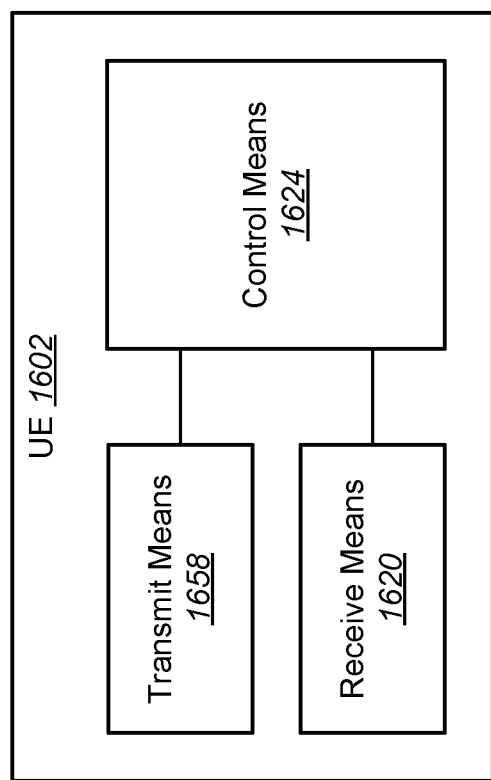
FIG. 16 is a block diagram illustrating one implementation of a UE in which systems and methods for uplink LAA operations may be implemented.

FIG. 16 is a block diagram illustrating one implementation of a UE 1602 in which systems and methods for uplink LAA operations may be implemented. The UE 1602 includes transmit means 1658, receive means 1620 and control means 1624. The transmit means 1658, receive means 1620 and control means 1624 may be configured to perform one or more of the functions described in connection with FIG. 1 above. FIG. 14 above illustrates one example of a concrete apparatus structure of FIG. 16. Other various structures may be implemented to realize one or more of the functions of FIG. 1. For example, a DSP may be realized by software.

Figure 17:
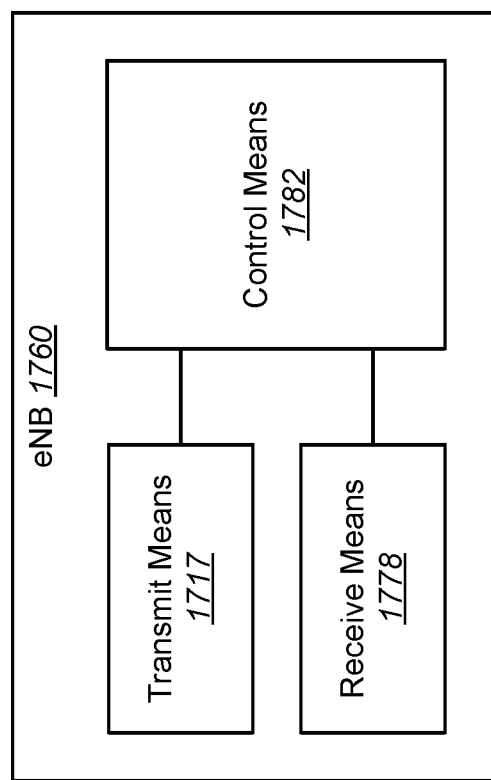
FIG. 17 is a block diagram illustrating one implementation of an eNB in which systems and methods for uplink LAA operations may be implemented.
Figure 27:
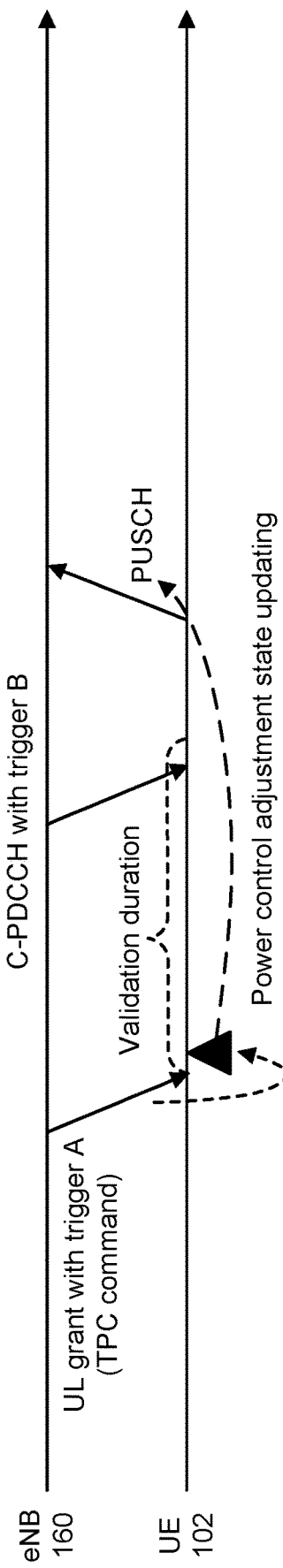
FIG. 27 is one example illustrating transmit power control procedure.

FIG. 17 is a block diagram illustrating one implementation of an eNB 1760 in which systems and methods for uplink LAA operations may be implemented. The eNB 1760 includes transmit means 1717, receive means 1778 and control means 1782. The transmit means 1717, receive means 1778 and control means 1782 may be configured to perform one or more of the functions described in connection with FIG. 1 above. FIG. 27 above illustrates one example of a concrete apparatus structure of FIG. 17. Other various structures may be implemented to realize one or more of the functions of FIG. 1. For example, a DSP may be realized by software.

Figure 18:
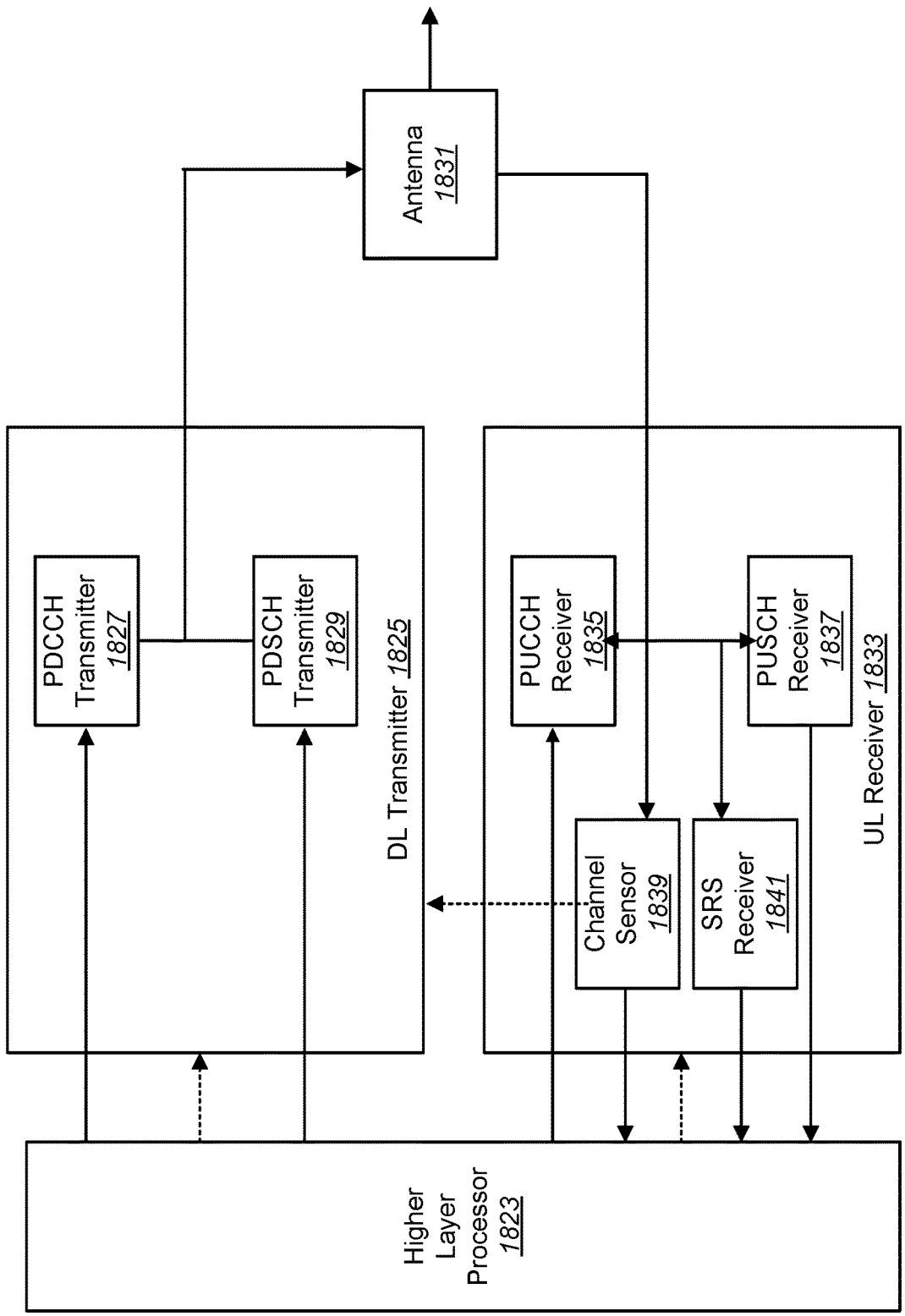
FIG. 18 is a block diagram illustrating one implementation of an eNB.

FIG. 18 is a block diagram illustrating one implementation of an eNB 1860. The eNB 1860 may include a higher layer processor 1823, a DL transmitter 1825, a UL receiver 1833, and one or more antenna 1831. The DL transmitter 1825 may include a PDCCH transmitter 1827 and a PDSCH transmitter 1829. The UL receiver 1833 may include a PUCCH receiver 1835, a PUSCH receiver 1837, an SRS receiver 1841, and a channel sensor 1839 (also referred to as carrier sensor).

The higher layer processor 1823 may manage physical layer's behaviors (the DL transmitter's and the UL receiver's behaviors) and provide higher layer parameters to the physical layer. The higher layer processor 1823 may obtain transport blocks from the physical layer. The higher layer processor 1823 may send/acquire higher layer messages such as an RRC message and MAC message to/from a UE's higher layer. The higher layer processor 1823 may provide the PDSCH transmitter transport blocks and provide the PDCCH transmitter transmission parameters related to the transport blocks. The higher layer processor 1823 may maintain uplink contention window values based on NDI which is sent to the UE 102, and may utilize the uplink contention window values for uplink scheduling. The higher layer processor 1823 may also manage uplink transmit power and instruct the PDCCH transmitter 1827 to send an appropriate TPC command.

The DL transmitter 1825 may multiplex downlink physical channels and downlink physical signals (including reservation signal) and transmit them via transmission antennas 1831. The UL receiver 1833 may receive multiplexed uplink physical channels and uplink physical signals via receiving antennas 1831 and de-multiplex them. The PUCCH receiver 1835 may provide the higher layer processor 1823 UCI. The PUSCH receiver 1837 may provide the higher layer processor 1823 received transport blocks. The SRS receiver 1841 may receive SRS and perform uplink channel measurement by using the SRS. The SRS receiver 1841 may provide the higher layer processor 1823 the channel measurement results.

The channel sensor 1839 may measure uplink reception signal power and perform channel access procedure. The channel sensor 1839 may control the DL transmitter 1825 with respect to downlink transmission timing and provide channel access results to the higher layer processor 1823.

Figure 19:
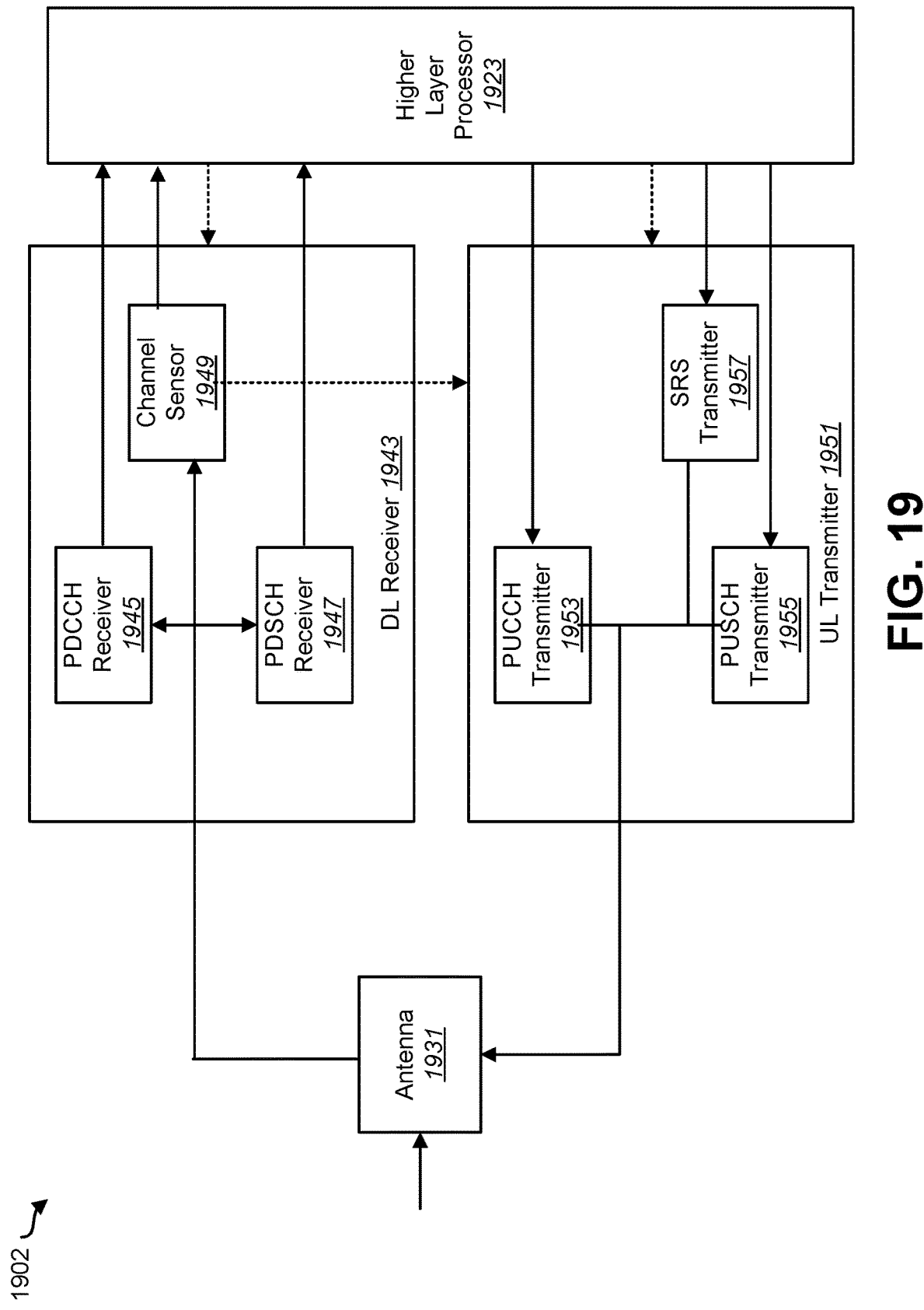
FIG. 19 is a block diagram illustrating one implementation of a UE.

FIG. 19 is a block diagram illustrating one implementation of a UE 1902. The UE 102 may include a higher layer processor 1923, a UL transmitter 1951, a DL receiver 1943, and one or more antenna 1931. The UL transmitter 1951 may include a PUCCH transmitter 1953, a PUSCH transmitter 1955, and an SRS transmitter 1957. The DL receiver 1943 may include a PDCCH receiver 1945, a PDSCH receiver 1947, and a channel sensor 1949 (also referred to as carrier sensor).

The higher layer processor 1923 may manage physical layer's behaviors (the UL transmitter's and the DL receiver's behaviors) and provide higher layer parameters to the physical layer. The higher layer processor 1923 may obtain transport blocks from the physical layer. The higher layer processor 1923 may send/acquire higher layer messages such as an RRC message and MAC message to/from a UE's higher layer. The higher layer processor 1923 may provide the PUSCH transmitter transport blocks and provide the PUCCH transmitter 1953 UCI. The higher layer processor 1923 may manage UL channel access procedure including contention window value updating based on NDI which is included in control information delivered from the PDCCH receiver 1945. The higher layer processor 1923 may also manage UL transmit power and may determine power scaling factor if needed.

The UL transmitter 1951 may multiplex uplink physical channels and uplink physical signals (including reservation signal) and transmit them via transmission antennas 1931. The UL transmitter 1951 may also assign uplink transmit power based on the instruction by the higher layer processor 1923. For example, the UL transmitter 1951 may also perform power scaling or dropping of UL transmissions.

The DL receiver 1943 may receive multiplexed downlink physical channels and downlink physical signals via receiving antennas 1931 and de-multiplex them. The PDCCH receiver 1945 may provide the higher layer processor 1923 DCI. The PDSCH receiver 1947 may provide the higher layer processor 1923 received transport blocks. The SRS transmitter 1957 may transmit the SRS. The channel sensor 1949 may measure uplink reception signal power and perform channel access procedure. The channel sensor 1949 may control the UL transmitter 1951 with respect to uplink transmission timing and provide channel access results to the higher layer processor 1923.

Figure 20:
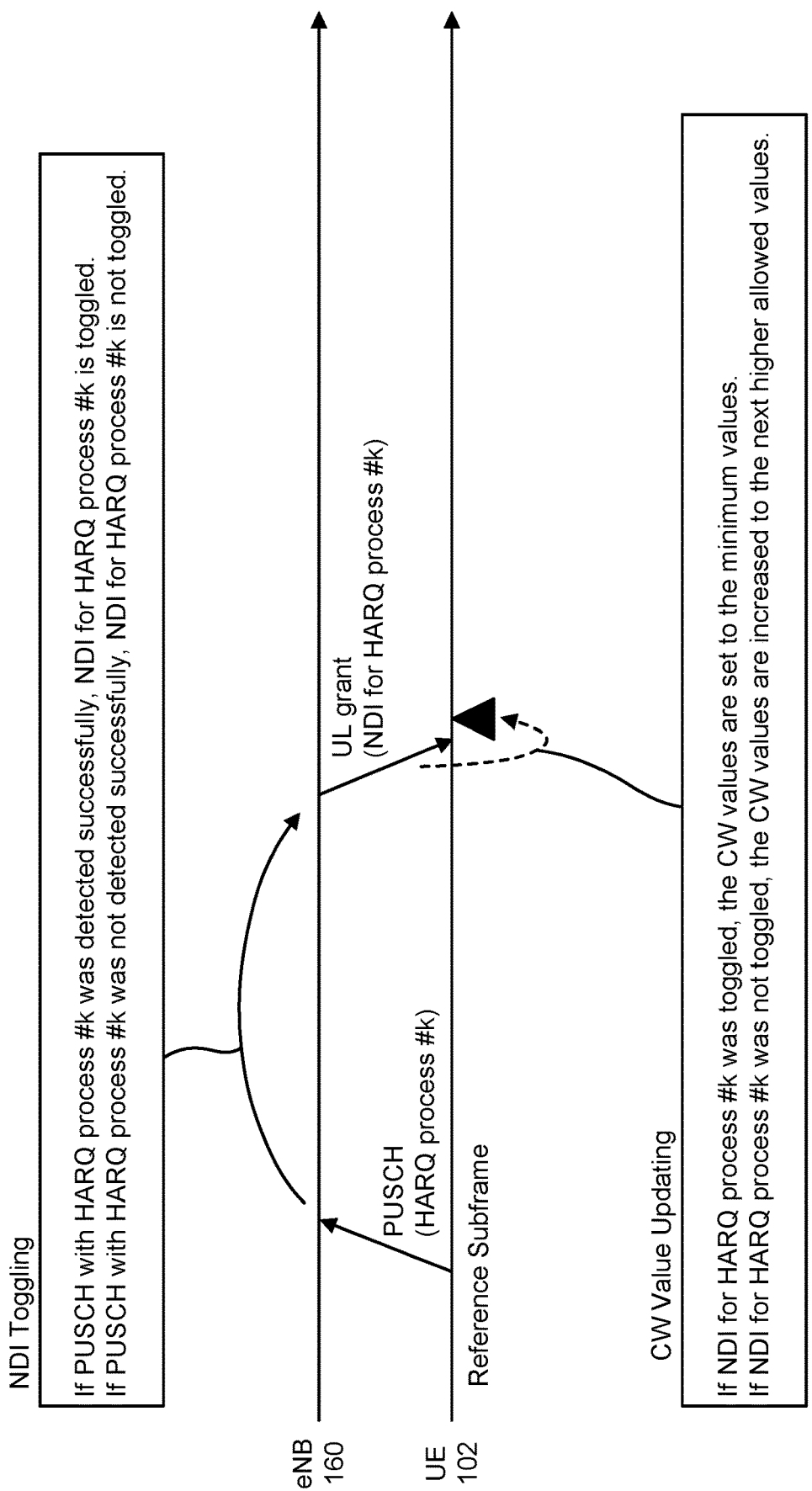
FIG. 20 is one example illustrating contention window (CW) value adjustment procedure.

Possible contention window value (also referred to as contention window size) adjustment procedures are described hereafter. For normal PUSCH scheduling (i.e., not triggered scheduling), the UE 102 maintains the contention window value according to whether NDI for HARQ process(es) associated with the HARQ process ID of UL-SCH in reference subframe. As shown in FIG. 20, when the UE 102 transmits PUSCH with HARQ process # k in a reference subframe, the PUSCH transmission may collide with the other node's transmissions. If the eNB 160 detects the PUSCH successfully, the eNB 160 sets NDI value for the HARQ process # k toggled so that the UE 102 transmits a new data using the HARQ process # k next time. Therefore, toggled NDI may implicitly indicate that PUSCH in the reference subframe did not collide with the other node's transmissions. Thus, CW value may be set to the minimum value. Meanwhile, if the eNB 160 does not detect the PUSCH successfully, the eNB 160 sets NDI value for the HARQ process # k not toggled so that the UE 102 retransmits the same data using the HARQ process # k as in the reference subframe. Therefore, not toggled NDI may implicitly indicate that PUSCH in the reference subframe collided with the other node's transmissions. Thus, CW value may be increased so as to avoid the collisions. Note that if UL-SCH of the HARQ process # k is not scheduled from the next subframe of the reference subframe through the subframe where the concerned (latest) UL grant is transmitted, it may be counted as the NDI is not toggled.

Figure 21:
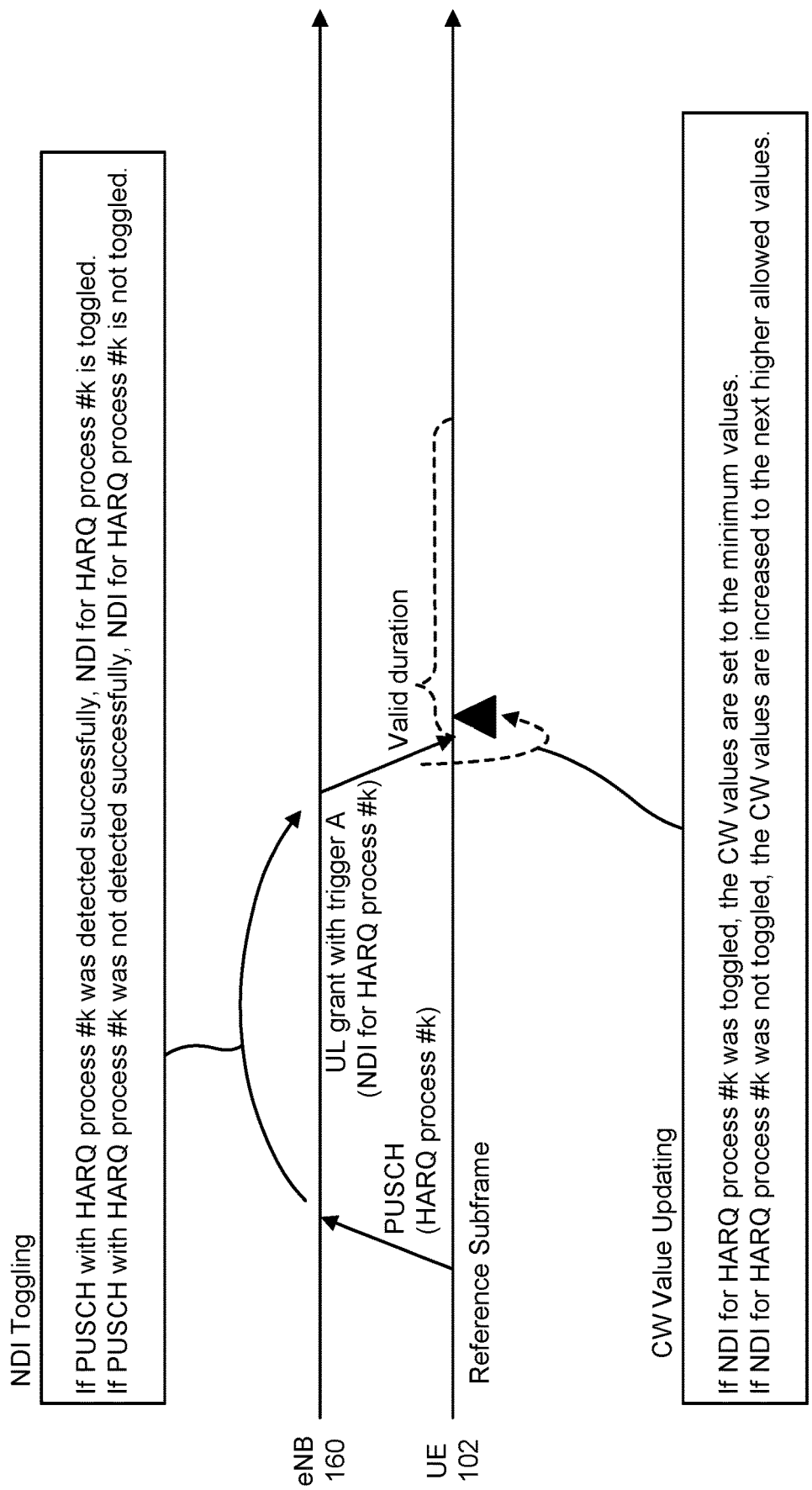
FIG. 21 is one example illustrating CW value adjustment procedure.

Also for triggered PUSCH scheduling (i.e., scheduling using PUSCH trigger A and B), the UE 102 maintains the contention window (CW) value according to NDI. A simple approach is to take the same way as in the non-triggered scheduling case, as shown in FIG. 21. When the UE 102 receives an UL grant with PUSCH trigger A, the UE 102 may update CW values based on whether the NDI in the UL grant is toggled or not.

Figure 22:
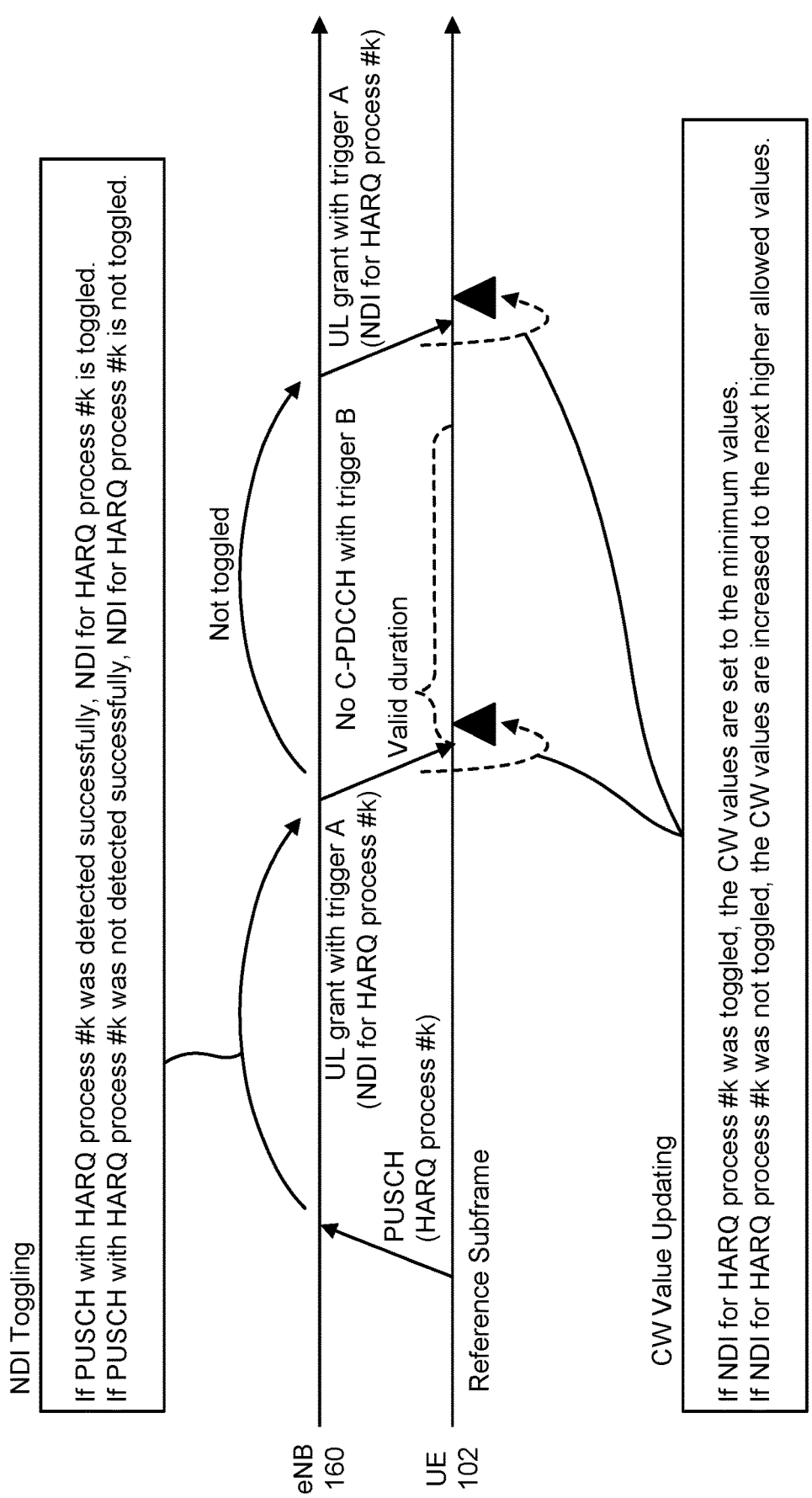
FIG. 22 is one example illustrating CW value adjustment procedure.

If the eNB 160 does not transmit any PUSCH trigger B (i.e., C-PDCCH of which the PUSCH trigger B field value is set to 1) during the validation duration of the PUSCH trigger A, the eNB 160 may retransmit the UL grant with NDI not toggled, and the UL grant schedules PUSCH which carries the same UL-SCH as in the unsent PUSCH scheduled by the previous UL grant. If the UE 102 does not detect any PUSCH trigger B (i.e., C-PDCCH of which the PUSCH trigger B field value is set to 1) during the validation duration of the PUSCH trigger A, and if the UE 102 detects UL grant with PUSCH trigger A set to 1 associated with the HARQ process ID of the same UL-SCH in reference subframe and the NDI in the UL grant is not toggled, the UE 102 may perform CW value increasing, as shown in FIG. 22.

Figure 23:
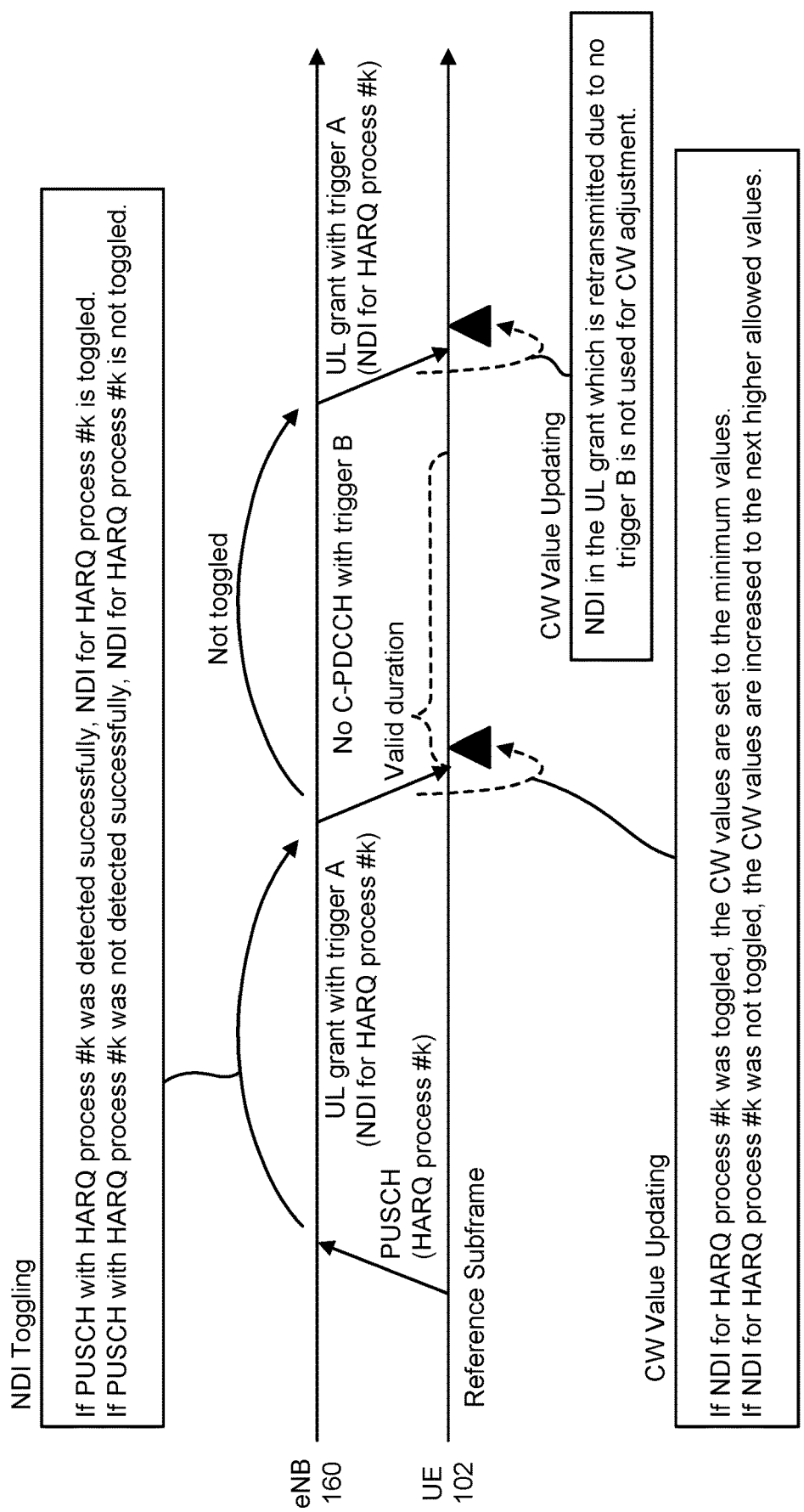
FIG. 23 is one example illustrating CW value adjustment procedure.

Alternatively, procedures for contention window value adjustment may be switched depending on whether triggered scheduling or not. If the UE 102 does not detect any PUSCH trigger B (i.e., C-PDCCH of which the PUSCH trigger B field value is set to 1) during the validation duration of the PUSCH trigger A, and if the UE 102 detects UL grant with PUSCH trigger A set to 1 associated with the HARQ process ID of the same UL-SCH in reference subframe and the NDI in the UL grant is not toggled, the UE 102 may not refer to the UL grant for CW value adjustment (e.g. the CW values are kept), as shown in FIG. 23.

Figure 24:
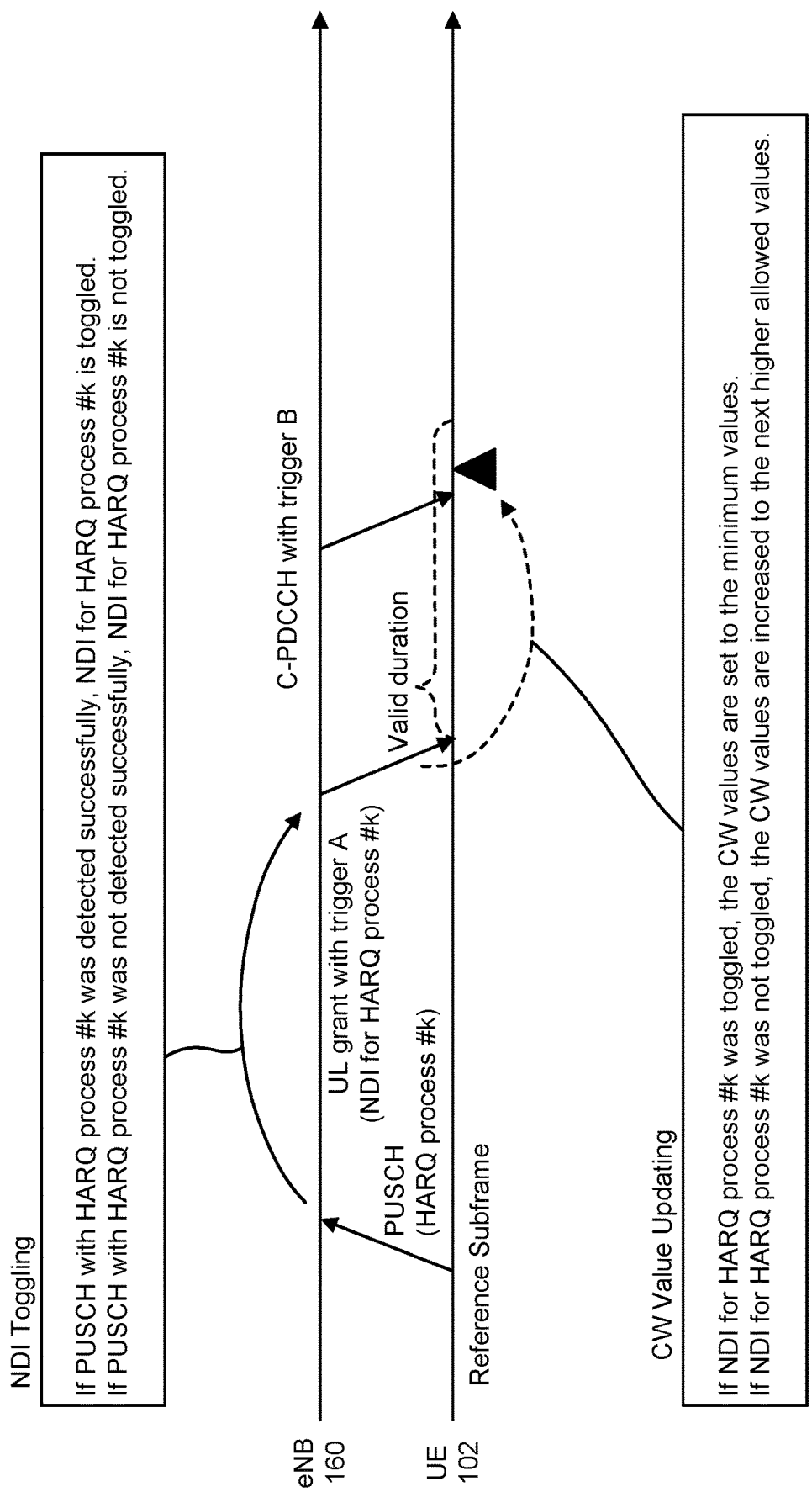
FIG. 24 is one example illustrating CW value adjustment procedure.

Another approach is to update CW values after receiving PUSCH trigger B, as shown in FIG. 24. When the UE 102 receives an UL grant with PUSCH trigger A field set to 1 followed by a C-PDCCH with PUSCH triggering B field set to 1 within the validation duration of the UL grant, the UE 102 may update CW values based on whether the NDI in the UL grant is toggled or not.

Figure 25:
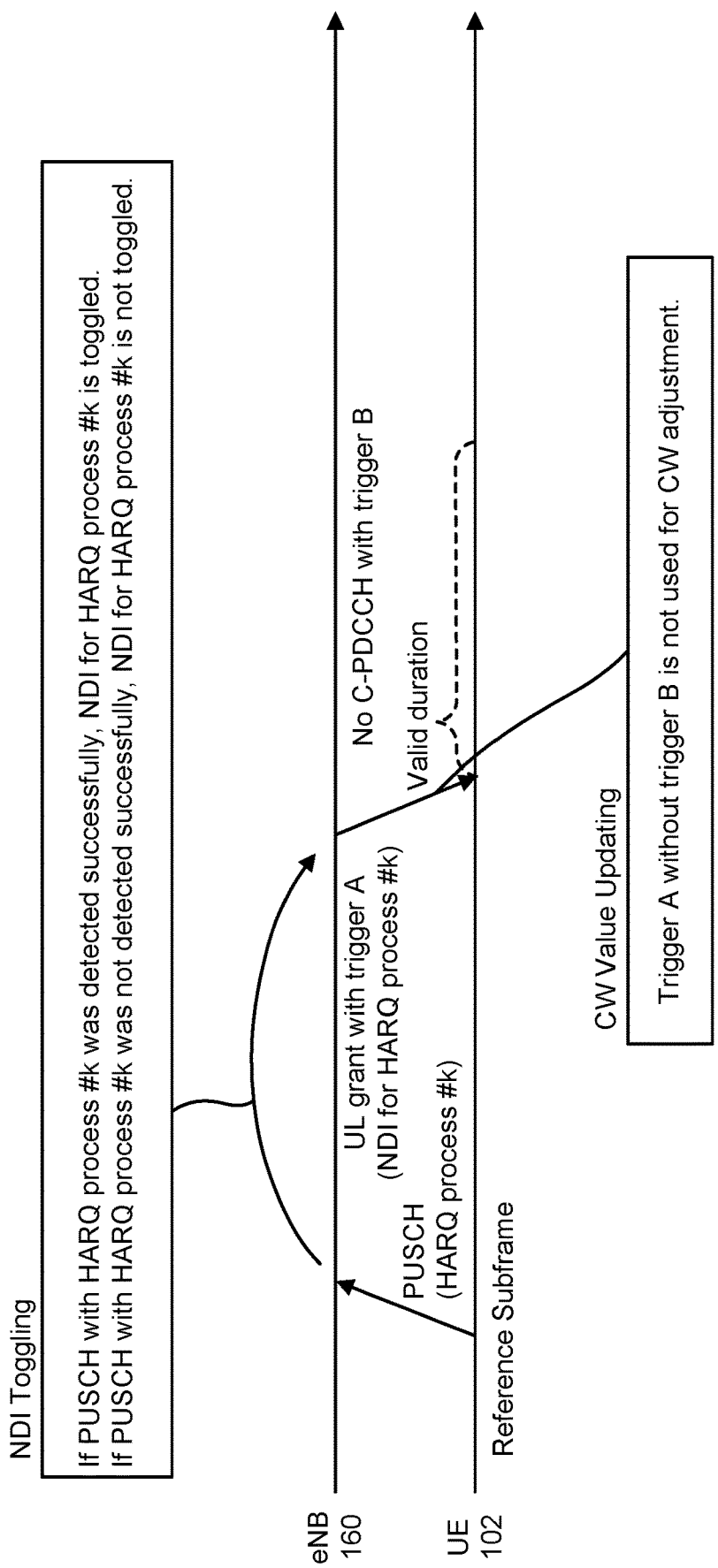
FIG. 25 is one example illustrating CW value adjustment procedure.

In this case, if the UE 102 does not detect any PUSCH trigger B (i.e., C-PDCCH of which the PUSCH trigger B field value is set to 1) during the validation duration of the PUSCH trigger A, the UE 102 may not refer to the UL grant for CW value adjustment (e.g. the CW values are kept), as shown in FIG. 25.

Figure 26:
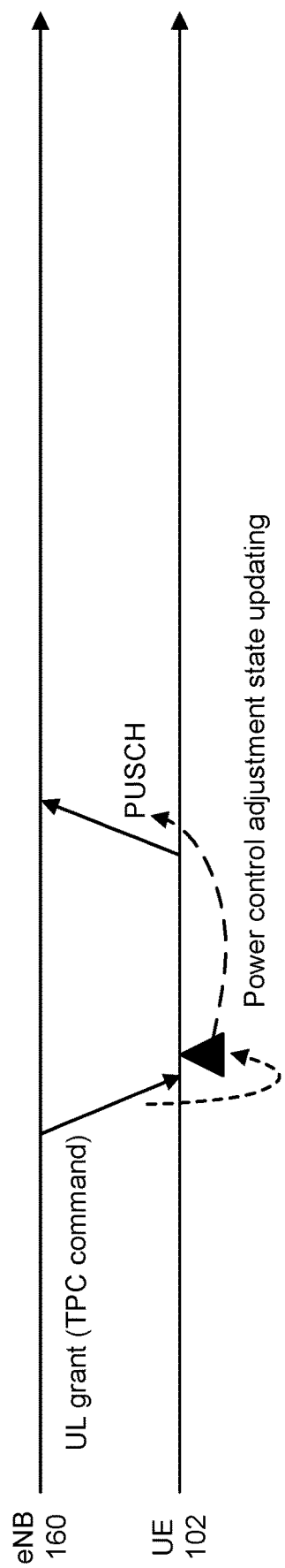
FIG. 26 is one example illustrating transmit power control procedure.

Possible transmit power control procedures are described hereafter. If a UE 102 receives an UL grant, the UE 102 refers to TPC command field in the UL grant to determine transmit power of PUSCH which is scheduled by the UL grant, as shown in FIG. 26. More specifically, the setting of the UE Transmit power for a Physical Uplink Shared Channel (PUSCH) transmission may be defined as shown in Listing 1.

---

Listing 1

If the UE transmits PUSCH without a simultaneous PUCCH for the serving cell c, then the UE transmit power $P_{PUSCH,c}(i)$ for PUSCH transmission in subframe i for the serving cell c is given by $$P_{PUSCH,c}(i) = \min \begin{cases} P_{CMAX,c}(i), \\ 10\log_{10}(M_{PUSCH,c}(i)) + P_{O\_PUSCH,c}(j) + \\ \alpha_c(j) \cdot PL_c + \Delta_{TF,c}(i) + f_c(i) \end{cases} \text{[dBm]}$$

If the UE transmits PUSCH simultaneous with PUCCH for the serving cell c, then the UE transmit power $P_{PUSCH,c}(i)$ for the PUSCH transmission in subframe i for the serving cell c is given by $$P_{PUSCH,c}(i) = \min \begin{cases} 10\log_{10}(\hat{P}_{CMAX,c}(i) - \hat{P}_{PUCCH}(i)), \\ 10\log_{10}(M_{PUSCH,c}(i)) + P_{O\_PUSCH,c}(j) + \\ \alpha_c(j) \cdot PL_c + \Delta_{TF,c}(i) + f_c(i) \end{cases} \text{[dBm]}$$

If the UE is not transmitting PUSCH for the serving cell c, for the accumulation of TPC command received with DCI format 3/3A for PUSCH, the UE may assume that the UE transmit power $P_{PUSCH,c}(i)$ for the PUSCH transmission in subframe i for the serving cell c is computed by $P_{PUSCH,c}(i) = \min \{P_{CMAX,c}(i), P_{O\_PUSCH,c}(1) + \alpha_c(1) \cdot PL_c + f_c(i)\}$ [dBm]

where, $P_{CMAX,c}(i)$ is the configured UE transmit power in subframe i for serving cell c and $\hat{P}_{CMAX,c}(i)$ is the linear value of $P_{CMAX,c}(i)$. If the UE transmits PUCCH without PUSCH in subframe i for the serving cell c, for the accumulation of TPC command received with DCI format 3/3A for PUSCH, the UE may compute $P_{CMAX,c}(i)$ assuming maximum power reduction (MPR) = 0 dB, A-MPR = 0 dB, P-MPR = 0 dB and $\Delta T_C$ = 0 dB. If the UE does not transmit PUCCH and PUSCH in subframe i for the serving cell c, for the accumulation of TPC command received with DCI format 3/3A for PUSCH, the UE may compute $P_{CMAX,c}(i)$ assuming MPR = 0 dB, A-MPR = 0 dB, P-MPR = 0 dB and $\Delta T_C$ = 0 dB.

$\hat{P}_{PUCCH}(i)$ is the linear value of $P_{PUCCH}(i)$, UE Transmit power $P_{PUCCH}$ for the physical uplink control channel (PUCCH) transmission in subframe i for serving cell c.

Listing 1

$M_{PUSCH,c}(i)$ is the bandwidth of the PUSCH resource assignment expressed in number of resource blocks valid for subframe i and serving cell c.

If the UE is configured with higher layer parameter UplinkPowerControlDedicated-v12x0 for serving cell c and if subframe i belongs to uplink power control subframe set 2 as indicated by the higher layer parameter tpc-SubframeSet-r12, when j = 0, $P_{O\_PUSCH,c}(0) = P_{O\_UE\_PUSCH,c,2}(0) + P_{O\_NOMINAL\_PUSCH,c,2}(0)$, where j = 0 is used for PUSCH (re)transmissions corresponding to a semi-persistent grant. $P_{O\_UE\_PUSCH,c,2}(0)$ and $P_{O\_NOMINAL\_PUSCH,c,2}(0)$ are the parameters p0-UE-PUSCH-Persistent-SubframeSet2-r12 and p0-NominalPUSCH-Persistent-SubframeSet2-r12 respectively provided by higher layers, for each serving cell c.

when j = 1, $P_{O\_PUSCH,c}(1) = P_{O\_UE\_PUSCH,c,2}(1) + P_{O\_NOMINAL\_PUSCH,c,2}(1)$, where j = 1 is used for PUSCH (re)transmissions corresponding to a dynamic scheduled grant. $P_{O\_UE\_PUSCH,c,2}(1)$ and $P_{O\_NOMINAL\_PUSCH,c,2}(1)$ are the parameters p0-UE-PUSCH-SubframeSet2-r12 and p0-NominalPUSCH-SubframeSet2-r12 respectively, provided by higher layers for serving cell c.

when j = 2, $P_{O\_PUSCH,c}(2) = P_{O\_UE\_PUSCH,c}(2) + P_{O\_NOMINAL\_PUSCH,c}(2)$ where $P_{O\_UE\_PUSCH,c}(2) = 0$ and $P_{O\_NOMINAL\_PUSCH,c}(2) = P_{O\_PRE} + \Delta_{PREAMBLE\_Msg3}$, where the parameter preambleInitialReceivedTargetPower [8] ($P_{O\_PRE}$) and $\Delta_{PREAMBLE\_Msg3}$ are signaled from higher layers for serving cell c, where j = 2 is used for PUSCH (re)transmissions corresponding to the random access response grant.

Otherwise $P_{O\_PUSCH,c}(j)$ is a parameter composed of the sum of a component $P_{O\_NOMINAL\_PUSCH,c}(j)$ provided from higher layers for j = 0 and 1 and a component $P_{O\_UE\_PUSCH,c}(j)$ provided by higher layers for j = 0 and 1 for serving cell c. For PUSCH (re)transmissions corresponding to a semi-persistent grant then j = 0, for PUSCH (re)transmissions corresponding to a dynamic scheduled grant then j = 1 and for PUSCH (re)transmissions corresponding to the random access response grant then j = 2.

$P_{O\_UE\_PUSCH,c}(2) = 0$ and $P_{O\_NOMINAL\_PUSCH,c}(2) = P_{O\_PRE} + \Delta_{PREAMBLE\_Msg3}$, where the parameter preambleInitialReceivedTargetPower [8] ($P_{O\_PRE}$) and $\Delta_{PREAMBLE\_Msg3}$ are signaled from higher layers for serving cell c.

If the UE is configured with higher layer parameter UplinkPowerControlDedicated-v12x0 for serving cell c and if subframe i belongs to uplink power control subframe set 2 as indicated by the higher layer parameter tpc-SubframeSet-r12, For j = 0 or 1, $\alpha_c(j) = \alpha_{c,2} \in \{0, 0.4, 0.5, 0.6, 0.7, 0.8, 0.9, 1\}$. $\alpha_{c,2}$ is the parameter alpha-SubframeSet2-r12 provided by higher layers for each serving cell c.

For j = 2, $\alpha_c(j) = 1$.

Otherwise

For j = 0 or 1, $\alpha_c \in \{0, 0.4, 0.5, 0.6, 0.7, 0.8, 0.9, 1\}$ is a 3-bit parameter provided by higher layers for serving cell c. For j = 2, $\alpha_c(j) = 1$.

$PL_c$ is the downlink path loss estimate calculated in the UE for serving cell c in dB and $PL_c$ = referenceSignalPower - higher layer filtered Reference Signal Received Power (RSRP), where referenceSignalPower is provided by higher layers and RSRP is defined for the reference serving cell and the higher layer filter configuration is defined for the reference serving cell.

If serving cell c belongs to a TAG containing the primary cell then, for the uplink of the primary cell, the primary cell is used as the reference serving cell for determining referenceSignalPower and higher layer filtered RSRP. For the uplink of the secondary cell, the serving cell configured by the higher layer parameter pathlossReferenceLinking is used as the reference serving cell for determining referenceSignalPower and higher layer filtered RSRP.

If serving cell c belongs to a TAG containing the PSCell then, for the uplink of the PSCell, the PSCell is used as the reference serving cell for determining referenceSignalPower and higher layer filtered RSRP; for the uplink of the secondary cell other than PSCell, the serving cell configured by the higher layer parameter pathlossReferenceLinking is used as the reference serving cell for determining referenceSignalPower and higher layer filtered RSRP.

If serving cell c belongs to a TAG not containing the primary cell or PSCell then serving cell c is used as the reference serving cell for determining referenceSignalPower and higher layer filtered RSRP.

$\Delta_{TF,c}(i) = 10 \log_{10}((2^{BPRE \cdot K_s} - 1) \cdot \beta_{offset}^{PUSCH})$ for $K_S = 1.25$ and 0 for $K_S = 0$ where $K_S$ is given by the parameter deltaMCS-Enabled provided by higher layers for each serving cell c. BPRE and $\beta_{offset}^{PUSCH}$, for each serving cell c, are computed as below. $K_S = 0$ for transmission mode 2.

BPRE = $O_{CQI}/N_{RE}$ for control data sent via PUSCH without UL-SCH data and $\sum_{r=0}^{C-1} K_r / N_{RE}$ for other cases.

-continued

Listing 1 where C is the number of code blocks, $K_r$ is the size for code block r,
$O_{CQI}$ is the number of Channel Quality Indicator (CQI)/ precoding matrix
indicator (PMI) bits including CRC bits and $N_{RE}$ is the number of
resource elements determined as
$N_{RE} = M_{sc}^{PUSCH\text{-}initial} \cdot N_{symb}^{PUSCH\text{-}initial}$, where C, $K_r$,
$M_{sc}^{PUSCH\text{-}initial}$ and $N_{symb}^{PUSCH\text{-}initial}$ are the channel coding parameters.
$\beta_{offset}^{PUSCH} = \beta_{offset}^{CQI}$ for control data sent via PUSCH without UL-SCH data
and 1 for other cases.
$\delta_{PUSCH,c}$ is a correction value, also referred to as a TPC command and is
included in PDCCH/EPDCCH with DCI format 0/0A/0B/4/4A/4B or in
Machine-Type Communications (MTC) physical downlink control channel
(MPDCCH) with DCI format 6-0A for serving cell c or jointly coded with other
TPC commands in PDCCH/MPDCCH with DCI format 3/3A whose CRC parity
bits are scrambled with TPC-PUSCH-RNTI. If the UE is configured with higher
layer parameter UplinkPowerControlDedicated-v12x0 for serving cell c and if
subframe i belongs to uplink power control subframe set 2 as indicated by the
higher layer parameter tpc-SubframeSet-r12, the current PUSCH power control
adjustment state for serving cell c is given by $f_{c,2}(i)$, and the UE may use
$f_{c,2}(i)$ instead of $f_c(i)$ to determine $P_{PUSCH,c}(i)$. Otherwise, the current
PUSCH power control adjustment state for serving cell c is given by $f_c(i)$.
$f_{c,2}(i)$ and $f_c(i)$ are defined by:
  For FDD or TDD (i.e., frame structure type 1 or 2),
  $f_c(i) = f_c(i-1) + \delta_{PUSCH,c}(i - K_{PUSCH})$ and
  $f_{c,2}(i) = f_{c,2}(i-1) + \delta_{PUSCH,c}(i - K_{PUSCH})$ if accumulation is enabled based
  on the parameter Accumulation-enabled provided by higher layers or if the
  TPC command $\delta_{PUSCH,c}$ is included in a PDCCH/EPDCCH with DCI
  format 0 or in a MPDCCH with DCI format 6-0A for serving cell c where the
  CRC is scrambled by the Temporary Cell Radio Network Temporary Identifier
  (C-RNTI), for FDD or TDD (i.e., frame structure type 1 or 2), either
  $f_c(i) = f_c(i-1) + \delta_{PUSCH,c}(i - K_{PUSCH})$ for approach A or
  $f_c(i) = f_c(i-1-i_{sf}) + \delta_{PUSCH,c}(i - K_{PUSCH})$ for approach B if accumulation is
  enabled based on the parameter Accumulation-enabled provided by higher
  layers
    where $\delta_{PUSCH,c}(i - K_{PUSCH})$ was signaled on PDCCH/EPDCCH with
    DCI format 0/0A/0B/4/4A/4B or MPDCCH with DCI format 6-0A or
    PDCCH/MPDCCH with DCI format 3/3A on subframe i $-K_{PUSCH}$, and
    where $f_c(0)$ is the first value after reset of accumulation.
  The value of $K_{PUSCH}$ is
    For FDD or FDD-TDD and serving cell frame structure type 1,
    $K_{PUSCH} = 4$
    For frame structure type 3 and 'PUSCH trigger A' field set to '0' in the
    corresponding DCI format 0A/0B/4A/4B, $K_{PUSCH} = 4 + i_{sf}$ with $i_{sf} =$
    0, 1, . . . , N-1 according to the PDCCH/EPDCCH and HARQ process ID
    mod($n_{HARQ\_ID} + i_{sf}, N_{HARQ}$) where value of $n_{HARQ\_ID}$ is
    determined by the HARQ process number field in the corresponding
    DCI format 0A/0B/4A/4B and $N_{HARQ} = 16$. Alternatively, $K_{PUSCH} =$
    $4 + j + k$ where the value of k is determined out of 0 to 15 by the
    scheduling delay field (also referred to as timing offset field) in the
    corresponding DCI format 0A/0B/4A/4B.
    For TDD, if the UE is configured with more than one serving cell and
    the TDD UL/DL configuration of at least two configured serving cells is
    not the same, or if the UE is configured with the parameter EIMTA-
    MainConfigServCell-r12 for at least one serving cell, or for FDD-TDD
    and serving cell frame structure type 2, the "TDD UL/DL configuration"
    refers to the UL-reference UL/DL configuration for serving cell c.
    For TDD UL/DL configurations 1-6, $K_{PUSCH}$ is given in Table 21
    For TDD UL/DL configuration 0
      If the PUSCH transmission in subframe 2 or 7 is scheduled with a
      PDCCH/EPDCCH of DCI format 0/4 or a MPDCCH of DCI format
      6-0A in which the least significant bit (LSB) of the UL index is set to
      1, $K_{PUSCH} = 7$
      For all other PUSCH transmissions, $K_{PUSCH}$ is given in Table 21.
    For serving cell c and a non-BL/CE (bandwidth reduction/coverage
    enhancement) UE, the UE attempts to decode a PDCCH/EPDCCH of DCI
    format 0/0A/0B/4/4A/4B with the UE's C-RNTI or DCI format 0 for Semi-
    Persistent Scheduling (SPS) C-RNTI and a PDCCH of DCI format 3/3A
    with this UE's TPC-PUSCH-RNTI in every subframe except when in
    discontinuous reception (DRX) or where serving cell c is deactivated.
    For serving cell c and a BL/CE UE configured with CEModeA, the UE
    attempts to decode a MPDCCH of DCI format 6-0A with the UE's C-RNTI
    or SPS C-RNTI and a MPDCCH of DCI format 3/3A with this UE's TPC-
    PUSCH-RNTI in every BL/CE downlink subframe except when in DRX
    For a non-BL/CE UE, if DCI format 0/0A/0B/4/4A/4B for serving cell
    c and DCI format 3/3A are both detected in the same subframe, then the
    UE may use the $\delta_{PUSCH,c}$ provided in DCI format 0/0A/0B/4/4A/4B.

| Listing 1 |
| --- |

$\delta_{PUSCH,c}$ = 0 dB for a subframe where no TPC command is decoded for serving cell c or where DRX occurs or i is not an uplink subframe in TDD or FDD-TDD and serving cell c frame structure type 2. $\delta_{PUSCH,c}$ = 0 dB for Approach A and $i_{sf}$ > 0. In other words, $\delta_{PUSCH,c}$ = 0 dB if the corresponding TPC command has applied already.

The $\delta_{PUSCH,c}$ dB accumulated values signaled on PDCCH/EPDCCH with DCI format 0/0A/0B/4/4A/4B or MPDCCH with DCI format 6-0A are given in Table 22. If the PDCCH/EPDCCH with DCI format 0 or MPDCCH with DCI format 6-0A is validated as a SPS activation or release PDCCH/EPDCCH/MPDCCH, then $\delta_{PUSCH,c}$ is 0 dB.

The $\delta_{PUSCH}$ dB accumulated values signaled on PDCCH/MPDCCH with DCI format 3/3A are one of SET1 given in Table 22 or SET2 given in Table 23 as determined by the parameter TPC-Index provided by higher layers.

If UE has reached $P_{CMAX,c}(i)$ for serving cell c, positive TPC commands for serving cell c may not be accumulated If UE has reached minimum power, negative TPC commands may not be accumulated If the UE is not configured with higher layer parameter UplinkPowerControlDedicated-v12x0 for serving cell c, the UE may reset accumulation
    For serving cell c, when $P_{O\_UE\_PUSCH,c}$ value is changed by higher layers
    For serving cell c, when the UE receives random access response message for serving cell c If the UE is configured with higher layer parameter UplinkPowerControlDedicated-v12x0 for serving cell c,
    the UE may reset accumulation corresponding to $f_c(*)$ for serving cell c
        when $P_{O\_UE\_PUSCH,c}$ value is changed by higher layers
        when the UE receives random access response message for serving cell c
    the UE may reset accumulation corresponding to $f_{c,2}(*)$ for serving cell c
        when $P_{O\_UE\_PUSCH,c,2}$ value is changed by higher layers If the UE is configured with higher layer parameter UplinkPowerControlDedicated-v12x0 for serving cell c and
    if subframe i belongs to uplink power control subframe set 2 as indicated by the higher layer parameter tpc-SubframeSet-r12
    $f_c(i) = f_c(i - 1)$
    if subframe i does not belong to uplink power control subframe set 2 as indicated by the higher layer parameter tpc-SubframeSet-r12
    $f_{c,2}(i) = f_{c,2}(i - 1)$ $f_c(i) = \delta_{PUSCH,c}(i - K_{PUSCH})$ and $f_{c,2}(i) = \delta_{PUSCH,c}(i - K_{PUSCH})$
if accumulation is not enabled for serving cell c based on the parameter Accumulation-enabled provided by higher layers
    where $\delta_{PUSCH,c}(i - K_{PUSCH})$ was signalled on PDCCH/EPDCCH with DCI format 0/0A/0B/4/4A/4B or MPDCCH with DCI format 6-0A for serving cell c on subframe $i - K_{PUSCH}$. For a BL/CE UE configured with CEModeA, subframe $i - K_{PUSCH}$ is the last subframe in which the MPDCCH with DCI format 6-0A or MPDCCH with DCI format 3/3A is transmitted.

The value of $K_{PUSCH}$ is
    For FDD or FDD-TDD and serving cell frame structure type 1,
    $K_{PUSCH}$ = 4
    For frame structure type 3 and 'PUSCH trigger A' field set to '0' in the corresponding DCI format 0A/0B/4A/4B, $K_{PUSCH} = 4 + i_{sf}$ with $i_{sf}$ = 0, 1, . . . , N-1 according to the PDCCH/EPDCCH and HARQ process ID $mod(n_{HARQ\_ID} + i_{sf}, N_{HARQ})$ where value of $n_{HARQ\_ID}$ is determined by the HARQ process number field in the corresponding DCI format 0A/0B/4A/4B and $N_{HARQ}$ = 16. Alternatively, $K_{PUSCH}$ = 4 + j + k where the value of k is determined out of 0 to 15 by the scheduling delay field (also referred to as timing offset field) in the corresponding DCI format 0A/0B/4A/4B.
    For TDD, if the UE is configured with more than one serving cell and the TDD UL/DL configuration of at least two configured serving cells is not the same, or if the UE is configured with the parameter EIMTA-MainConfigServCell-r12 for at least one serving cell, or FDD-TDD and serving cell frame structure type 2, the "TDD UL/DL configuration" refers to the UL-reference UL/DL configuration for serving cell c.
    For TDD UL/DL configurations 1-6, $K_{PUSCH}$ is given in 8.
    For TDD UL/DL configuration 0
        If the PUSCH transmission in subframe 2 or 7 is scheduled with a PDCCH/EPDCCH of DCI format 0/4 or a MPDCCH with DCI format 6-0A in which the LSB of the UL index is set to 1,
        $K_{PUSCH}$ = 7
        For all other PUSCH transmissions, $K_{PUSCH}$ is given in 8.

-continued

Listing 1

The $\delta_{PUSCH,c}$ dB absolute values signalled on PDCCH/EPDCCH with
DCI format 0/0A/0B/4/4A/4B or a MPDCCH with DCI format 6-0A are
given in 9. If the PDCCH/EPDCCH with DCI format 0 or a MPDCCH with
DCI format 6-0A is validated as a SPS activation or release
PDCCH/EPDCCH/MPDCCH, then $\delta_{PUSCH,c}$ is 0 dB.
for a non-BL/CE UE, $f_c(i) = f_c(i - 1)$ and $f_{c,2}(i) = f_{c,2}(i - 1)$ for a
subframe where no PDCCH/EPDCCH with DCI format 0/0A/0B/4/4A/4B
is decoded for serving cell c or where DRX occurs or i is not an uplink
subframe in TDD or FDD-TDD and serving cell c frame structure type 2.
If the UE is configured with higher layer parameter
UplinkPowerControlDedicated-v12x0 for serving cell c and
   if subframe i belongs to uplink power control subframe set 2 as
   indicated by the higher layer parameter tpc-SubframeSet-r12
     $f_c(i) = f_c(i - 1)$
   if subframe i does not belong to uplink power control subframe set 2 as
   indicated by the higher layer parameter tpc-SubframeSet-r12
     $f_{c,2}(i) = f_{c,2}(i - 1)$
For both types of $f_c(*)$ (accumulation or current absolute) the first value is
set as follows:
If $P_{O\_UE\_PUSCH,c}$ value is changed by higher layers and serving cell c
is the primary cell or, if $P_{O\_UE\_PUSCH,c}$ value is received by higher
layers and serving cell c is a Secondary cell
   $f_c(0) = 0$
Else
   If the UE receives the random access response message for a serving cell c
     $f_c(0) = \Delta P_{rampup,c} + \delta_{msg2,c}$, where
     $\delta_{msg2,c}$ is the TPC command indicated in the random access
     response corresponding to the random access preamble transmitted
     in the serving cell c, and $\Delta P_{rampup,c} =$ $$\min\left[\left\{\max\left(0, P_{CMAX,C} - \begin{pmatrix} 10\log_{10}(M_{PUSCH,c}(0)) + \\ P_{O\_PUSCH,c}(2) + \delta_{msg2} + \\ \alpha_c(2) \cdot PL + \Delta_{TF,c}(0) \end{pmatrix}\right)\right\}, \Delta P_{rampuprequested,c}\right]$$

and $\Delta P_{rampuprequested,c}$ is provided by higher layers and corresponds to the
total power rampup requested by higher layers from the first to the last
preamble in the serving cell c, $M_{PUSCH,c}(0)$ is the bandwidth of the PUSCH
resource assignment expressed in number of resource blocks valid for the
subframe of first PUSCH transmission in the serving cell c, and $\Delta_{TF,c}(0)$ is
the power adjustment of first PUSCH transmission in the serving cell c.
If $P_{O\_UE\_PUSCH,c,2}$ value is received by higher layers for a serving cell c.
   $f_{c,2}(0) = 0$ Tables 21, 22 and 23 are as follows:

TABLE 21

| TDD UL/DL Configuration | subframe number i | | | | | | | | | |
|---|---|---|---|---|---|---|---|---|---|---|
| | 0 | 1 | 2 | 3 | 4 | 5 | 6 | 7 | 8 | 9 |
| 0 | — | — | 6 | 7 | 4 | — | — | 6 | 7 | 4 |
| 1 | — | — | 6 | 4 | — | — | — | 6 | 4 | — |
| 2 | — | — | 4 | — | — | — | — | 4 | — | — |
| 3 | — | — | 4 | 4 | 4 | — | — | — | — | — |
| 4 | — | — | 4 | 4 | — | — | — | — | — | — |
| 5 | — | — | 4 | — | — | — | — | — | — | — |
| 6 | — | — | 7 | 7 | 5 | — | — | 7 | 7 | — |

TABLE 22

| TPC Command Field in DCI format 0/0A/0B/3/4/4A/4B | Accumulated $\delta_{PUSCH, c}$ [dB] | Absolute $\delta_{PUSCH, c}$ [dB] only DCI format 0/0A/0B/4/4A/4B |
|---|---|---|
| 0 | −1 | −4 |
| 1 | 0 | −1 |
| 2 | 1 | 1 |
| 3 | 3 | 4 |

TABLE 23

| TPC Command Field in DCI format 3A | Accumulated $\delta_{PUSCH, c}$ [dB] |
|---|---|
| 0 | −1 |
| 1 | 1 |

The setting of the UE Transmit power for an SRS transmission may be defined as shown in Listing 2.

Listing 2

$$P_{SRS,c}(i) = \min\left\{\begin{array}{l} P_{CMAX,c}(i), P_{SRS\_OFFSET,c}(m) + \\ 10\log_{10}(M_{SRS,c}) + P_{O\_PUSCH,c}(j) + \\ \alpha_c(j) \cdot PL_c + f_c(i) \end{array}\right\} [dBm]$$

where
$P_{CMAX,c}(i)$ is the configured UE transmit power defined in [6] in
subframe i for serving cell c.
$P_{SRS\_OFFSET,c}(m)$ is semi-statically configured by higher layers for
m = 0 and m = 1 for serving cell c. For SRS transmission given
trigger type 0 then m = 0 and for SRS transmission given trigger
type 1 then m = 1.
$M_{SRS,c}$ is the bandwidth of the SRS transmission in subframe i for
serving cell c expressed in number of resource blocks.

-continued

Listing 2

$f_c(i)$ is the current PUSCH power control adjustment state for serving cell c.
$P_{O\_PUSCH,c}(j)$ and $\alpha_c(j)$ are parameters for subframe i, where j = 1.

When the UE 102 detects UL grant (DCI format 0A/0B/4A/4B) with PUSCH trigger A set to 1, there may be two approaches. The first approach is to use the TPC command of the UL grant irrespective of whether or not C-PDCCH with PUSCH trigger B set to 1 is detected during the validation duration, as shown in FIG. 27. If the UE 102 detects the C-PDCCH with PUSCH trigger B set to 1 during the validation duration, $\delta_{PUSCH,c}$ in the PDCCH/EPDCCH with DCI format 0/0A/0B/4/4A/4B is accumulated with $f_c$ (i−1) if accumulation is enabled to derive $f_c(i)$, or $\delta_{PUSCH,c}$ is used without accumulation to derive $f_c(i)$ if accumulation is not enabled. $f_c(i)$ is used to determine transmit power of the scheduled PUSCH. In this case, the value of $K_{PUSCH}$ may be defined by the same way as described in Listing 1.

Figure 28:
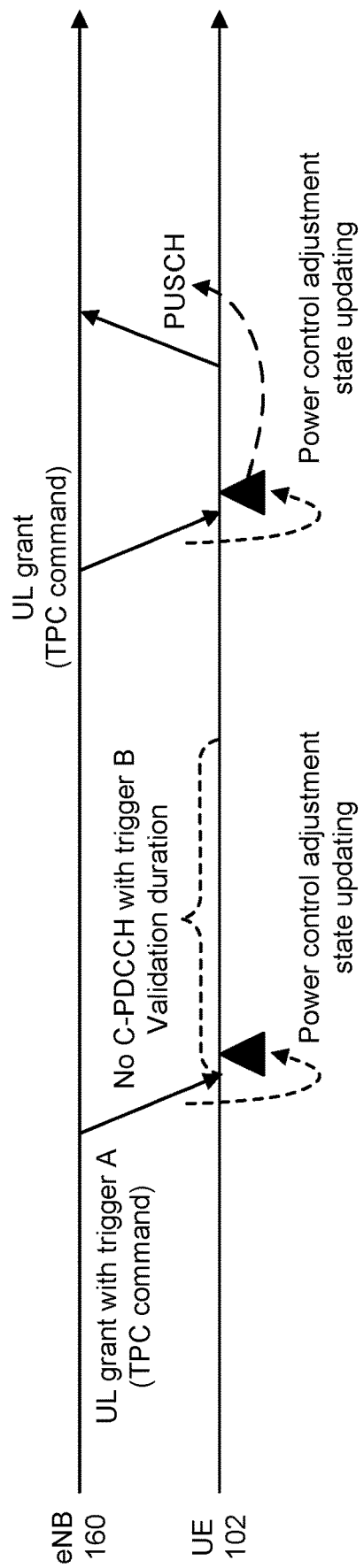
FIG. 28 is one example illustrating transmit power control procedure.

Even if the UE 102 does not detect the C-PDCCH with PUSCH trigger B set to 1 during the validation duration, $\delta_{PUSCH,c}$ in the PDCCH/EPDCCH with DCI format 0/0A/0B/4/4A/4B is accumulated with $f_c$ (i−1) if accumulation is enabled to derive $f_c(i)$. In this case $f_c(i)$ is used to derive $f_c$ (i+1) to determine transmit power of a future PUSCH which will be scheduled by another UL grant, as shown in FIG. 28. If accumulation is not enabled $\delta_{PUSCH,c}$ signaled by the first UL grant with PUSCH trigger A set to 1 may not need to be referred to.

Figure 29:
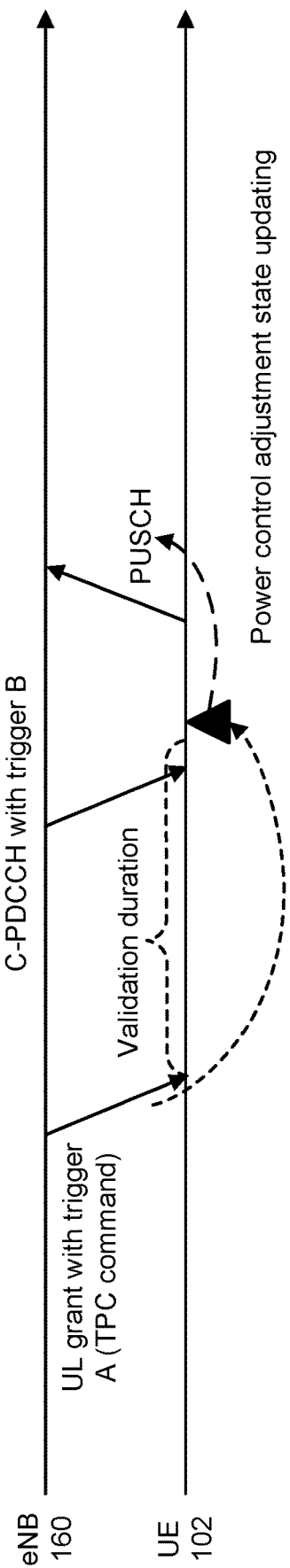
FIG. 29 is one example illustrating transmit power control procedure.

The second approach is to use the TPC command of the UL grant only if C-PDCCH with PUSCH trigger B set to 1 is detected during the validation duration. After the UE 102 detects the C-PDCCH with PUSCH trigger B set to 1 during the validation duration, $\delta_{PUSCH,c}$ in the PDCCH/EPDCCH with DCI format 0/0A/0B/4/4A/4B is accumulated with $f_c$ (i−1) if accumulation is enabled to derive $f_c(i)$, or $\delta_{PUSCH,c}$ is used without accumulation to derive $f_c(i)$ if accumulation is not enabled. $f_c(i)$ is used to determine transmit power of the scheduled PUSCH as shown in FIG. 29.

Figure 30:
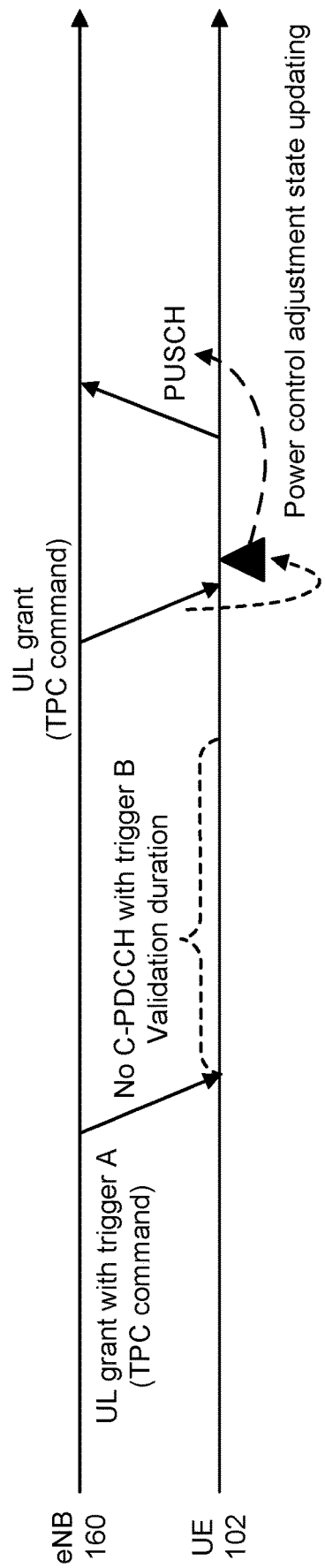
FIG. 30 is one example illustrating transmit power control procedure.

If the UE 102 does not detect the C-PDCCH with PUSCH trigger B set to 1 during the validation duration, $\delta_{PUSCH,c}$ signaled by the first UL grant with PUSCH trigger A set to 1 may not need to be referred to irrespective of whether or not accumulation is enabled. If a new UL grant is received after the validation duration of the previous UL grant and if accumulation is enabled, $f_c$ is derived from the most recently updated, as shown in FIG. 30. In this case, the value of $K_{PUSCH}$ may be replaced with $K'_{PUSCH}$ which is defined by $K'_{PUSCH} = K_{PUSCH} + u$ and $u = n_A - n_B$ when the corresponding PDCCH/EPDCCH with DCI format 0A/0B/4A/4B with 'PUSCH trigger A' field set to '1' is detected in subframe $n_A$ and the corresponding PDCCH with DCI CRC scrambled by CC-RNTI and with 'PUSCH trigger B' field set to '1' is detected in subframe $n_B$.

Possible uplink power scaling procedures are described hereafter. If the total transmit power of the UE 102 would exceed $\hat{P}_{CMAX}(i)$, the UE 102 may scale $\hat{P}_{PUSCH,c}(i)$ for the serving cell c or may drop a PUSCH transmission (i.e., allocate zero transmit power) for serving cell c. More specifically, if the UE 102 is not configured with an SCG or a PUCCH-SCell, and if the total transmit power of the UE 102 would exceed $\hat{P}_{CMAX}(i)$, the UE 102 may scale $\hat{P}_{PUSCH,c}(i)$ for the serving cell c in subframe i such that the condition $$\sum_c w(i) \cdot \hat{P}_{PUSCH,c}(i) \le \left( \hat{P}_{CMAX}(i) - \hat{P}_{PUCCH}(i) \right)$$

is satisfied where $\hat{P}_{PUCCH}(i)$ is the linear value of PUCCH transmit power $P_{PUCCH}(i)$, $\hat{P}_{PUSCH,c}(i)$ is the linear value of PUSCH transmit power for serving cell c $P_{PUSCH,c}(i)$, $\hat{P}_{CMAX}(i)$ is the linear value of the UE total configured maximum output power $P_{CMAX}$ in subframe i and w(i) is a scaling factor (also referred to as power scaling factor) of $\hat{P}_{PUSCH,c}(i)$ for serving cell c where 0≤w(i)≤1. In case there is no PUCCH transmission in subframe i $\hat{P}_{PUCCH}(i) = 0$.

If the UE 102 is not configured with an SCG or a PUCCH-Scell, and if the UE 102 has PUSCH transmission with UCI on serving cell j and PUSCH without UCI in any of the remaining serving cells, and the total transmit power of the UE 102 would exceed $\hat{P}_{CMAX}(i)$, the UE 102 may scale $\hat{P}_{PUSCH,c}(i)$ for the serving cells without UCI in subframe i such that the condition $$\sum_{c \ne j} w(i) \cdot \hat{P}_{PUSCH,c}(i) \le \left( \hat{P}_{CMAX}(i) - \hat{P}_{PUSCH,j}(i) \right)$$

is satisfied where $\hat{P}_{PUSCH,j}(i)$ is the PUSCH transmit power for the cell with UCI and w(i) is a scaling factor of $\hat{P}_{PUSCH,c}(i)$ for serving cell c without UCI. In this case, no power scaling is applied to $\hat{P}_{PUSCH,j}(i)$ unless $$\sum_{c \ne j} w(i) \cdot \hat{P}_{PUSCH,c}(i) = 0$$

and the total transmit power of the UE 102 still would exceed $\hat{P}_{CMAX}(i)$.

For a UE 102 not configured with a SCG or a PUCCH-SCell, note that w(i) values are the same across serving cells when w(i)>0 but for certain serving cells w(i) may be zero.

If the UE 102 is not configured with an SCG or a PUCCH-SCell, and if the UE 102 has simultaneous PUCCH and PUSCH transmission with UCI on serving cell j and PUSCH transmission without UCI in any of the remaining serving cells, and the total transmit power of the UE 102 would exceed $\hat{P}_{CMAX}(i)$, the UE 102 may obtain $\hat{P}_{PUSCH,c}$ according to $\hat{P}_{PUSCH,j}(i) = \min(\hat{P}_{PUSCH,j}(i), (\hat{P}_{CMAX}(i) - \hat{P}_{PUCCH}(i))$ and $$\sum_{c \ne j} w(i) \cdot \hat{P}_{PUSCH,c}(i) \le \left( \hat{P}_{CMAX}(i) - \hat{P}_{PUCCH}(i) - \hat{P}_{PUSCH,j}(i) \right).$$

If the UE 102 is configured with a LAA SCell for uplink transmissions, the UE 102 may compute the scaling factor w(i) assuming that the UE 102 performs a PUSCH transmission on the LAA SCell in subframe i irrespective of whether the UE 102 can access the LAA SCell for the PUSCH transmission in subframe i according to the channel access procedures.

Similarly, the UE 102 may perform power scaling or dropping for SRS. More specifically, if the UE 102 is not configured with an SCG or a PUCCH-SCell, and if the total transmit power of the UE 102 for the Sounding Reference Symbol in an SC-FDMA symbol would exceed $\hat{P}_{CMAX}(i)$, the UE 102 scales $\hat{P}_{SRS,c}(i)$ for the serving cell c and the SC-FDMA symbol in subframe i such that the condition $$\sum_c w(i) \cdot \hat{P}_{SRS,c}(i) \le \hat{P}_{CMAX}(i)$$

is satisfied where $\hat{P}_{SRS,c}(i)$ is the linear value of SRS transmit power $P_{SRS,c}(i)$, $\hat{P}_{CMAX}(i)$ is the linear value of $P_{CMAX}$ in subframe i and w(i) is a scaling factor (also referred to as power scaling factor) of $\hat{P}_{SRS,c}(i)$ for serving cell c where $0<w(i)\le 1$. Note that w(i) values are the same across serving cells.

Figure 31:
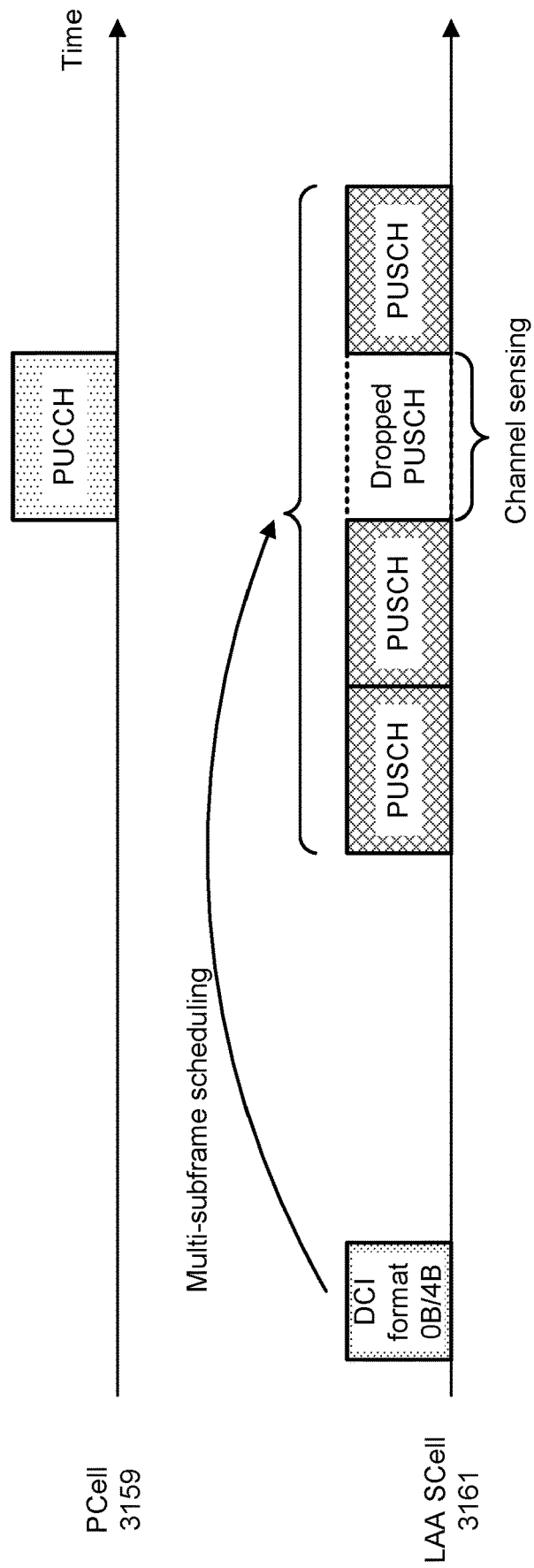
FIG. 31 is an example illustrating PUSCH dropping.

FIG. 31 is one example illustrating PUSCH dropping. A PCell 3159 may include a PUCCH that overlaps with a PUSCH transmission on an LAA SCell 3161. A DCI format 0B/4B on the LAA SCell 3161 may perform multi-subframe scheduling of PUSCH transmission.

As shown in FIG. 31, if the UE 102 starts a contiguous transmission spanning a set of subframes on an LAA SCell 3161, and the UE 102 suspends transmission (because of PUSCH dropping) prior to the last scheduled subframe in the transmission, then the UE 102 may be allowed to resume transmission on the remaining subframes in the transmission immediately after performing an LBT of duration 25 microseconds if the channel was observed to be continuously idle since the transmission was suspended. If the channel was not observed to be continuously idle, then the UE 102 may be allowed to resume transmission after performing a successful Cat. 4 LBT with LBT parameters according to the indicated LBT priority class in the UL grant that scheduled the subframe in the transmission.

Figure 32:
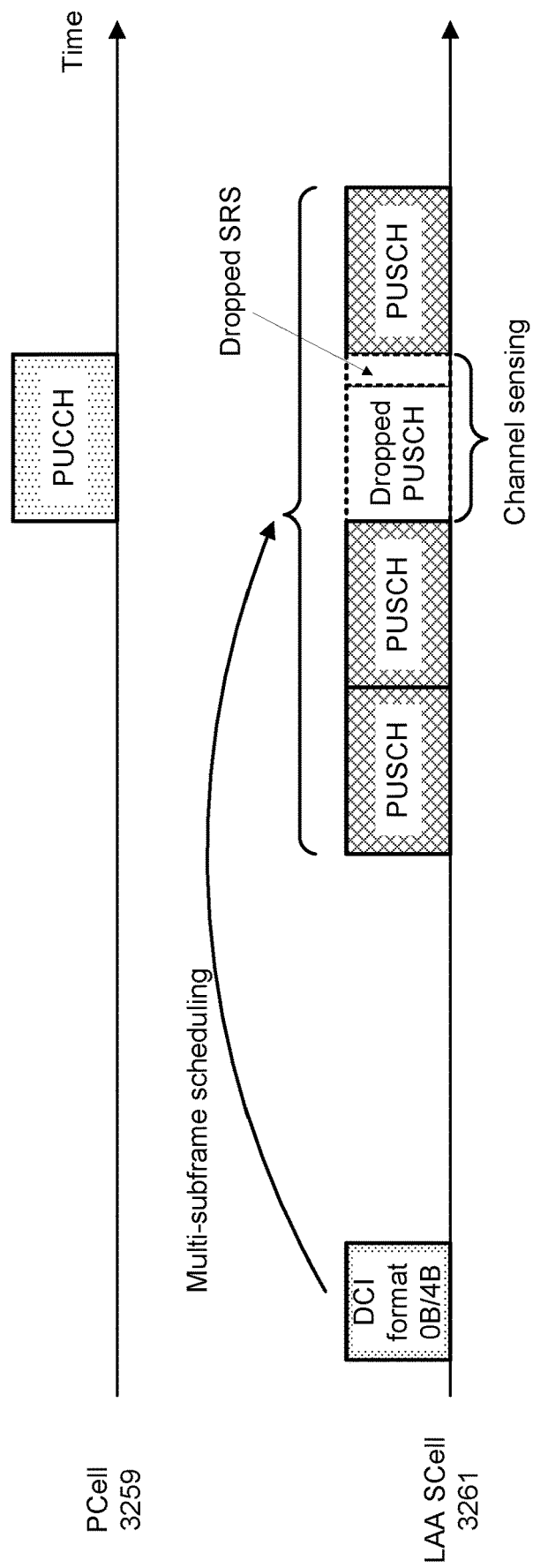
FIG. 32 is another example illustrating PUSCH dropping.

FIG. 32 is another example illustrating PUSCH dropping. A PCell 3259 may include a PUCCH that overlaps with a PUSCH transmission on an LAA SCell 3261. A DCI format 0B/4B on the LAA SCell 3261 may perform multi-subframe scheduling of PUSCH transmission.

When the UE 102 decides to drop a PUSCH transmission in subframe $n_k$ for which the SRS transmission is scheduled, there may be several approaches. The first approach is to drop SRS transmission and resume PUSCH in subframe $n_{k+1}$, as shown in FIG. 32. More specifically, if the UE 102 is scheduled to transmit in contiguous subframes $n_0$, $n_1$, . . . , $n_{w-1}$ (for example, using Type 1 channel access procedure) using one or more PDCCH DCI Format 0B/4B or more than one PDCCH DCI Format 0A/4A, and if the UE 102 has stopped PUSCH or SRS transmitting during or before subframe $n_{k1}$, $k1\in\{0, 1, \ldots w-2\}$, and if the channel is sensed by the UE 102 to be continuously idle after the UE 102 has stopped transmitting, the UE 102 may be allowed to start PUSCH transmission in a later subframe $n_{k2}$, $k2\in\{1, \ldots w-1\}$ using Type 2 channel access procedure. If the channel sensed by the UE 102 is not continuously idle after the UE 102 has stopped transmitting, the UE 102 may be allowed to start PUSCH transmission in a later subframe $n_{k2}$, $k2\in\{1, \ldots w-1\}$ using Type 1 channel access procedure with the UL channel access priority class indicated in the DCI which schedules PUSCH in subframe $n_{k2}$. For example, when PUSCH in subframe $n_{k1}$ is scheduled by DCI #1 and PUSCH in subframe $n_{k2}$ is scheduled by DCI #2, Type 1 channel access procedure may follow the UL channel access priority class indicated in the DCI #2. This means that the UE 102 may have to set the transmit power coefficient (also referred to as power scaling factor) w(i) for SRS to 0 if the transmit power coefficient w(i) for PUSCH is set to 0 in the same subframe i in the same serving cell.

FIG. 32 is yet another example illustrating PUSCH dropping. A PCell 3359 may include a PUCCH that overlaps with a PUSCH transmission on an LAA SCell 3361. A DCI format 0B/4B on the LAA SCell 3361 may perform multi-subframe scheduling of PUSCH transmission.

Figure 33:
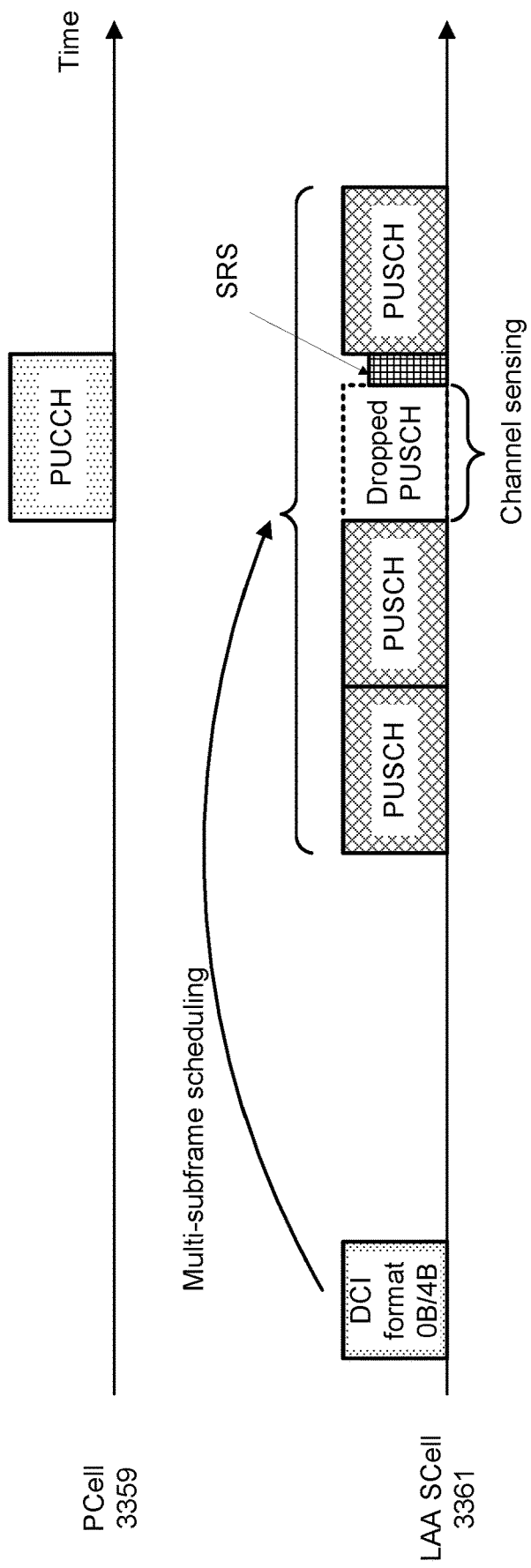
FIG. 33 is yet another example illustrating PUSCH dropping.

The second approach is to drop PUSCH transmission only and resume SRS in subframe $n_k$, as shown in FIG. 33. More specifically, if the UE 102 is scheduled to transmit in subframes $n_0$, $n_1$, . . . , $n_{w-1}$ (for example, using Type 1 channel access procedure) using one or more PDCCH DCI Format 0B/4B or more than one PDCCH DCI Format 0A/4A, and if the UE 102 has stopped PUSCH transmitting during or before subframe $n_{k1}$, $k1\in\{0, 1, \ldots w-2\}$, if the subframe $n_{k1}$ does not contain SRS, and if the channel is sensed by the UE 102 to be continuously idle after the UE 102 has stopped transmitting, the UE 102 may be allowed to start PUSCH transmission in a later subframe $n_{k2}$, $k2\in\{1, \ldots w-1\}$ using Type 2 channel access procedure. If the channel sensed by the UE 102 is not continuously idle after the UE 102 has stopped transmitting, the UE 102 may be allowed to start PUSCH transmission in a later subframe $n_{k2}$, $k2\in\{1, \ldots w-1\}$ using Type 1 channel access procedure with the UL channel access priority class indicated in the DCI which schedules PUSCH in subframe $n_{k2}$. If the UE 102 is scheduled to transmit in subframes $n_0$, $n_1$, . . . , $n_{w-1}$ (for example, using Type 1 channel access procedure) using one or more PDCCH DCI Format 0B/4B or more than one PDCCH DCI Format 0A/4A, and if the UE 102 has stopped PUSCH transmitting during or before subframe $n_{k1}$, $k1\in\{0, 1, \ldots w-2\}$, if the subframe $n_{k1}$ contains SRS, and if the channel is sensed by the UE 102 to be continuously idle after the UE 102 has stopped transmitting, the UE 102 may be allowed to start SRS transmission in the subframe $n_{k1}$ using Type 2 channel access procedure. If the channel sensed by the UE 102 is not continuously idle after the UE 102 has stopped transmitting, the UE 102 may be allowed to start SRS transmission in a later subframe $n_{k1}$ using Type 1 channel access procedure with the UL channel access priority class indicated in the DCI which schedules PUSCH in subframe $n_{k1}+1$. If the UE 102 is scheduled to transmit in subframes $n_0$, $n_1$, . . . , $n_{w-1}$ (for example, using Type 1 channel access procedure) using one or more PDCCH DCI Format 0B/4B or more than one PDCCH DCI Format 0A/4A, and if the UE 102 has stopped PUSCH transmitting during subframe $n_{w-1}$, if the subframe $n_{w-1}$ contains SRS, and if the channel is sensed by the UE 102 to be continuously idle after the UE 102 has stopped transmitting, the UE 102 may be allowed to start SRS transmission in a later subframe $n_{w-1}$ using Type 2 channel access procedure. If the channel sensed by the UE 102 is not continuously idle after the UE 102 has stopped transmitting, the UE 102 may be allowed to start SRS transmission in subframe $n_{w-1}$ using Type 1 channel access procedure with the UL channel access priority 1. This means that the UE 102 may be able to set the transmit power coefficient w(i) for SRS independently of the transmit power coefficient w(i) for PUSCH in the same subframe i in the same serving cell.

Figure 34:
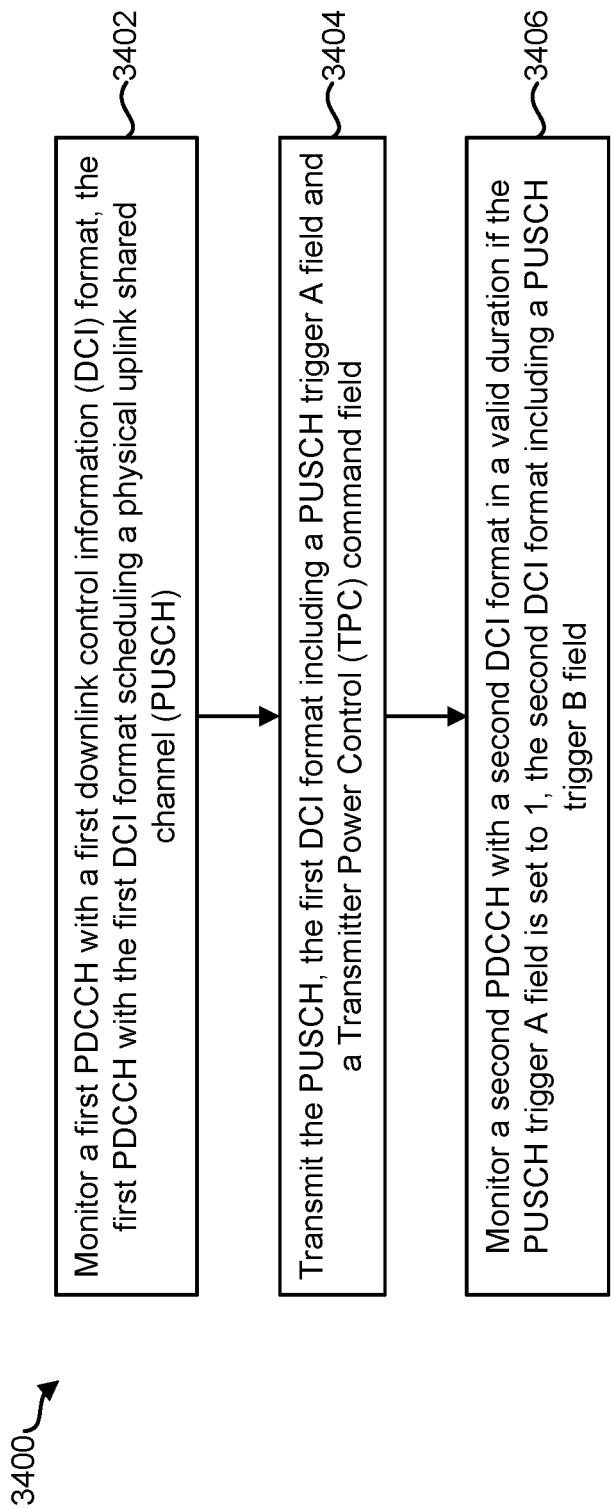
FIG. 34 is a flow diagram illustrating a method by a UE.

FIG. 34 is a flow diagram illustrating a method 3400 by a UE 102. The UE 102 may communicate with one or more eNBs 160 in a wireless communication network. In one implementation, the wireless communication network may include an LTE network.

The UE 102 may monitor 3402 a first PDCCH with a first downlink control information (DCI) format, the first PDCCH with the first DCI format scheduling a physical uplink shared channel (PUSCH).

The UE 102 may transmit 3404 the PUSCH. The first DCI format may include a PUSCH trigger A field and a Transmitter Power Control (TPC) command field.

The UE 102 may monitor 3406 a second PDCCH with a second DCI format in a valid duration if the PUSCH trigger A field is set to 1, the second DCI format including a PUSCH trigger B field. If the PUSCH trigger A field is set to 1, the TPC command field applies only when the second PDCCH with the second DCI format of which the PUSCH trigger B field set to 1 is detected. The second DCI format may be a DCI format with a cyclic redundancy check (CRC) scrambled by component carrier Radio Network Temporary Identifier (CC-RNTI). If the PUSCH trigger A field is set to 1, the TPC command field does not apply when the second PDCCH with the second DCI format of which the PUSCH trigger B field set to 1 is not detected.

Figure 35:
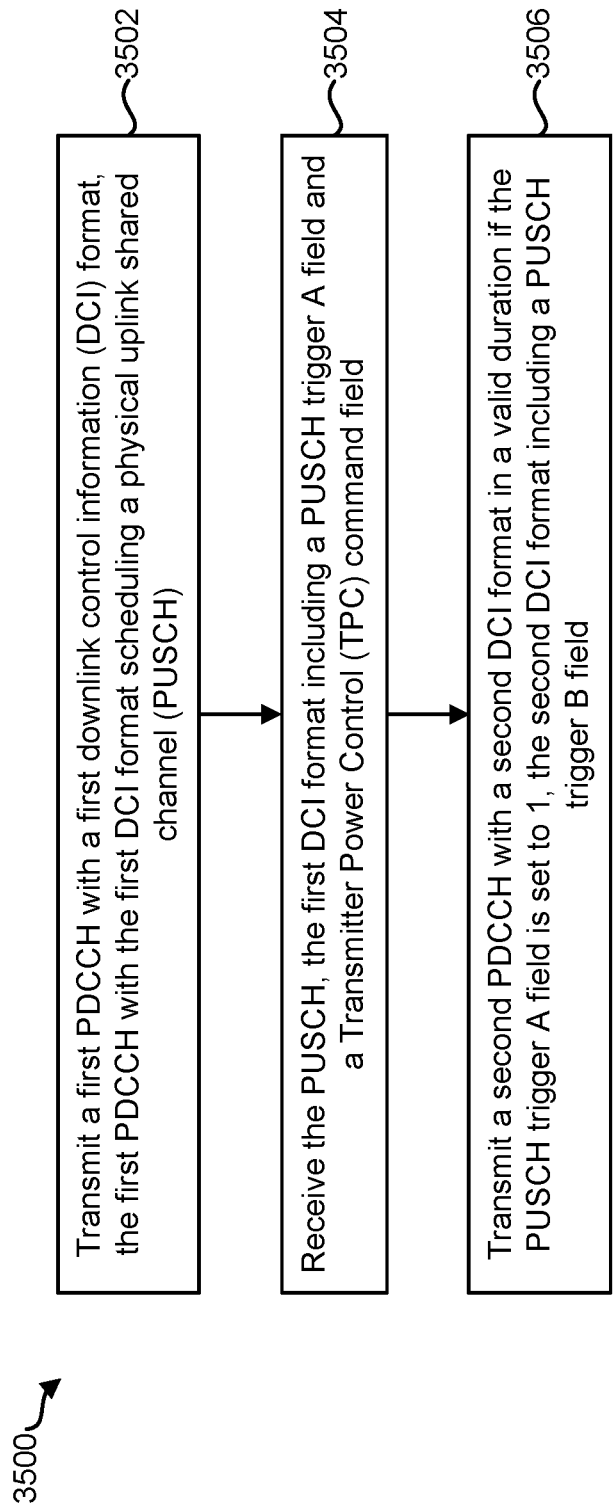
FIG. 35 is a flow diagram illustrating a method by an eNB.

FIG. 35 is a flow diagram illustrating a method 3500 by an eNB 160 communicating with a UE 102. The eNB 160 may communicate with one or more UEs 102 in a wireless communication network. In one implementation, the wireless communication network may include an LTE network.

The eNB 160 may transmit 3502 a first PDCCH with a first downlink control information (DCI) format, the first PDCCH with the first DCI format scheduling a physical uplink shared channel (PUSCH).

The UE 102 may receive 3504 the PUSCH. The first DCI format may include a PUSCH trigger A field and a Transmitter Power Control (TPC) command field.

The UE 102 may transmit 3506 a second PDCCH with a second DCI format in a valid duration if the PUSCH trigger A field is set to 1, the second DCI format including a PUSCH trigger B field. If the PUSCH trigger A field is set to 1, the TPC command field applies only when the second PDCCH with the second DCI format of which the PUSCH trigger B field set to 1 is detected. The second DCI format may be a DCI format with a cyclic redundancy check (CRC) scrambled by component carrier Radio Network Temporary Identifier (CC-RNTI). If the PUSCH trigger A field is set to 1, the TPC command field does not apply when the second PDCCH with the second DCI format of which the PUSCH trigger B field set to 1 is not detected by the UE 102.

The term "computer-readable medium" refers to any available medium that can be accessed by a computer or a processor. The term "computer-readable medium," as used herein, may denote a computer- and/or processor-readable medium that is non-transitory and tangible. By way of example, and not limitation, a computer-readable or processor-readable medium may comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer or processor. Disk and disc, as used herein, includes compact disc (CD), laser disc, optical disc, digital versatile disc (DVD), floppy disk and Blu-ray® disc where disks usually reproduce data magnetically, while discs reproduce data optically with lasers.

It should be noted that one or more of the methods described herein may be implemented in and/or performed using hardware. For example, one or more of the methods described herein may be implemented in and/or realized using a chipset, an application-specific integrated circuit (ASIC), a large-scale integrated circuit (LSI) or integrated circuit, etc.

Each of the methods disclosed herein comprises one or more steps or actions for achieving the described method. The method steps and/or actions may be interchanged with one another and/or combined into a single step without departing from the scope of the claims. In other words, unless a specific order of steps or actions is required for proper operation of the method that is being described, the order and/or use of specific steps and/or actions may be modified without departing from the scope of the claims.

It is to be understood that the claims are not limited to the precise configuration and components illustrated above. Various modifications, changes and variations may be made in the arrangement, operation and details of the systems, methods, and apparatus described herein without departing from the scope of the claims.

A program running on the eNB 160 or the UE 102 according to the described systems and methods is a program (a program for causing a computer to operate) that controls a CPU and the like in such a manner as to realize the function according to the described systems and methods. Then, the information that is handled in these apparatuses is temporarily stored in a RAM while being processed. Thereafter, the information is stored in various ROMs or HDDs, and whenever necessary, is read by the CPU to be modified or written. As a recording medium on which the program is stored, among a semiconductor (for example, a ROM, a nonvolatile memory card, and the like), an optical storage medium (for example, a DVD, a MO, a MD, a CD, a BD, and the like), a magnetic storage medium (for example, a magnetic tape, a flexible disk, and the like), and the like, any one may be possible. Furthermore, in some cases, the function according to the described systems and methods described above is realized by running the loaded program, and in addition, the function according to the described systems and methods is realized in conjunction with an operating system or other application programs, based on an instruction from the program.

Furthermore, in a case where the programs are available on the market, the program stored on a portable recording medium can be distributed or the program can be transmitted to a server computer that connects through a network such as the Internet. In this case, a storage device in the server computer also is included. Furthermore, some or all of the eNB 160 and the UE 102 according to the systems and methods described above may be realized as an LSI that is a typical integrated circuit. Each functional block of the eNB 160 and the UE 102 may be individually built into a chip, and some or all functional blocks may be integrated into a chip. Furthermore, a technique of the integrated circuit is not limited to the LSI, and an integrated circuit for the functional block may be realized with a dedicated circuit or a general-purpose processor. Furthermore, if with advances in a semiconductor technology, a technology of an integrated circuit that substitutes for the LSI appears, it is also possible to use an integrated circuit to which the technology applies.

Moreover, each functional block or various features of the base station device and the terminal device used in each of the aforementioned embodiments may be implemented or executed by a circuitry, which is typically an integrated circuit or a plurality of integrated circuits. The circuitry designed to execute the functions described in the present specification may comprise a general-purpose processor, a digital signal processor (DSP), an application specific or general application integrated circuit (ASIC), a field programmable gate array (FPGA), or other programmable logic devices, discrete gates or transistor logic, or a discrete hardware component, or a combination thereof. The general-purpose processor may be a microprocessor, or alternatively, the processor may be a conventional processor, a controller, a microcontroller or a state machine. The general-purpose processor or each circuit described above may be configured by a digital circuit or may be configured by an analogue circuit. Further, when a technology of making into an integrated circuit superseding integrated circuits at the present time appears due to advancement of a semiconductor technology, the integrated circuit by this technology is also able to be used.

What is claimed is:

1. A user equipment (UE) comprising:
    physical downlink control channel (PDCCH) receiving circuitry configured to monitor a first PDCCH with a first downlink control information (DCI) format, the first PDCCH with the first DCI format scheduling a physical uplink shared channel (PUSCH); and
    PUSCH transmitting circuitry configured to transmit the PUSCH, the first DCI format including a PUSCH trigger A field and a Transmitter Power Control (TPC) command field,
    wherein the PDCCH receiving circuitry is further configured to, if the PUSCH trigger A field is set to 1, monitor a second PDCCH with a second DCI format in a valid duration, the second DCI format including a PUSCH trigger B field,
    if the PUSCH trigger A field is set to 1, the TPC command field does not apply when the second PDCCH with the second DCI format of which the PUSCH trigger B field set to 1 is not detected, and
    if the PUSCH trigger A field is set to 1, the TPC command field applies if the second PDCCH with the second DCI format of which the PUSCH trigger B field set to 1 is detected, and the PUSCH transmitting circuitry is configured to perform a corresponding PUSCH transmission using the applied TPC command.

2. The UE of claim 1, wherein the second DCI format is a DCI format with a cyclic redundancy check (CRC) scrambled by a Radio Network Temporary Identifier (RNTI) for common control signaling.

3. The UE of claim 1, wherein if the PUSCH trigger A field is set to 1, the TPC command field applies if the second PDCCH with the second DCI format of which the PUSCH trigger B field set to 1 is detected in the valid duration.

4. An evolved node B (eNB) communicating with a user equipment (UE), the eNB comprising:
    physical downlink control channel (PDCCH) transmitting circuitry configured to transmit a first PDCCH with a first downlink control information (DCI) format, the first PDCCH with the first DCI format scheduling a physical uplink shared channel (PUSCH); and
    PUSCH receiving circuitry configured to receive the PUSCH, the first DCI format including a PUSCH trigger A field and a Transmitter Power Control (TPC) command field,
    wherein the PDCCH transmitting circuitry is further configured to, if the PUSCH trigger A field is set to 1, transmit a second PDCCH with a second DCI format in a valid duration, the second DCI format including a PUSCH trigger B field,
    if the PUSCH trigger A field is set to 1, the TPC command field does not apply when the second PDCCH with the second DCI format of which the PUSCH trigger B field set to 1 is not detected by the UE, and
    if the PUSCH trigger A field is set to 1, the TPC command field applies if the second PDCCH with the second DCI format of which the PUSCH trigger B field set to 1 is detected by the UE, and the PUSCH receiving circuitry is configured to perform a corresponding PUSCH reception using the applied TPC command.

5. The eNB of claim 4, wherein the second DCI format is a DCI format with a cyclic redundancy check (CRC) scrambled by a Radio Network Temporary Identifier (RNTI) for common control signaling.

6. The eNB of claim 4, wherein if the PUSCH trigger A field is set to 1, the TPC command field applies if the second PDCCH with the second DCI format of which the PUSCH trigger B field set to 1 is detected in the valid duration.

7. A method for a user equipment (UE), the method comprising:
    monitoring a first physical downlink control channel (PDCCH) with a first downlink control information (DCI) format, the first PDCCH with the first DCI format scheduling a physical uplink shared channel (PUSCH);
    transmitting the PUSCH, the first DCI format including a PUSCH trigger A field and a Transmitter Power Control (TPC) command field; and
    monitoring a second PDCCH with a second DCI format in a valid duration if the PUSCH trigger A field is set to 1, the second DCI format including a PUSCH trigger B field,
    wherein if the PUSCH trigger A field is set to 1, the TPC command field does not apply when the second PDCCH with the second DCI format of which the PUSCH trigger B field set to 1 is not detected, and
    if the PUSCH trigger A field is set to 1, the TPC command field applies if the second PDCCH with the second DCI format of which the PUSCH trigger B field set to 1 is detected, and a corresponding PUSCH transmission is performed using the applied TPC command.

8. A method for an evolved node B (eNB) communicating with a user equipment (UE), the method comprising:
    transmitting a first physical downlink control channel (PDCCH) with a first downlink control information (DCI) format, the first PDCCH with the first DCI format scheduling a physical uplink shared channel (PUSCH); and
    receiving the PUSCH, the first DCI format including a PUSCH trigger A field and a Transmitter Power Control (TPC) command field, transmitting a second PDCCH with a second DCI format in a valid duration if the PUSCH trigger A field is set to 1, the second DCI format including a PUSCH trigger B field,
    if the PUSCH trigger A field is set to 1, the TPC command field does not apply when the second PDCCH with the second DCI format of which the PUSCH trigger B field set to 1 is not detected by the UE, and
    if the PUSCH trigger A field is set to 1, the TPC command field applies if the second PDCCH with the second DCI format of which the PUSCH trigger B field set to 1 is detected by the UE, and a corresponding PUSCH reception is performed using the applied TPC command.

* * * * *